(12) United States Patent
Fadell et al.

(10) Patent No.: US 10,114,351 B2
(45) Date of Patent: Oct. 30, 2018

(54) SMART-HOME AUTOMATION SYSTEM THAT SUGGESTS OR AUTMATICALLY IMPLEMENTS SELECTED HOUSEHOLD POLICIES BASED ON SENSED OBSERVATIONS

(71) Applicant: GOOGLE INC., Mountain View, CA (US)

(72) Inventors: Anthony M. Fadell, San Francisco, CA (US); Yoky Matsuoka, Palo Alto, CA (US); David Sloo, Menlo Park, CA (US); Maxime Veron, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 694 days.

(21) Appl. No.: 14/639,750

(22) Filed: Mar. 5, 2015

(65) Prior Publication Data

US 2016/0259308 A1    Sep. 8, 2016

(51) Int. Cl.
*G05B 15/02* (2006.01)
*H04L 12/28* (2006.01)
*H04W 4/00* (2018.01)
*H04W 4/80* (2018.01)

(52) U.S. Cl.
CPC .......... *G05B 15/02* (2013.01); *H04L 12/2823* (2013.01); *H04W 4/80* (2018.02); *G05B 2219/2642* (2013.01)

(58) Field of Classification Search
CPC ............ G05B 15/02; G05B 2219/2642; H04L 12/2823; H04W 4/80
See application file for complete search history.

(56) References Cited

U.S. PATENT DOCUMENTS

| 4,475,685 A | * | 10/1984 | Grimado | ................. F23N 5/203 236/46 R |
| 7,689,920 B2 | | 3/2010 | Robbin et al. | |
| 9,330,274 B2 | | 5/2016 | Schepis et al. | |
| 9,450,962 B2 | * | 9/2016 | Longhorn | ............... H04L 43/50 |

(Continued)

FOREIGN PATENT DOCUMENTS

| JP | 07158927 A | 6/1995 |
| JP | 2014174762 A | 9/2014 |

(Continued)

OTHER PUBLICATIONS

International Search Report for PCT Application No. PCT/US2016/020716 dated Jul. 6, 2016; 29 pgs.

*Primary Examiner* — Abdelmoniem Elamin
(74) *Attorney, Agent, or Firm* — Van Court & Aldridge LLP

(57) ABSTRACT

Embodiments provided herein relate to: suggesting, automatically implementing, or both suggesting and automatically implementing, one or more household policies to be implemented within a household environment. The household policies include one or more input criteria that is derivable from at least one smart device within the household environment, the one or more input criteria relating to a characteristic of the household environment, a characteristic of one or more occupants of the household, or both. The household policies also include one or more outputs to be provided based upon the one or more input criteria.

17 Claims, 30 Drawing Sheets

(56) References Cited

U.S. PATENT DOCUMENTS

| | | | |
|---|---|---|---|
| 9,569,670 B2* | 2/2017 | Bell | G06K 9/00771 |
| 9,626,841 B2* | 4/2017 | Fadell | G08B 19/005 |
| 9,640,055 B2* | 5/2017 | Fadell | G08B 19/005 |
| 9,711,036 B2* | 7/2017 | Fadell | G08B 25/008 |
| 2004/0229569 A1* | 11/2004 | Franz | H04M 3/16 455/66.1 |
| 2005/0240959 A1 | 10/2005 | Kuhn et al. | |
| 2007/0216764 A1* | 9/2007 | Kwak | G07C 9/00309 348/14.06 |
| 2008/0167535 A1 | 7/2008 | Stivoric et al. | |
| 2013/0006425 A1* | 1/2013 | Bell | G06K 9/00771 700/275 |
| 2013/0234840 A1* | 9/2013 | Trundle | F24F 11/0086 340/12.53 |
| 2013/0238538 A1 | 9/2013 | Cook et al. | |
| 2014/0052303 A1 | 2/2014 | Venkatakrishnan et al. | |
| 2014/0129160 A1 | 5/2014 | Tran | |
| 2014/0207721 A1 | 7/2014 | Filson et al. | |
| 2014/0211985 A1 | 7/2014 | Polese et al. | |
| 2014/0244001 A1* | 8/2014 | Glickfield | H04L 67/16 700/33 |
| 2014/0324410 A1 | 10/2014 | Mathews et al. | |
| 2014/0371937 A1 | 12/2014 | Weaver et al. | |
| 2015/0061859 A1* | 3/2015 | Matsuoka | G08B 27/00 340/501 |
| 2015/0100618 A1 | 4/2015 | Le Guen et al. | |
| 2015/0109128 A1* | 4/2015 | Fadell | G08B 27/003 340/540 |
| 2015/0116106 A1* | 4/2015 | Fadell | G08B 19/005 340/501 |
| 2015/0116107 A1* | 4/2015 | Fadell | G08B 19/005 340/501 |
| 2015/0116108 A1* | 4/2015 | Fadell | G08B 19/005 340/501 |
| 2015/0156030 A1* | 6/2015 | Fadell | H04L 12/2816 700/90 |
| 2015/0156031 A1* | 6/2015 | Fadell | H04L 12/2816 700/276 |
| 2015/0227118 A1* | 8/2015 | Wong | G05B 15/02 700/44 |
| 2015/0309487 A1 | 10/2015 | Lyman | |
| 2016/0055422 A1* | 2/2016 | Li | G05B 15/02 706/12 |
| 2017/0162007 A1* | 6/2017 | Boyd | G08B 5/36 |

FOREIGN PATENT DOCUMENTS

| | | |
|---|---|---|
| KR | 10-0844338 B1 | 7/2008 |
| WO | 2014/175433 A1 | 10/2014 |

* cited by examiner

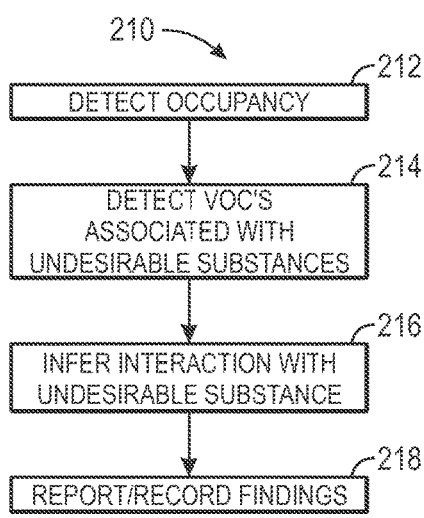
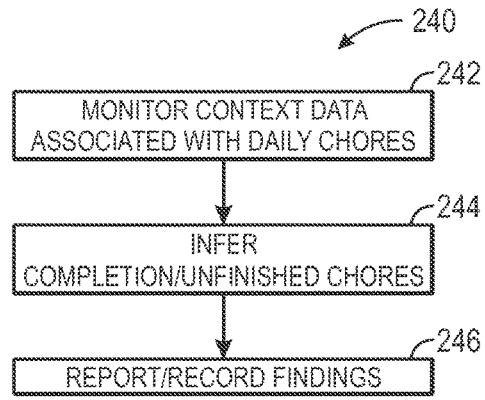
FIG. 39
FIG. 40
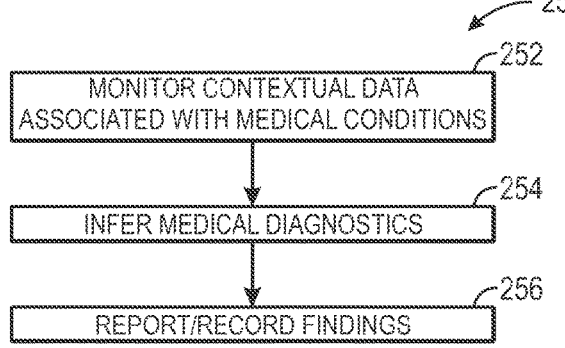
FIG. 41
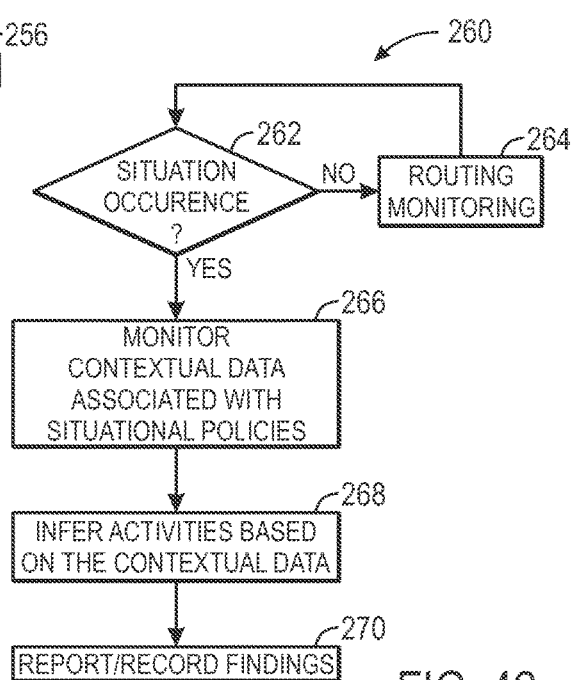
FIG. 42

SMART-HOME AUTOMATION SYSTEM THAT SUGGESTS OR AUTMATICALLY IMPLEMENTS SELECTED HOUSEHOLD POLICIES BASED ON SENSED OBSERVATIONS

BACKGROUND

This disclosure relates to smart-home environments. In particular, this disclosure relates to generation and/or distribution of device-implementable occupant policies for smart-device environments.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

People interact with a number of different electronic devices on a daily basis. In a home setting, for example, a person may interact with smart thermostats, lighting systems, alarm systems, entertainment systems, and a variety of other electronic devices. Unfortunately, the usefulness of these devices often times limited to basic and/or particular pre-determined tasks associated with the device.

As society advances, households within the society may become increasingly diverse, having varied household norms, procedures, and rules. Unfortunately, because so-called smart devices have traditionally been designed with pre-determined tasks and/or functionalities, comparatively fewer advances have been made regarding using these devices in diverse or evolving households or in the context of diverse or evolving household norms, procedures, and rules.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

According to embodiments of this disclosure, a smart-home environment may be provided with smart-device environment policies that use smart-devices to monitor activities within a smart-device environment, report on these activities, and/or provide smart-device control based upon these activities.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 39 is a flow diagram illustrating a process for detecting access to undesirable substances, in accordance with an embodiment;

FIG. 40 is a flow diagram illustrating a process for detecting chore completion status, in accordance with an embodiment;

FIG. 41 is a flow diagram illustrating a process for monitoring medical symptoms, in accordance with an embodiment;

FIG. 42 is a flow diagram illustrating a process for situational monitoring, in accordance with an embodiment;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure relate to smart-device environments. In particular, a smart-device environment may be provided with and/or create one or more environment policies. These policies may be used to report characteristics, attributes, etc. of the environment and/or occupants of the environment. Further, these policies may be used to facilitate control of one or more smart-devices within the environment, based upon one or more conditions defined in the policies.

Smart Device in Smart Home Environment

Figure 1:
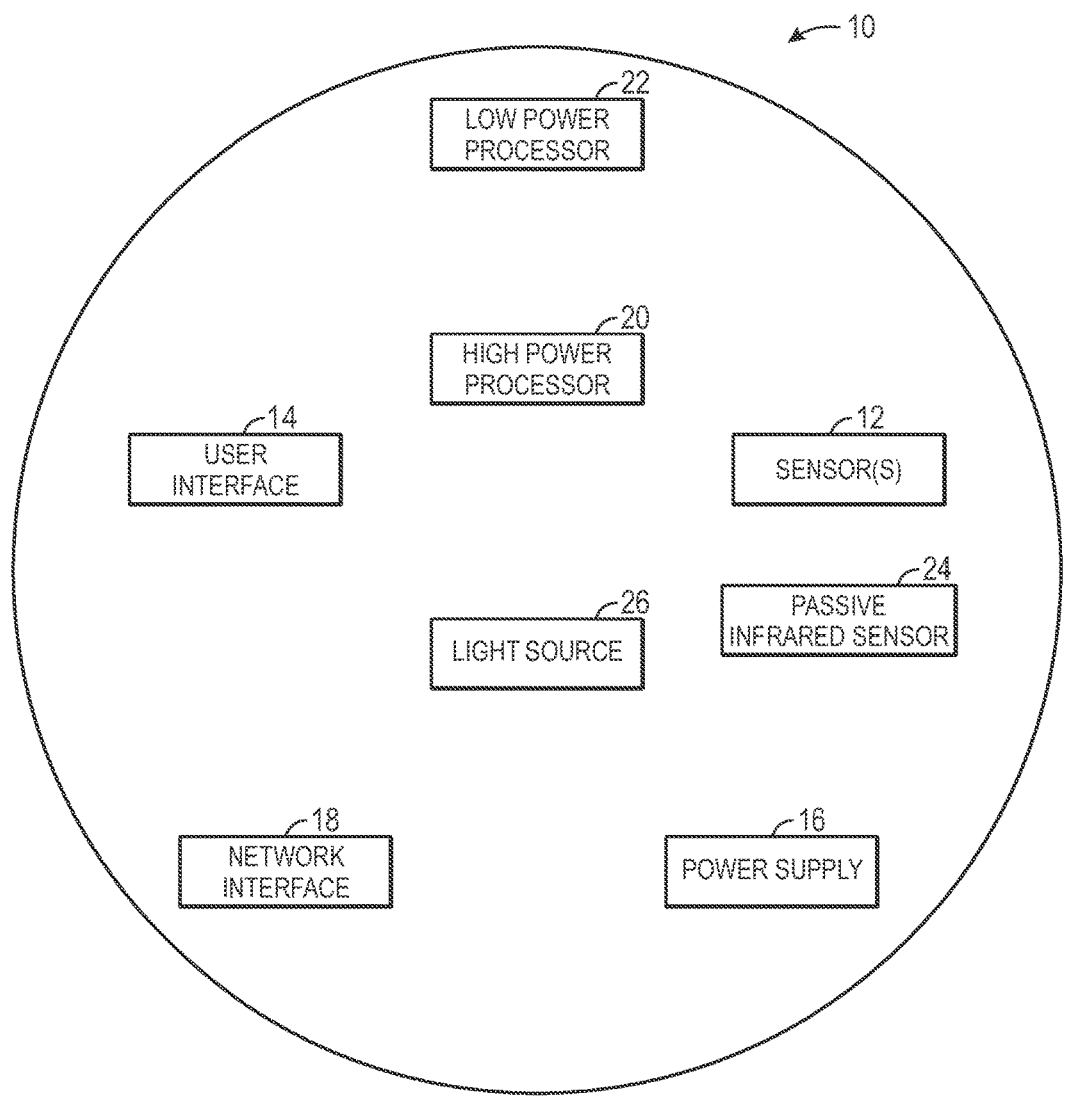
FIG. 1 is a block diagram of a smart home device, in accordance with an embodiment.

By way of introduction, FIG. 1 illustrates an example of a general device 10 that may that may be disposed within a building environment. In one embodiment, the device 10 may include one or more sensors 12, a user-interface component 14, a power supply 16 (e.g., including a power connection and/or battery), a network interface 18 (which may be wired and/or wireless, and if wireless may comprise a single radio according to a single wireless protocol or multiple radios according to multiple different wireless protocols), a high-power processor 20, a low-power processor 22, a passive infrared (PIR) sensor 24, a light source 26, and the like.

The sensors 12, in certain embodiments, may detect various properties such as acceleration, temperature, humidity, water, supplied power, proximity, external motion, device motion, sound signals, ultrasound signals, light signals, fire, smoke, carbon monoxide or other gas, global-positioning-satellite (GPS) signals, radio-frequency (RF), other electromagnetic signals or fields, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s) or radiofrequency identification detector(s). While FIG. 1 illustrates an embodiment with two sensor blocks, many embodiments may include as few as a single sensor, or may include multiple sensor blocks each containing one or more sensors, up to and including multiple blocks each containing entire arrays of sensors. In some instances, the device 10 may include one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives, smart-operation objectives, individual-component objectives as part of a larger home automation system or functionality, or any of a variety of other objectives.

One or more user-interface components 14 in the device 10 may receive input from the user and/or present information to the user. The received input may be used to determine a setting. In certain embodiments, the user-interface components may include a mechanical or virtual component that responds to the user's motion. For example, the user can mechanically move a sliding component (e.g., along a vertical or horizontal track) or rotate a rotatable ring (e.g., along a circular track), or the user's motion along a touchpad may be detected. Such motions may correspond to a setting adjustment, which can be determined based on an absolute position of a user-interface component 14 or based on a displacement of a user-interface components 14 (e.g., adjusting a set point temperature by 1 degree F. for every 10° rotation of a rotatable-ring component). Physically and virtually movable user-interface components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-interface component may be associated with a magnitude of a setting adjustment, such that a user may dramatically alter a setting with a large movement or finely tune a setting with a small movement.

The user-interface components 14 may also include one or more buttons (e.g., up and down buttons), a keypad, a number pad, a switch, a microphone, and/or a camera (e.g., to detect gestures). In one embodiment, the user-interface component 14 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-interface component 14 may include a camera that may detect gestures (e.g., to indicate that a power or alarm state of a device is to be changed). In some instances, the device 10 may have one primary input component, which may be used to set a plurality of types of settings. The user-interface components 14 may also be configured to present information to a user via, e.g., a visual display (e.g., a thin-film-transistor display or organic light-emitting-diode display) and/or an audio speaker.

The power-supply component 16 may include a power connection and/or a local battery. For example, the power connection may connect the device 10 to a power source such as a line voltage source and/or an on-board power generating component, such as solar power generation components, other power harvesting components, or the like. In some instances, an AC power source can be used to repeatedly charge a (e.g., rechargeable) local battery, such that the battery may be used later to supply power to the device 10 when the AC power source is not available, or to supplement power to the device 10 when instantaneous power requirements exceed that which can be provided by the AC power source or by local AC power conversion circuitry.

The network interface 18 may include a component that enables the device 10 to communicate between devices. As such, the network interface 18 may enable the device 10 to communicate with other devices 10 via a wired or wireless network. The network interface 18 may include a wireless card or some other transceiver connection to facilitate this communication. The network interface 18 may incorporate one or more of a plurality of standard or proprietary protocols including, but not limited to, Wi-Fi, Zigbee, Z-Wave, or Thread. One particularly advantageous protocol for implementation by the network interface 18 is the Thread protocol, promulgated by the Thread Group and including features of 802.15.4, IETF IPv6, and 6LoWPAN protocols.

The high-power processor 20 and the low-power processor 22 may support one or more of a variety of different device functionalities. As such, the high-power processor 20 and the low-power processor 22 may each include one or more processors configured and programmed to carry out and/or cause to be carried out one or more of the functionalities described herein. In one embodiment, the high-power processor 20 and the low-power processor 22 may include general-purpose processors carrying out computer code stored in local memory (e.g., flash memory, hard drive, random access memory), special-purpose processors or application-specific integrated circuits, combinations thereof, and/or using other types of hardware/firmware/software processing platforms. In certain embodiments, the high-power processor 20 may execute computationally intensive operations such as operating the user-interface component 14 and the like. The low-power processor 22, on the other hand, may manage less complex processes such as detecting a hazard or temperature from the sensor 12. In one embodiment that is particularly advantageous for battery-only or other power-constrained environments, the high-power processor 20 may be maintained in a sleep state most of the time, and the low-power processor may be used to wake or initialize the high-power processor for intervals when computationally intensive processes are required.

By way of example, the high-power processor 20 and the low-power processor 22 may detect when a location (e.g., a house or room) is occupied (i.e., includes a presence of a human), up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an internet protocol (IP) address of a received signal, detecting operation of one or more devices within a time window, or the like. Moreover, the high-power processor 20 and the low-power processor 22 may include image recognition technology to identify particular occupants or objects.

In certain embodiments, the high-power processor 20 and the low-power processor 22 may detect the presence of a human using the PIR sensor 24. The PIR sensor 24 may be a passive infrared sensor that measures infrared (IR) radiation emitted from or reflected by objects in its field of view.

In some instances, the high-power processor 20 may predict desirable settings and/or implement those settings. For example, based on the presence detection, the high-power processor 20 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the high-power processor 20 may initiate an audio or visual indicator of where the person, animal or object is or may initiate an alarm or security feature if an unrecognized person is detected under certain conditions (e.g., at night or when lights are off).

In some embodiments, multiple instances of the device 10 (which may be similar to or different than each other) may interact with each other such that events detected by a first device influences actions of a second device. For example, a first device can detect that a user has entered into a garage (e.g., by detecting motion in the garage, detecting a change in light in the garage or detecting opening of the garage door). The first device can transmit this information to a second device via the network interface 18, such that the second device can, e.g., adjust a home temperature setting, a light setting, a music setting, and/or a security-alarm setting. As another example, a first device can detect a user approaching a front door (e.g., by detecting motion or sudden light pattern changes). The first device may, e.g., cause a general audio or visual signal to be presented (e.g., such as sounding of a doorbell) or cause a location-specific audio or visual signal to be presented (e.g., to announce the visitor's presence within a room that a user is occupying).

In addition to detecting various types of events, the device 10 may include a light source 26 that may illuminate when a living being, such as a human, is detected as approaching. The light source 26 may include any type of light source such as one or more light-emitting diodes or the like. The light source 26 may be communicatively coupled to the high-power processor 20 and the low-power processor 22, which may provide a signal to cause the light source 26 to illuminate.

Figure 2:
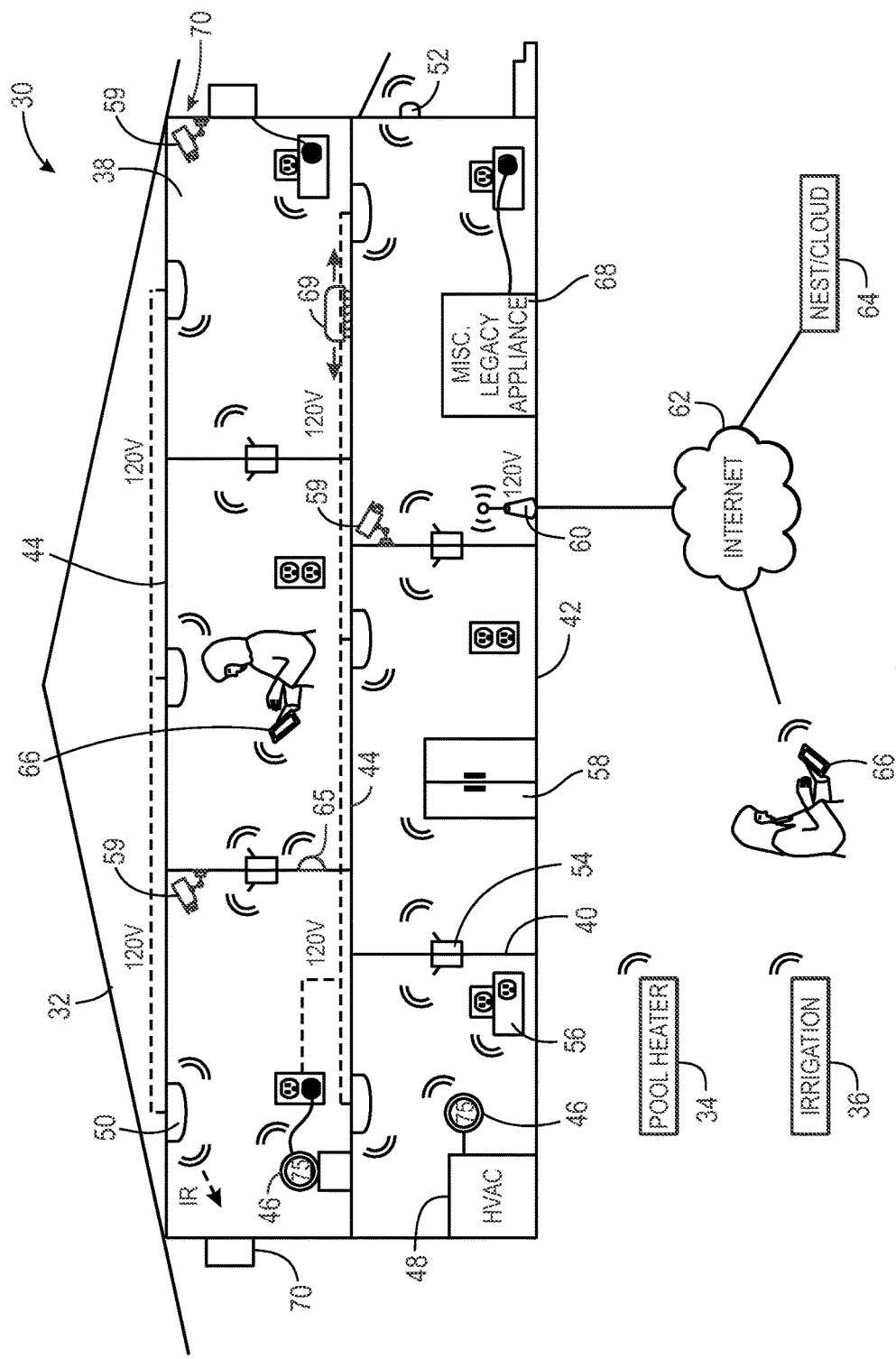
FIG. 2 illustrates a connected smart home or smart device environment that includes a number of smart home devices, in accordance with one or more embodiments.

Keeping the foregoing in mind, FIG. 2 illustrates an example of a smart-device environment 30 within which one or more of the devices 10 of FIG. 1 and within which one or more of the methods, systems, services, and/or computer program products described further herein can be applicable. The depicted smart-device environment 30 includes a structure 32, which can include, e.g., a house, office building, garage, or mobile home. It will be appreciated that devices can also be integrated into a smart-device environment 30 that does not include an entire structure 32, such as an apartment, condominium, or office space. Further, the smart home environment can control and/or be coupled to devices outside of the actual structure 32. Indeed, several devices in the smart home environment need not physically be within the structure 32 at all. For example, a device controlling a pool heater or irrigation system can be located outside of the structure 32.

The depicted structure 32 includes a plurality of rooms 38, separated at least partly from each other via walls 40. The walls 40 can include interior walls or exterior walls. Each room can further include a floor 42 and a ceiling 44. Devices can be mounted on, integrated with, and/or supported by a wall 40, floor 42 or ceiling 44.

In some embodiments, the smart-device environment 30 of FIG. 2 includes a plurality of devices 10, including intelligent, multi-sensing, network-connected devices, that can integrate seamlessly with each other and/or with a central server or a cloud-computing system to provide any of a variety of useful smart-home objectives. The smart-device environment 30 may include one or more intelligent, multi-sensing, network-connected thermostats 46 (hereinafter referred to as "smart thermostats 46"), one or more intelligent, network-connected, multi-sensing hazard detection units 50 (hereinafter referred to as "smart hazard detectors 50"), and one or more intelligent, multi-sensing, network-connected entryway interface devices 52 (hereinafter referred to as "smart doorbells 52"). According to embodiments, the smart thermostat 46 may include a Nest Learning Thermostat from Nest Labs, Inc., among others. Alone or in combination with each other and/or with one or more other temperature and/or humidity sensors of the smart home, the smart thermostats 46 detect ambient climate characteristics (e.g., temperature and/or humidity) and control an HVAC system 48 accordingly.

The smart hazard detector 50 may detect the presence of a hazardous substance or a substance indicative of a hazardous substance (e.g., smoke, fire, or carbon monoxide). The smart hazard detector 50 may include a Nest Protect Smoke+CO Alarm that may include sensors 12 such as smoke sensors, carbon monoxide sensors, and the like. As such, the hazard detector 50 may determine when smoke, fire, or carbon monoxide may be present within the building.

The smart doorbell 52 may detect a person's approach to or departure from a location (e.g., an outer door), provide doorbell functionality, announce a person's approach or departure via audio or visual means, or control settings on a security system (e.g., to activate or deactivate the security system when occupants go and come). The smart doorbell 52 may interact with other devices 10 based on whether someone has approached or entered the smart-device environment 30.

In some embodiments, the smart-device environment 30 further includes one or more intelligent, multi-sensing, network-connected wall switches 54 (hereinafter referred to as "smart wall switches 54"), along with one or more intelligent, multi-sensing, network-connected wall plug interfaces 56 (hereinafter referred to as "smart wall plugs 56"). The smart wall switches 54 may detect ambient lighting conditions, detect room-occupancy states, and control an ON/OFF or dimming state of one or more lights. In some instances, smart wall switches 54 may also control a power state or speed of a fan, such as a ceiling fan. The smart wall plugs 56 may detect occupancy of a room or enclosure and control supply of power to one or more wall plugs (e.g., such that power is not supplied to the plug if nobody is at home).

Still further, in some embodiments, the device 10 within the smart-device environment 30 may further includes a plurality of intelligent, multi-sensing, network-connected appliances 58 (hereinafter referred to as "smart appliances 58"), such as refrigerators, stoves and/or ovens, televisions, washers, dryers, lights, stereos, intercom systems, garage-door openers, floor fans, ceiling fans, wall air conditioners, pool heaters, irrigation systems, security systems, cameras 59 (e.g., Nest Dropcams) and so forth. According to embodiments, the network-connected appliances 58 are made compatible with the smart-device environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 68, such as old conventional washer/dryers, refrigerators, and the like which can be controlled, albeit coarsely (ON/OFF), by virtue of the smart wall plugs 56. The smart-device environment 30 can further include a variety of partially communicating legacy appliances 70, such as infrared ("IR") controlled wall air conditioners or other IR-controlled devices, which can be controlled by IR signals provided by the smart hazard detectors 50 or the smart wall switches 54.

According to embodiments, the smart thermostats 46, the smart hazard detectors 50, the smart doorbells 52, the smart wall switches 54, the smart wall plugs 56, and other devices of the smart-device environment 30 are modular and can be incorporated into older and new houses. For example, the devices 10 are designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors 12, processors 28, user interfaces 14, the power supply 16, the network interface 18, and other functional components of the devices described above.

The smart-device environment 30 may also include communication with devices outside of the physical home but within a proximate geographical range of the home. For example, the smart-device environment 30 may include a pool heater controller 34 that communicates a current pool temperature to other devices within the smart-device environment 30 or receives commands for controlling the pool temperature. Similarly, the smart-device environment 30 may include an irrigation controller 36 that communicates information regarding irrigation systems within the smart-device environment 30 and/or receives control information for controlling such irrigation systems. According to embodiments, an algorithm is provided for considering the geographic location of the smart-device environment 30, such as based on the zip code or geographic coordinates of the home. The geographic information is then used to obtain data helpful for determining optimal times for watering, such data may include sun location information, temperature, dewpoint, soil type of the land on which the home is located, etc.

By virtue of network connectivity, one or more of the smart-home devices of FIG. 2 can further allow a user to interact with the device even if the user is not proximate to the device. For example, a user can communicate with a device using a computer (e.g., a desktop computer, laptop computer, or tablet) or other portable electronic device (e.g., a smartphone) 66. A web page or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

As discussed, users can control the smart thermostat and other smart devices in the smart-device environment 30 using a network-connected computer or portable electronic device 66. In some examples, some or all of the occupants (e.g., individuals who live in the home) can register their device 66 with the smart-device environment 30. Such registration can be made at a central server to authenticate the occupant and/or the device as being associated with the home and to give permission to the occupant to use the device to control the smart devices in the home. An occupant can use their registered device 66 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 66, the smart-device environment 30 may make inferences about which individuals live in the home and are therefore occupants and which devices 66 are associated with those individuals. As such, the smart-device environment "learns" who is an occupant and permits the devices 66 associated with those individuals to control the smart devices of the home.

In some instances, guests desire to control the smart devices. For example, the smart-device environment may receive communication from an unregistered mobile device of an individual inside of the home, where said individual is not recognized as an occupant of the home. Further, for example, a smart-device environment may receive communication from a mobile device of an individual who is known to be, or who is registered as, a guest.

According to embodiments, a guest-layer of controls can be provided to guests of the smart-device environment 30. The guest-layer of controls gives guests access to basic controls (e.g., a judicially selected subset of features of the smart devices), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices. For example, the guest layer of controls will not permit the guest to adjust the heat-pump lockout temperature.

As described below, the smart thermostat 46 and other smart devices "learn" by observing occupant behavior. For example, the smart thermostat learns occupants' preferred temperature set-points for mornings and evenings, and it learns when the occupants are asleep or awake, as well as when the occupants are typically away or at home, for example. According to embodiments, when a guest controls the smart devices, such as the smart thermostat, the smart devices do not "learn" from the guest. This prevents the guest's adjustments and controls from affecting the learned preferences of the occupants.

According to some embodiments, a smart television remote control is provided. The smart remote control recognizes occupants by thumbprint, visual identification, RFID, etc., and it recognizes a user as a guest or as someone belonging to a particular class having limited control and access (e.g., child). Upon recognizing the user as a guest or someone belonging to a limited class, the smart remote control only permits that user to view a subset of channels and to make limited adjustments to the settings of the television and other devices. For example, a guest cannot adjust the digital video recorder (DVR) settings, and a child is limited to viewing child-appropriate programming.

According to some embodiments, similar controls are provided for other instruments, utilities, and devices in the house. For example, sinks, bathtubs, and showers can be controlled by smart spigots that recognize users as guests or as children and therefore prevent water from exceeding a designated temperature that is considered safe.

In some embodiments, in addition to containing processing and sensing capabilities, each of the devices 34, 36, 46, 50, 52, 54, 56, and 58 (collectively referred to as "the smart devices") is capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.).

According to embodiments, all or some of the smart devices can serve as wireless or wired repeaters, and the smart devices can be configured to form a mesh network for reliable, robust, fault-tolerant device-to-device and device-to-cloud communications. For example, a first one of the smart devices can communicate with a second one of the smart device via a wireless router 60. The smart devices can further communicate with each other via a connection to a network, such as the Internet 62. Through the Internet 62, the smart devices can communicate with a central server or a cloud-computing system 64. The central server or cloud-computing system 64 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from the central server or cloud-computing system 64 to devices (e.g., when available, when purchased, or at routine intervals). According to embodiments, as described further in the commonly assigned WO2014047501A1, which is incorporated by reference herein, the smart devices may combine to create a mesh network of spokesman and low-power nodes in the smart-device environment 30, where some of the smart devices are "spokesman" nodes and others are "low-powered" nodes.

An example of a low-power node is a smart night light 65. In addition to housing a light source, the smart night light 65 houses an occupancy sensor, such as an ultrasonic or passive IR sensor, and an ambient light sensor, such as a photoresistor or a single-pixel sensor that measures light in the room. In some embodiments, the smart night light 65 is configured to activate the light source when its ambient light sensor detects that the room is dark and when its occupancy sensor detects that someone is in the room. In other embodiments, the smart night light 65 is simply configured to activate the light source when its ambient light sensor detects that the room is dark. Further, according to embodiments, the smart night light 65 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-device environment 30 as well as over the Internet 62 to the central server or cloud-computing system 64.

In some embodiments, the low-powered and spokesman nodes (e.g., devices 46, 50, 52, 54, 56, 58, and 65) can function as "tripwires" for an alarm system in the smart-device environment. For example, in the event a perpetrator circumvents detection by alarm sensors located at windows, doors, and other entry points of the smart-device environment 30, the alarm could be triggered upon receiving an occupancy, motion, heat, sound, etc. message from one or more of the low-powered and spokesman nodes in the mesh network. For example, upon receiving a message from a smart night light 65 indicating the presence of a person, the central server or cloud-computing system 64 or some other device could trigger an alarm, provided the alarm is armed at the time of detection. Thus, the alarm system could be enhanced by various low-powered and spokesman nodes located throughout the smart-device environment 30. In this example, a user could enhance the security of the smart-device environment 30 by buying and installing extra smart nightlights 65.

Further included and illustrated in the smart-device environment 30 of FIG. 2 are service robots 69 each configured to carry out, in an autonomous manner, any of a variety of household tasks. For some embodiments, the service robots 69 can be respectively configured to perform floor sweeping, floor washing, etc. in a manner similar to that of known commercially available devices such as the ROOMBA™ and SCOOBA™ products sold by iRobot, Inc. of Bedford, Mass.

Figure 3:
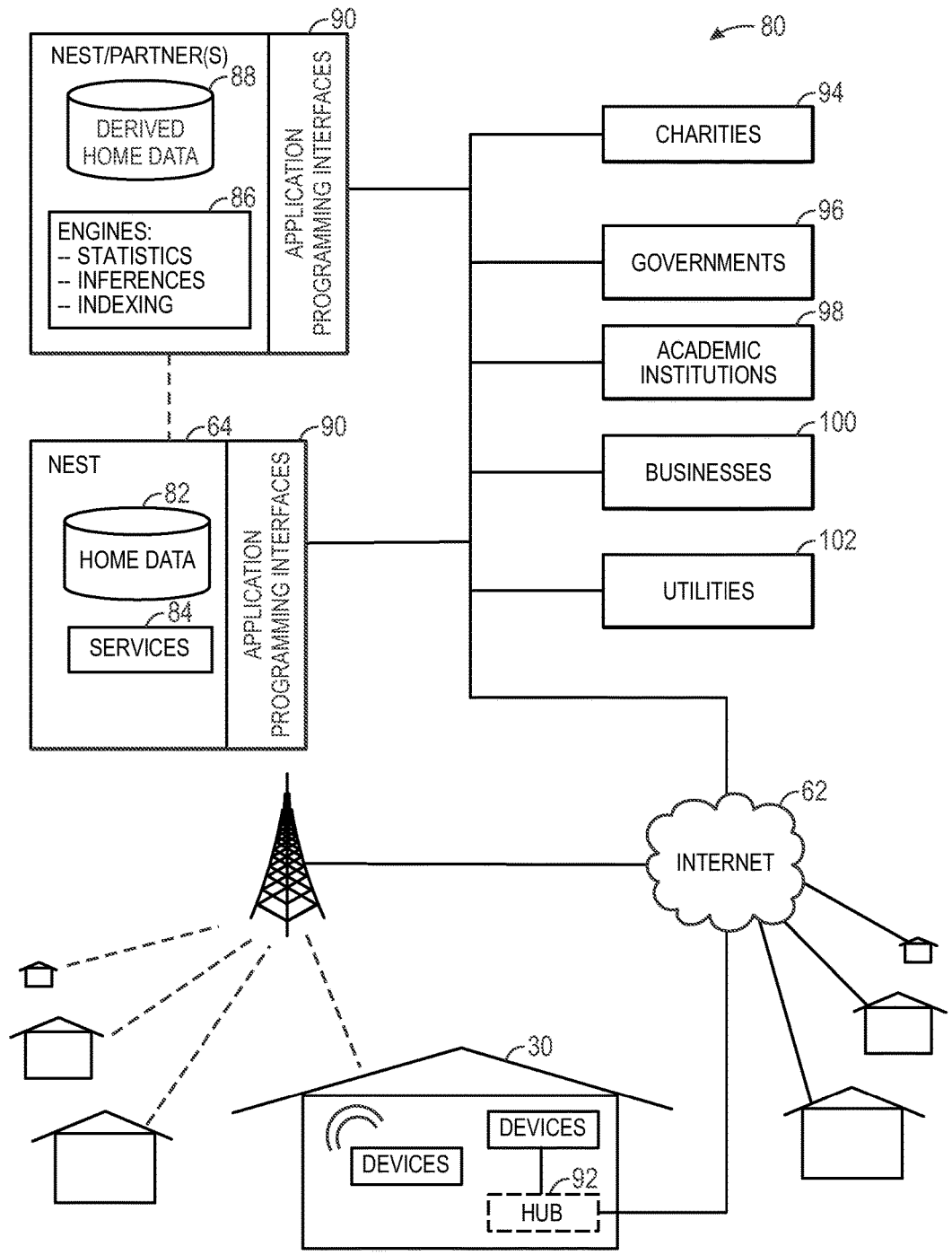
FIG. 3 illustrates a network-level view of an extensible devices and services platform with which the smart-home environment of FIG. 2 can be integrated, according to an embodiment.

FIG. 3 illustrates a network-level view of an extensible devices and services platform 80 with which the smart-home environment of FIG. 2 can be integrated, according to an embodiment. The extensible devices and services platform 80 can be concentrated at a single server or distributed among several different computing entities without limitation with respect to the smart-device environment 30. The extensible devices and services platform 80 may include a processing engine 86, which may include engines that receive data from devices of smart-device environments (e.g., via the Internet or a hubbed network), to index the data, to analyze the data and/or to generate statistics based on the analysis or as part of the analysis. The analyzed data can be stored as derived home data 88.

Results of the analysis or statistics can thereafter be transmitted back to the device that provided home data used to derive the results, to other devices, to a server providing a web page to a user of the device, or to other non-device entities. For example, use statistics, use statistics relative to use of other devices, use patterns, and/or statistics summarizing sensor readings can be generated by the processing engine 86 and transmitted. The results or statistics can be provided via the Internet 62. In this manner, the processing engine 86 can be configured and programmed to derive a variety of useful information from the home data 82. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 86 can generate statistics about device usage across a population of devices and send the statistics to device users, service providers or other entities (e.g., that have requested or may have provided monetary compensation for the statistics).

Figure 4:
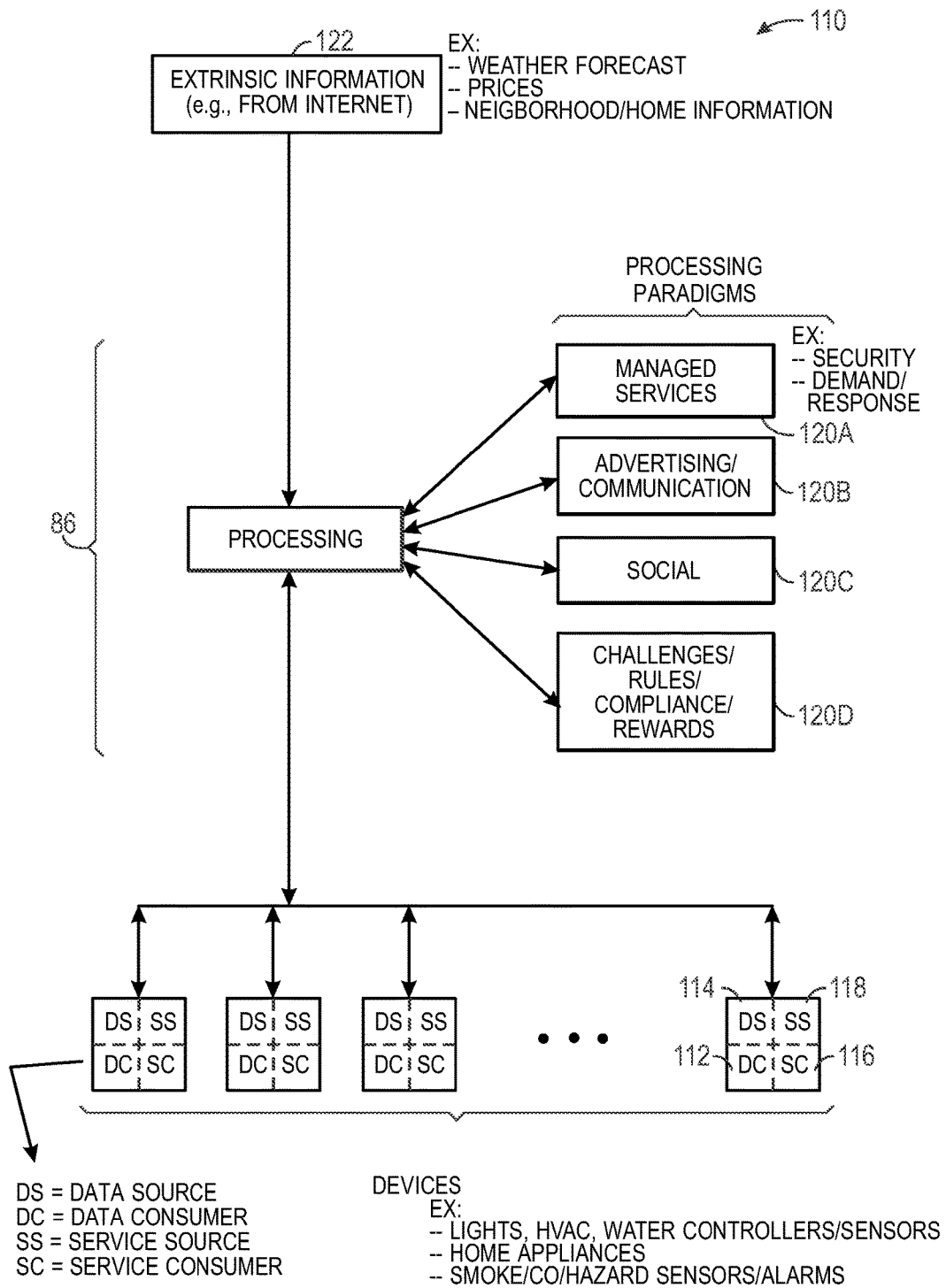
FIG. 4 illustrates an abstracted functional view of the extensible devices and services platform of FIG. 3, with reference to a processing engine as well as devices of the smart-home environment, according to an embodiment.

FIG. 4 illustrates an abstracted functional view 110 of the extensible devices and services platform 80 of FIG. 3, with particular reference to the processing engine 86 as well as devices, such as those of the smart-device environment 30 of FIG. 2. Even though devices situated in smart-device environments will have an endless variety of different individual capabilities and limitations, they can all be thought of as sharing common characteristics in that each of them is a data consumer 112 (DC), a data source 114 (DS), a services consumer 116 (SC), and a services source 118 (SS). Advantageously, in addition to providing the essential control information needed for the devices to achieve their local and immediate objectives, the extensible devices and services platform 80 can also be configured to harness the large amount of data that is flowing out of these devices. In addition to enhancing or optimizing the actual operation of the devices themselves with respect to their immediate functions, the extensible devices and services platform 80 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 4 shows processing engine 86 as including a number of paradigms 120. Processing engine 86 can include a managed services paradigm 120*a* that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 86 can further include an advertising/communication paradigm 120*b* that estimates characteristics (e.g., demographic information), desires and/or products of interest of a user based on device usage. Services, promotions, products or upgrades can then be offered or automatically provided to the user. Processing engine 86 can further include a social paradigm 120*c* that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 46 to reduce their power bills.

The processing engine 86 can include a challenges/rules/compliance/rewards paradigm 120*d* that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 86 can integrate or otherwise utilize extrinsic information 122 from extrinsic sources to improve the functioning of one or more processing paradigms. Extrinsic information 122 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

Household Policy Provision

Figure 5:
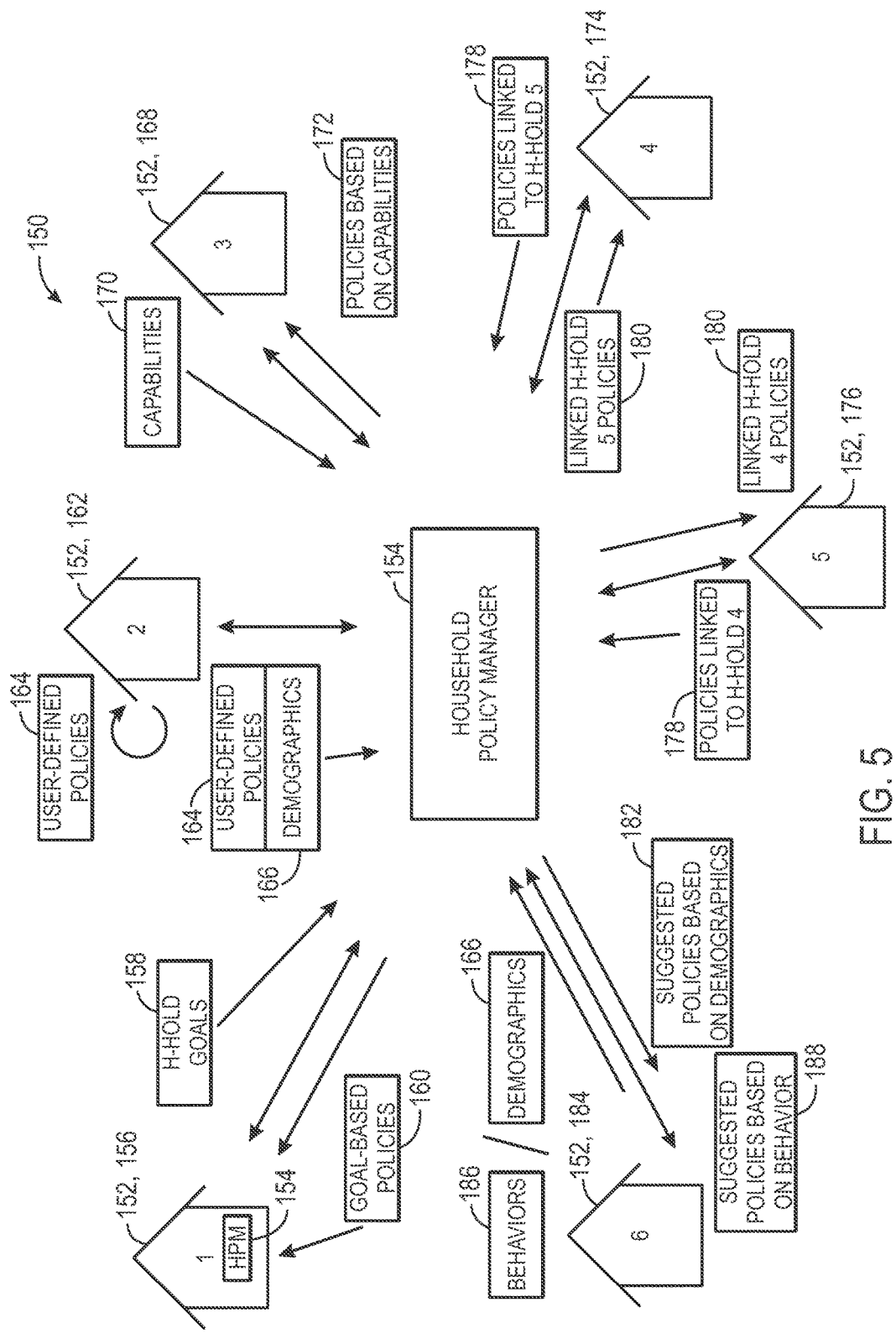
FIG. 5 is a schematic drawing of a plurality of smart-device environments, in accordance with an embodiment.

Having now discussed the smart-device or smart-home environment, the discussion now turns to sourcing policy that may be executed by smart devices within the smart-device environment. In some embodiments such execution can be carried out by individual smart devices acting alone, while in other embodiments such execution can be carried out by self-orchestrating groupings (static or dynamic) of smart devices acting in concert, while in still other embodiments such execution can be carried out by individual smart devices or groups of smart devices acting under the orchestration of a central server, such as a cloud-based computing system located remotely from the home. FIG. 5 is a schematic drawing of an environment 150 of household policy equipped homes 152, in accordance with an embodiment. Policies may reach household policy equipped homes 152 in a variety of manners. For example, a household policy manager 154 may be responsible for supplying policies to homes 152 based upon: household goals, household-defined policies, smart-device capabilities within the home 152, shared policies among linked homes, household demographics, etc. While FIG. 5 illustrates a household policy manager 154 external to each of the homes 152, the household policy manager 154 may be local to each house 152, or may work in conjunction with other household policy managers 154 that are all local to homes 152, all remote from the homes 152, or are a combination of local and remote policy managers 154. For example, home 156 includes a local household policy manager 154 that may interact with a remote household policy manager 154.

In the illustrated embodiment, Home 156 is set up to receive goal-based policies. For example, as will be discussed in more detail below, a goal might be to "Spend less time on electronic devices" or "Use 5% less energy each month for the next 3 months." The household goals 158 are provided to the household policy manager 154, which supplies goal-based policies 160 for execution within the home 156. In some embodiments, the household goals 158 may be obtained by providing a survey to one or more household members (e.g., via a graphical user interface). In some embodiments, household goals may be suggested by a computer (e.g., the household policy manager 154) based upon observed behaviors of members of the household, based upon certain inputs provided from smart devices in the home, based upon certain inputs from remote vendors/facilitators/regulators/etc., or any combination thereof. These suggested household goals may result in particular selected household goals 158.

FIG. 5 illustrates that Home 162 is set up to receive user-defined policies 164. For example, there may be a graphical user interface within home 162 that enables members of the household to create policies personalized for the home 162. In some embodiments, these policies may be shared with a household policy manager 154 communicatively coupled with a plurality of policy equipped homes 152, such that the user-defined policies 164 may be shared with other policy equipped homes 152. For example, in the current embodiment, the user-defined policies 164 are provided to the household policy manager 154 with household demographic information 166 (e.g., number of household members, ages of household members, activity patterns of household members, etc.). By receiving both the user-defined policies 164 and the demographic information 166, the household policy manager 154 may provide/suggest the user-defined policies 164 to other policy equipped homes 152 having similar demographic information 166.

In some embodiments, policies may be provided for execution at the policy equipped homes 152 based upon capabilities of devices within the home 152. For example, home 168 is set up to receive policies based upon capabilities within the home 168. The capabilities 170, such as: "this home is able to detect occupancy at a dining room table" or "this home is able to hear audio in the living room," are provided to the household policy manager 154. The household policy manager 154 may determine which of a plurality of available policies are available for implementation at the home 168 and provide this list of capability-based policies 172 to the home 168. A policy administrator within the home 168 may select policies from the capability-based polices 172 to implement within the home 168.

In some embodiments, household policies may be linked. In other words, there may be a relationship between two policy equipped homes 152 resulting in execution of linked rules within at least one of the policy equipped homes 152. For example, in a situation where there is a shared custody agreement regarding children between two policy equipped homes 152, household policies may be transferred from one home 152 to another home 152, such that the children's policies are implemented at either home. Further, in some embodiments, the linking may include a master-slave arrangement, where one house 152 controls the implemented policies of another house 152. For example, in one example, an adult child may be tasked with caring for an elderly parent in another house 152. In this example, the adult child may have authority over the policies implemented at the elderly parent's home 152. For example, the adult child may have authority to cause execution at the elderly parent's house a policy for presenting a reminder to take medications at a particular time of day. In the current example, home 174 is linked with home 176. Linked policies 178 to be implemented at the respective linked home are provided to the household policy manager 154, where they are provided as policies 180 to be implemented in the linked environment.

As discussed above, in some embodiments, household demographics may be used to determine particular policies for a household. For example, different policies may be desirable for a house with small children than a household of all adults. Demographic information may include, for example: occupant information such as: number of occupants, gender of occupants, age of occupants, ethnicity of occupants, etc. The demographic information 166 may be provided to the household policy manager 154, which may provide policies 182 based upon the demographics. For example, as mentioned above, user-defined policies 164 associated with matching demographics 166 may be provided to house 184.

Additionally, household behavioral patterns 186 may be used to provide policies. Observed behavioral patterns 186 may be provided to the household policy manager 154. The household policy manager 154 may determine policies that correspond to the behavioral patterns and provide suggested policies 188 based on the behaviors 186. For example, one policy may arise from an observation that a household occupant attempts to reach their place of employment at 8:00 AM each work day. Based upon this detected behavioral pattern 186, a policy may be provided to dynamically adjust an alarm clock wait time based upon traffic delays, etc.

Any number of policy provision schemes may be used alone or in combination to provide policies to a household policy equipped home 152. For example, while home 156 is illustrated as being provided with policies based upon household goals 158, the provided policies could further be limited and/or supplemented based upon other criteria (e.g., limited based upon capabilities 170 of home 156 and/or supplemented by behavior-based policies 188 of the home 156).

Further, policy provisioning and implementation may be provided based upon varying degrees of efficiency versus convenience and/or varying degrees of leniency. For example, some users may wish to tightly control household policy aspects while others would rather loosely control policy implementation. In some embodiments, the household policy manager 154 may enable a user to confirm and/or set each aspect of a policy prior to implementation. Alternatively, the household policy manager 154 may enable automatic policy implementation without user control and/or confirmation. In some embodiments, a hybrid override mode may be implemented that enables the user to halt implementation of an automatically implemented policy and/or override some or all aspects of an implemented policy while maintaining execution of the policy.

Figure 6:
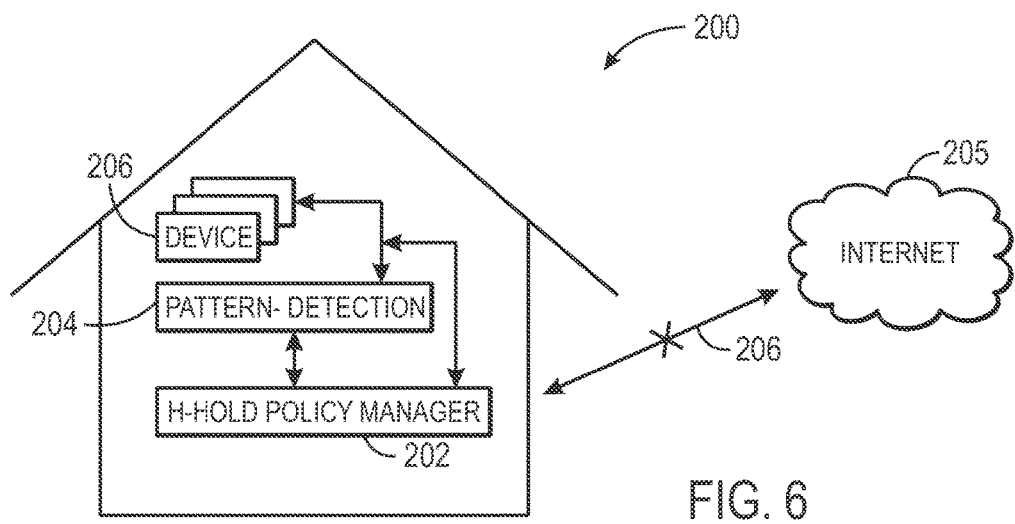
FIG. 6 is a schematic drawing of a smart-home having a household policy manager that does not communicate over an external network, in accordance with an embodiment.

FIG. 6 is a schematic drawing of a smart-home 200 having a local household policy manager 202. In the current embodiment, the local household policy manager 202 does not communicate over an external network (e.g., the Internet 205), as illustrated by the communications line 206. Instead, the household policy manager 202 may include a policy library containing a plurality of policies and/or an input/output interface, such as a universal serial bus port and/or storage card interface that enables stored policies to be provided to the household policy manager 202. For privacy concerns, in some embodiments, it may be desirable to block external communications from the household policy manager 202. This may alleviate data privacy concerns regarding household data.

Further, as mentioned above, detected patterns may be useful in selecting policies for implementation within the home 200. The house 200 is preferably equipped with pattern detection circuitry 204, which may observe patterns associated with the home 200. For example, the pattern detection circuitry 204 may mine data from smart devices 206 of the home 200 to determine particular usage pattern of the devices 206 and/or household activity patterns. The pattern detection circuitry 204 may provide discerned patterns to the household policy manager, which may select and/or suggest policies corresponding to the patterns for implementation.

As will be discussed in more detail below, in one embodiment, the pattern detection circuitry 204 may detect that water is typically left on when a member of the household brushes their teeth. This pattern may be provided to the household policy manager 202, which may suggest and/or automatically implement a policy to provide notification to members of the household when they leave the water on when a member of the household brushes their teeth.

Capability-Based Policy Provision

Figure 7:
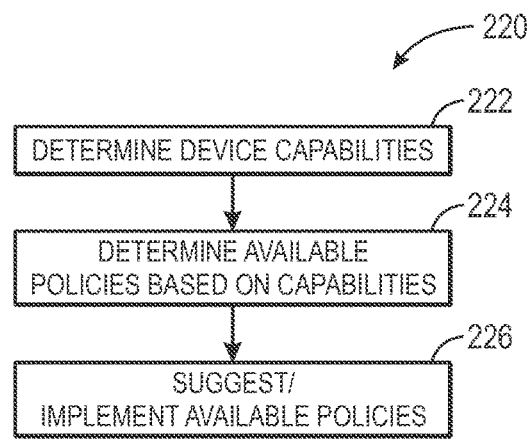
FIG. 7 is a flow diagram illustrating a process for implementing policies based upon capabilities of smart-devices within the household, in accordance with an embodiment.
Figure 8:
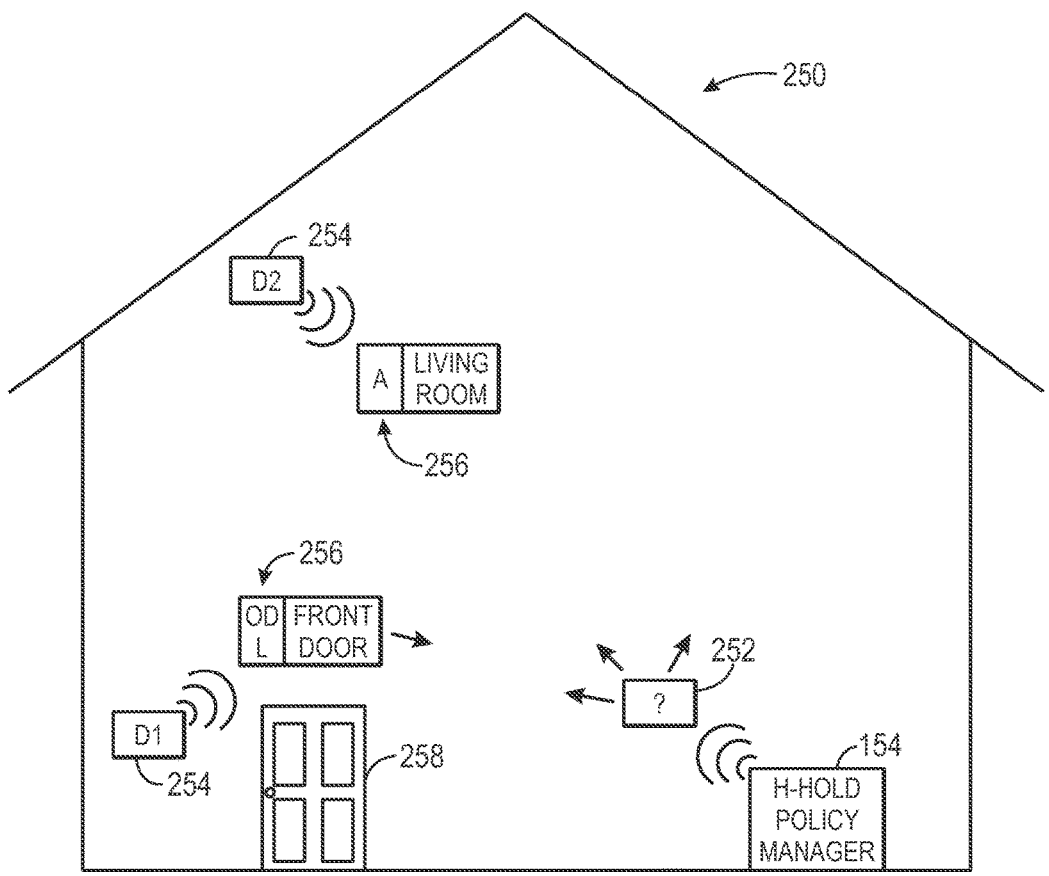
FIG. 8 is a schematic drawing of a household system capable of implementing the process of FIG. 7, in accordance with an embodiment.

As previously discussed in FIG. 5, some policy equipped homes 152 may be provided/suggested policies based upon the capabilities of the smart devices within the policy equipped home 152. FIG. 7 is a flow diagram illustrating a process 220 for implementing and/or suggesting policies based upon capabilities of smart-devices within the household, in accordance with an embodiment. Further, FIG. 8 is a schematic drawing of a household 250 capable of implementing the process 220 of FIG. 7. FIGS. 7 and 8 will be discussed together.

The process 220 begins by determining smart device capabilities within the home 250 (block 222). The capabilities may include basic functionalities and/or sensor types (e.g., see, smell, hear, and/or imaging sensor, volatile organic compound sensor, audio sensor, and the like) or the capabilities may be more complex (e.g., determine room occupancy from an infrared sensor). Further, the capabilities may include a location where the functionalities may be performed and/or where the sensors are located.

In one embodiment, the household policy manager 154 is able to provide a poll request 252 to smart devices 254 within the home 250. The smart devices 254 may provide a response 256 that defines the capabilities of the smart devices 254. For example, the smart device 254 "D1" may be a smart front-door lock. The smart device 254 "D1" may provide a response 256 representing that the smart device 254 "D1" can provide occupancy detection and door locking at a front door 258. Further, smart device 254 "D2" may be positioned in a living room and may include a speaker that is capable of alarming. Accordingly, the response 256 from the smart device 254 "D2" may represent that the smart device 254 "D2" can provide an alarm in the living room.

In other embodiments, the capabilities may be discerned by obtaining an inventory of the available smart devices 254 within the home 250. Once the inventory of available smart devices 254 is complete, an alternative source may be used to discern capabilities for the smart devices in the inventory based on their identities. For example, the household policy manager 154 may discern that smart device 254 "D1" and the smart device 254 "D2" are within the home 250. In one embodiment, this discerning can be carried out by having a user enter their UPC (Universal Product Code) information into a user interface. The household policy manager 154 may then obtain a listing of capabilities of these devices from a database (e.g., local to or remote from the household policy manager 154) based upon, for example, their UPC (Universal Product Code) information. In other embodiments, more automated methods for discernment can be carried out, such as by inquiry-response communications according to a standard protocol, such as a Thread or Weave Protocol, by automated image recognition (e.g., a monitoring camera can visually "see" that there is a particular smoke detector or service robot within a room), and so forth.

Once the capabilities of the devices are determined, available policies based upon the capabilities may be determined (block 224). For example, the household policy manager 154 may select a subset of one or more policies that may use the smart device capabilities from a superset of policies contained in a policy library.

In some embodiments, user-defined policies may be created using the available capabilities as inputs and/or outputs to the policy. For example, referring back to the home 250, a user-defined policy may be created through an interface, where the interface provides the alarming, the occupancy detection, and/or the locking functionalities as available inputs and/or outputs. Accordingly, an example of a user-defined policy might be: "When the occupancy detection functionality determines that someone is at the front door, provide an indication in the living room, via the alarm functionality."

Once the capability-based subset of policies is determined (e.g., a subset is selected from a policy library and/or user-defined policies are created), these policies may be provided as a suggestion to a member of the home 250 and/or may be automatically implemented (block 226). For example, as will be discussed in more detail below, the household policy manager 154 may begin monitoring data from the smart devices 254 and/or may begin controlling the smart devices 254.

Demographic-Based Policy Provision

Figure 9:
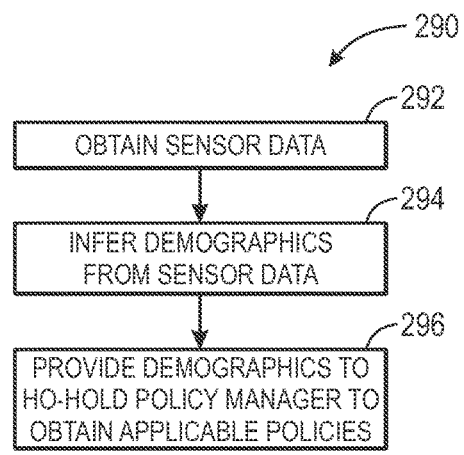
FIG. 9 is a flow diagram illustrating a process for obtaining policies based upon demographic information, in accordance with an embodiment.

As discussed in FIG. 5, demographics may be used to provide household policies. Demographics may include, for example, age, gender, education, marital status, socio-economic status, number in household, number in household under age 18, language usually spoken at home, region of residence, race, ethnicity, religious affiliation, rural vs. urban, etc. FIG. 9 is a flow diagram illustrating a process 290 for obtaining policies based upon demographic information, in accordance with an embodiment. Sensor data that may be indicative of a household demographic may be obtained (block 292). This sensor data may be analyzed to infer demographic information about a household (block 294). By way of example, a video monitoring camera placed in the kitchen of the home can perform image processing on several days or weeks worth of captured data to determine how many different individuals it sees on a regular basis, to establish how many occupants live in the house. Once the demographic information is known, the demographics may be used to select a subset of policies typically applicable for the inferred demographics.

Figure 10:
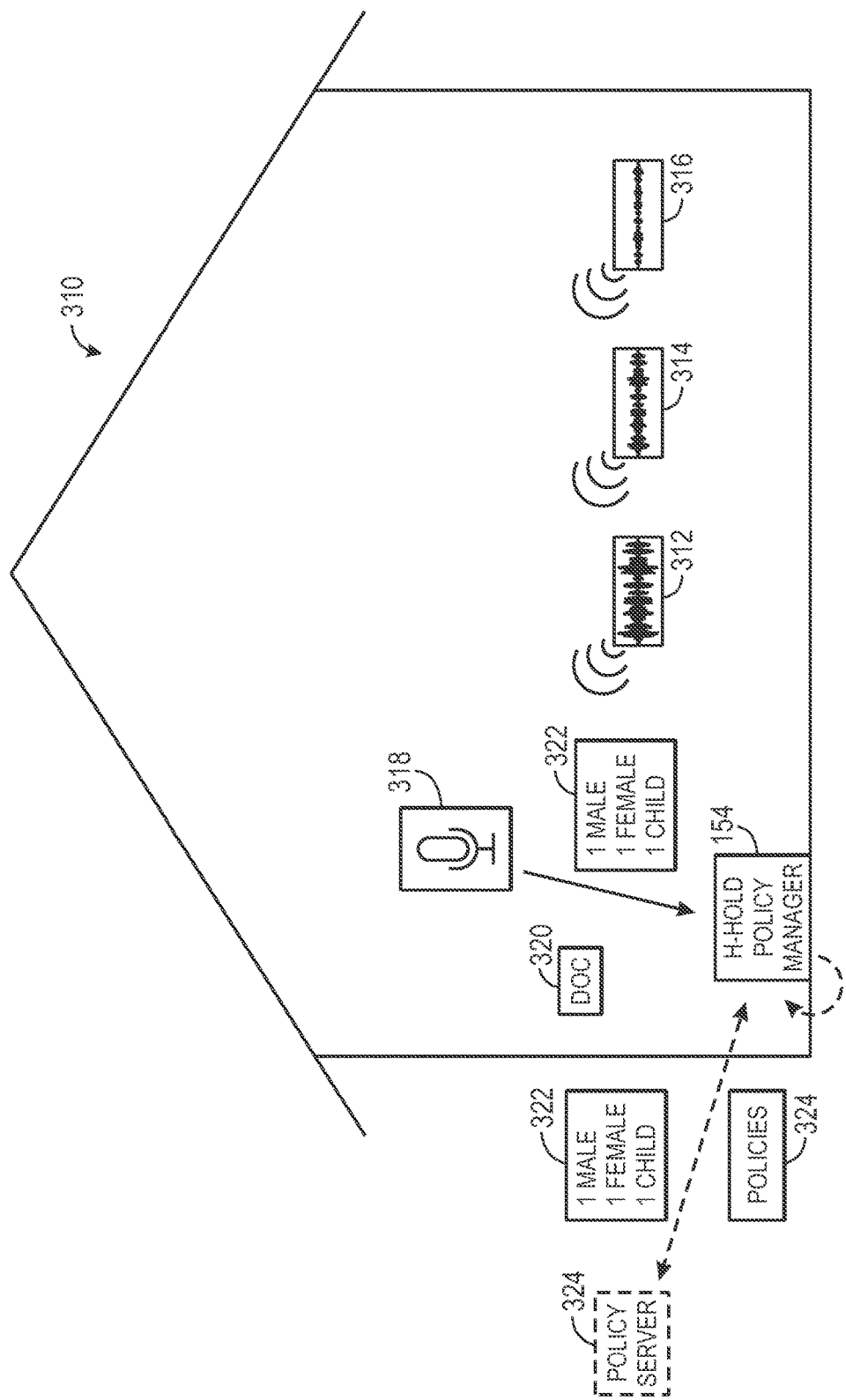
FIG. 10 is a schematic drawing illustrating a system that infers demographic information to obtain relevant household policies, in accordance with an embodiment.

FIG. 10 is a schematic drawing illustrating an example, in which a home 310 is equipped with a household policy manager 154 that infers demographic information to obtain relevant household policies, in accordance with an embodiment. In the illustrated embodiment, sensor data (e.g., audio signatures 312, 314, and 316) are obtained from a sensor (e.g., microphone 318. Demographic detection circuitry 320 may infer 322 that there is 1 adult male (e.g., based upon the audio signature 316 being ascribed to a relatively low-pitch voice signature), 1 adult female (e.g., based upon the audio signature 316 being ascribed to a relatively mid-range pitch voice signature), and 1 female child (e.g., based upon the audio signature 316 being ascribed to a relatively high-pitch voice signature). The demographic detection circuitry 320 may reside locally to the sensor (e.g., coupled to the microphone 318), may reside between the sensor and the household policy manager 154, and/or may reside at the household policy manager 154. Video data may optionally be used to confirm or to help arrive at such conclusions.

This demographic inference 322 may be used by the policy manager 154 to obtain policies 324 associated with the particular demographic 322. For example, in the current embodiment, the policy manager 154 may provide the demographic information 322 to an external policy service 324, which may return a subset of policies 324 associated with all or part of the demographics 322. In alternative embodiments, the selection of demographic-applicable policies 324 may be local to the home 310.

Figures 11, 12:
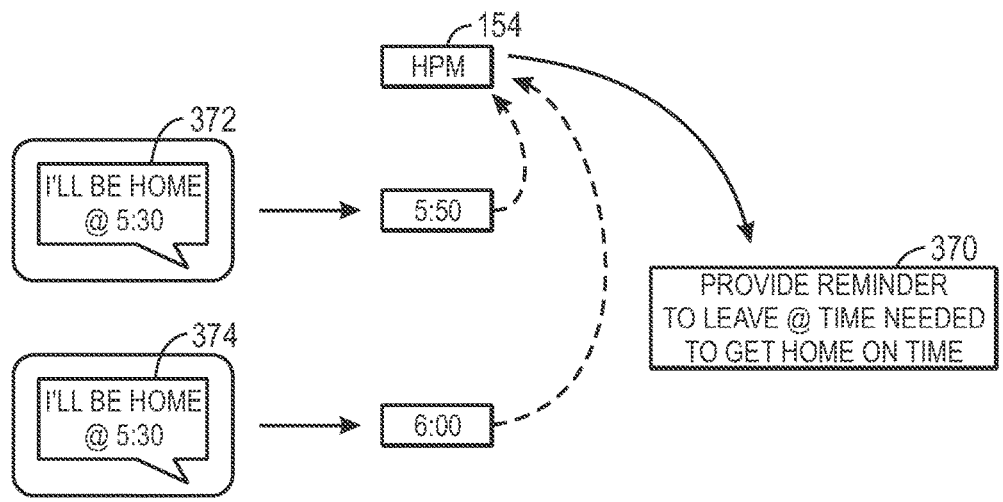
FIG. 11 is a schematic drawing of a graphical user interface for determining demographic information of a household, in accordance with an embodiment.
FIG. 12 is an schematic drawing illustrating an example of a pattern-based policy implementation, in accordance with an embodiment.

In some embodiments, demographic information may be obtained without inferring demographics based upon sensor data. FIG. 11 is a schematic drawing of a graphical user interface 350 for determining demographic information of a household, in accordance with an embodiment. The graphical user interface 350 may be provided, for example, on a smart device, such as a tablet computer, an alarm system display panel, etc. The graphical user interface may include any number of questions 352 regarding demographic information of the household. In some scenarios, the graphical user interface 350 may auto-populate demographic items that the demographic detection circuitry 320 has inferred, while allowing the user of the graphical user interface 350 to modify the demographic information.

Pattern-Based Policy Provision

Turning now to a discussion of pattern-based policy provision, FIG. 12 is an schematic drawing illustrating an example of a pattern-based policy implementation 370, in accordance with an embodiment. In the embodiment of FIG. 12, the household policy manager 154 (or other pattern detection circuitry) may detect a pattern. For example, in the current embodiment, text messages 372 and 374 may provide an indication of an estimated home arrival time for a member of the household (e.g., 5:30 PM) on different days. The member of the household may arrive after the estimated home arrival time on both days (e.g., 5:50 PM on the first day and 6:00 PM on the second day). Accordingly, the household policy manager 154 (or other pattern detection circuitry) may detect a tardiness pattern. Accordingly, this pattern may be used by the household policy manager 154 (or other policy provision service) to suggest a policy 370 based upon this pattern. For example, in FIG. 12, a policy 370 is suggested and/or automatically implemented to provide a text reminder to leave work at a time needed to get home by any subsequently text-messaged estimated home arrival time. By suggesting the policy 370 that provides a reminder, an inferred negative pattern may be averted in the future.

Household Awareness

Having discussed the manner in which household polices may reach the smart-device environment 30, the discussion now turns to obtaining relevant data from the smart devices 10 for implementing the policies.

Figure 13:
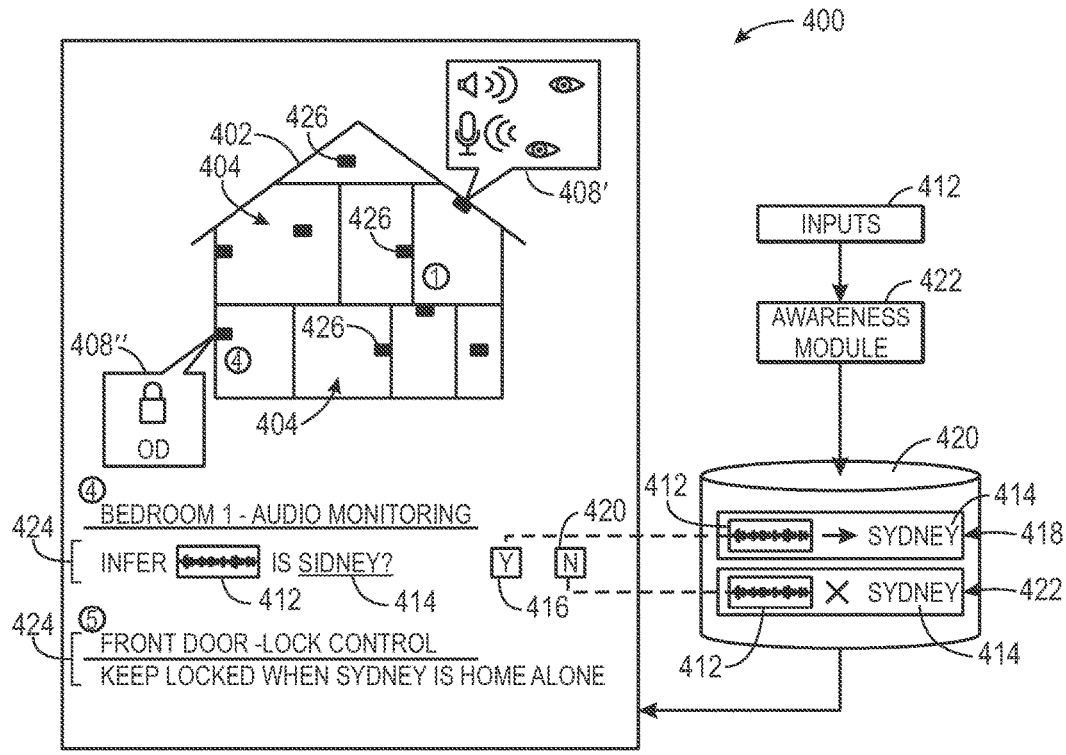
FIG. 13 is a schematic drawing illustrating a graphical user interface for manually constructing household policies, in accordance with an embodiment.

As previously discussed, an inventory of smart devices and/or sensors and their capabilities may be useful for constructing policies. FIG. 13 is a schematic drawing illustrating a graphical user interface 400 for attributing data from the smart devices 10 to activities, events and/or attributes within the smart-device environment 30, in accordance with an embodiment. In the illustrated embodiment, the interface 400 includes an indication of the various smart devices and/or sensors in a house. For example, a basic home mock-up 402 may provide an illustration 404 of rooms and placement 406 of smart devices and/or sensors. Further, the graphical user interface 400 may provide an indication of capabilities of the smart devices and/or sensors. For example, the embodiment of FIG. 13 includes capability clouds 408 indicating functionalities of smart devices and/or sensor. In the illustrated example, the capability cloud 408' provides the capabilities of a ceiling mounted camera. The capabilities include audio playback (as illustrated by the speaker icon), video monitoring (as illustrated by the eye icon), and audio monitoring (as illustrated by the microphone icon). Capability cloud 408" illustrates a door lock smart device that can lock/unlock (as indicated by the pad lock icon) and provide occupancy detection at the lock (as indicated by the "OD" icon).

The capabilities of the smart devices 10 may be used to provide awareness within the smart-device environment 30. For example, audio signals received at a microphone of one smart device 10 may be associated with a particular household occupant. As mentioned in the discussion of FIG. 10, a detected voice pitch (e.g., audio signature 312) may be associated with a particular household occupant (or particular type of household occupant (e.g., a male or female child)). In other examples, optical recognition (e.g., facial recognition or other image-based recognition), digital device presence (e.g., presence of electronic devices associated with a particular person), or other inputs may be associated with a particular household occupant or particular type of household occupant.

In the example graphical user interface (GUI) 400 of FIG. 13, an awareness prompt 410 is generated. The awareness prompt 410 may prompt a user of the GUI 400 whether the system should attribute one or more inputs 412 from the smart devices 10 as a particular activity, event, and/or attribute 414 of the household. For example, the prompt 410 is used to determine a relationship between an audio signature 412 and a particular household member named Sydney. When the awareness prompt 410 is confirmed (e.g., by a user selecting the "Yes" icon 416), an awareness rule 418 may be generated (e.g., in a database or data file 420) to link the input 412 with the particular activity, even, and/or attribute 414 of the household. In some embodiments, when the awareness prompt 410 is rejected (e.g., by a user selecting the "No" icon 420), an awareness rule 422 may be generated (e.g., in the database or data file 420) to refuse a link between the input 412 with the particular activity, even, and/or attribute 414 of the household.

In some embodiments, an awareness module 422 (e.g., hardware circuitry and/or software executed via a processor from tangible, non-transitory storage) may generate awareness rules 422 without an awareness prompt 410. For example, the awareness module 422 may receive inputs 412 (e.g., from one or more smart devices 10) and automatically generate awareness rules 418 without input from a user of the GUI 400. Automatic awareness rules 418 may be useful when there is high confidence that the inputs 412 should be associated with the particular activity, even, and/or attribute 414 of the household.

Once the awareness rules 412 are in place, reporting and/or control rules 424 may be created. The reporting and/or control rules 424 (e.g., household policies) may provide reporting when a certain particular activity, event, and/or attribute 414 of the household occur. Further, these rules 424 may trigger events based upon the particular activity, event, and/or attribute 414. For example, in the illustrated embodiment, a front door rule specifies that a door is to remain locked when Sydney is home alone. Thus, awareness of Sydney's lone occupancy in the household triggers persistent locking at the front door. Any number of events can be triggered by the rules 424. Rules 424 may trigger functionalities of smart devices (e.g., smart devices 426), processor-based functionalities (e.g., sending an email, posting a comment on social media, setting a calendar entry, providing a cellular phone notification, etc.), and so forth.

Figure 14:
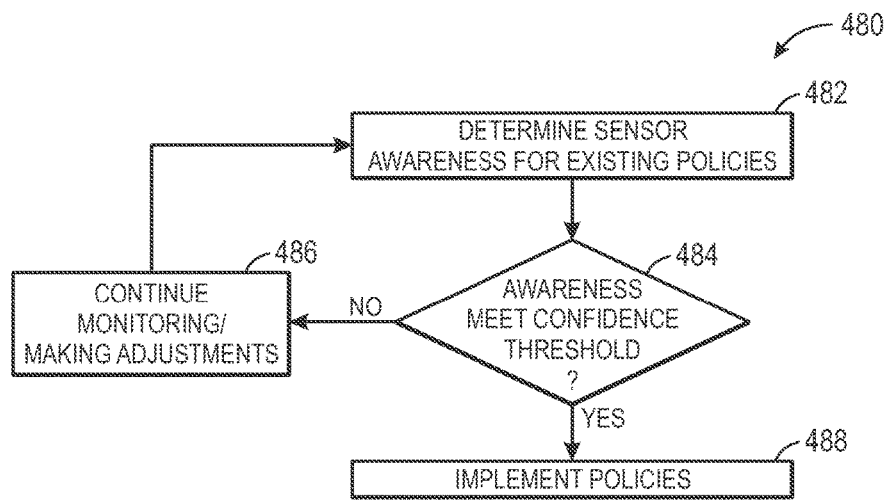
FIG. 14 is a flow diagram illustrating a process for providing sensor confidence related to a particular policy, in accordance with an embodiment.
Figure 15:
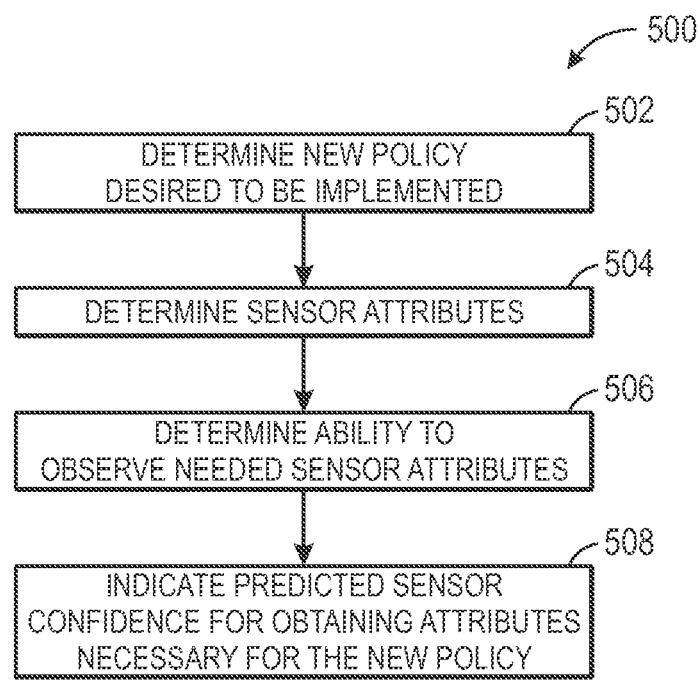
FIG. 15 is a flow diagram illustrating a process for presenting sensor confidence for a new policy, in accordance with an embodiment.
Figure 16:
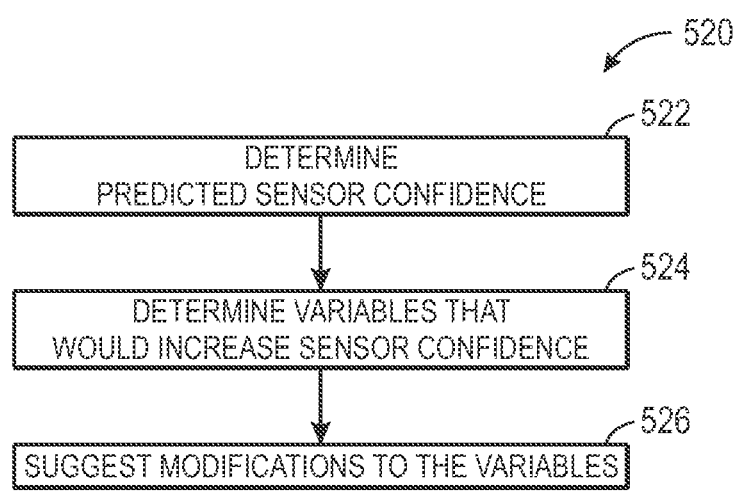
FIG. 16 is a flow diagram illustrating a process for suggesting modifications to enhance sensor confidence, in accordance with an embodiment.

As may be appreciated, reporting and/or control based upon household policies may rely on sensor confidence regarding household awareness. FIGS. 14-16 illustrate processes for providing sensor confidence and/or sensor confidence improvement, in accordance with certain embodiments. FIG. 14 is a flow diagram illustrating a process 480 for providing sensor confidence related to a particular policy, in accordance with an embodiment. First, a level of sensor awareness confidence is determined for existing policies (e.g., the rules 424 to be implemented within the household) (block 482). Sensor awareness confidence is a level of confidence that particular sensor inputs 412 may accurately be associated with the particular activity, event, and/or attribute 414 for the policies to be implemented. For example, in the door locking rule 424 of FIG. 13, sensor awareness confidence may relate to a) detecting Sydney's presence within the home and/or b) whether there is only one person (e.g., Sydney) currently occupying the home. For some embodiments, each sensor awareness confidence level can be expressed as a single scalar percentage metric, while for other embodiments it can be expressed as a multiple-feature vector whose components can be processed to arrive at the single scalar percentage metric, or that can be processed individually or in sub-groups to arrive at various component-level confidence determinations.

Once the confidence level is determined, a determination is made as to whether the confidence level meets a confidence threshold (decision block 484). For example, confidence may be increased by observing additional inputs 412 that may be attributed to the particular activity, event, and/or attribute 414 for the policies to be implemented. If the environment has not experienced enough input 412 data to provide a threshold level of subsequent awareness (e.g., the confidence level has not met a confidence threshold), monitoring may be continued and adjustments to input 412 ranges associated with the particular activity, event, and/or attribute 414 for the policies to be implemented may occur (block 486).

Once an awareness confidence level meets a threshold confidence level, the existing policies using the awareness may be implemented (block 488). For example, in the door locking example of FIG. 13, the door may be locked when the smart environment is sufficiently confident that Sydney is home alone.

In addition to implementing policies upon a particular sensor confidence threshold, it may be beneficial to predict sensor confidence prior to implementation of a particular household policy. FIG. 15 is a flow diagram illustrating a process 500 for presenting a predicted sensor confidence for a new policy, in accordance with an embodiment. First, a particular household policy or set of policies is selected (block 502). Next, a determination is made as to the sensor attributes needed to discern the conditions (e.g., inputs sourced from smart devices 10) (block 504). For example, in the door locking example of FIG. 13, sensor attributes relating to 1) identifying Sydney as an occupant and 2) identifying that an occupant is home alone may be needed. Accordingly, video data, audio data, infrared data, etc. useful for identifying an occupant as Sydney and/or a quantity of occupants may be obtained in the determination step of block 504. In some embodiments, the needed sensor attributes may be discerned by forming an aggregation of awareness rules 418 for a particular household policy.

Once the sensor attributes are determined, a determination is made as to the level of precision with which the determined sensor attributes may be observed (block 506. For example, low quality audio and/or video sensors may be less precise in observing audio and/or video attributes, especially in noisy and/or low-light environments. Further, infrared sensor precision may be affected by environmental variables. Accordingly, to determine precision of sensor attribute observation, sample data may be obtained from the smart devices 10, which may be analyzed for data quality (e.g., precision of detail in the data).

Based upon the determined precision, an indication of predicted sensor confidence for obtaining the sensor attributes for the policy may be provided (block 508). For example, the predicted sensor confidence indication may include a indication that a living room camera may have a 50% chance of correctly identifying Sydney as the occupant.

The predicted sensor confidence may be useful in determining potential modifications to a sensor arrangement and/or environmental arrangement, such that increased sensor confidence may be obtained. For example, sensor variables such as placement, number of sensors, etc. may be modified to increase sensor confidence. Further, environmental variable such as, lighting, noise levels, etc. may be altered to increase sensor confidence. FIG. 16 is a flow diagram illustrating a process 520 for suggesting modifications to enhance sensor confidence, in accordance with an embodiment.

The process 520 begins by determining the predicted sensor confidence (e.g., via the process 500 of FIG. 15) (block 522). Next, variables that would increase the sensor confidence are determined (block 524). For example, in some embodiments, a number of variables associated with particular devices may be provided that alter the precision of the sensors. For example, noise attributes for audio sensors and/or light for video sensors. In some embodiments, environmental variables, such as environment temperature, room size, etc. that may alter sensor precision may also be provided.

Next, variable modifications may be suggested to obtain better attribute observation (block 526). For example, in audio sensors, interference (e.g., audio noise) may result in less sensor precision. Based upon samples obtained during the process 500, it may be determined that there are noisy components (e.g., an overhead fan) near the audio sensor. Accordingly, replacement of the audio sensor to a less noisy area may be suggested.

Figure 17:
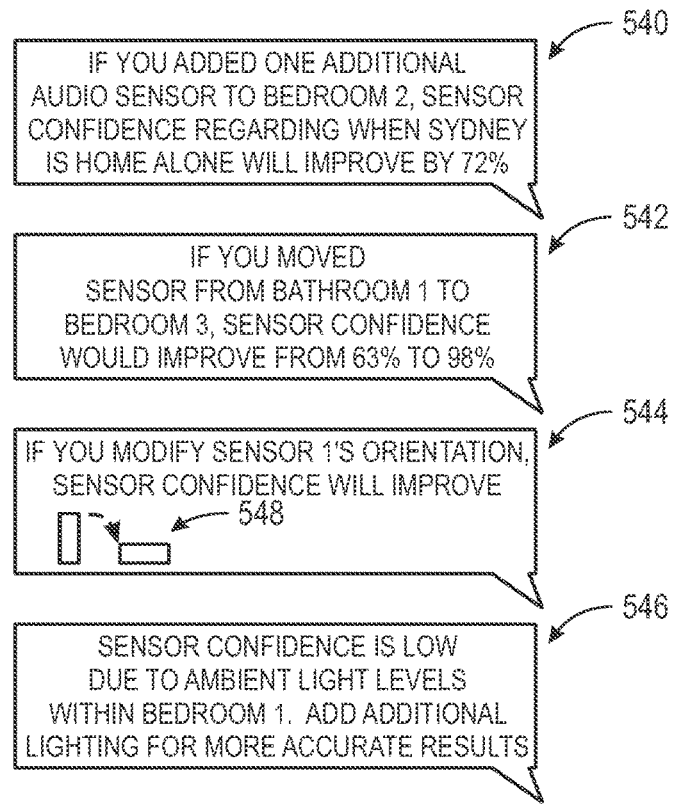
FIG. 17 is a schematic drawing illustrating examples of outputs from the process of FIG. 16, in accordance with an embodiment.

The modification suggestions may be made in a number of ways. In some embodiments, a user interface (e.g., a graphical user interface, an audio interface, etc.) may provide the suggestions. Further, the suggestions may be provided via one or more of the smart devices 10 or other electronic devices associated with the household. FIG. 17 is a schematic drawing illustrating examples of suggestions 540, 542, 544, and 546 that may be result of the process of FIG. 16, in accordance with an embodiment. The suggestions 540, 542, 544, and 546 may be a communicative message provided to one or more household members. For example, the suggestions 540, 542, 544, and/or 546 may be a text message, pop-up notification, or audio track provided via a household member's smart phone or other electronic device.

As mentioned above, the suggestions may include sensor and/or environmental variable modifications. For example, suggestions 540, 542, and 544 each illustrate sensor modifications, while suggestion 546 illustrates an environmental modification suggestion. Suggestion 540 provides a suggestion to add additional sensors for increased accuracy. Suggestion 542 suggests that a sensor be re-positioned in an alternative location (e.g., from bathroom 1 to bedroom 3). Suggestion 544 suggests that a sensor be re-oriented, providing an orientation illustration 548.

In contrast, the environmental modification suggestion 546 suggests environmental changes. In the example suggestion 546, an ambient light modification may increase the awareness accuracy of the sensors (which may, for example, increase the ability of a video monitoring device to yield images or image sequences with better dynamic range from which faces may be better recognized). Other environmental changes might include a temperature adjustment, noise adjustment, etc.

Additionally, the suggestions may provide an indication of approximate improvement (e.g., 72% improvement in suggestion 540 and/or confidence improvement from 63% to 98% in suggestion 542) or may provide a general indication of improvement (e.g., suggestions 544 and 546). In some embodiments, the suggestion may provide a modification without providing an indication of improvement.

Figure 18:
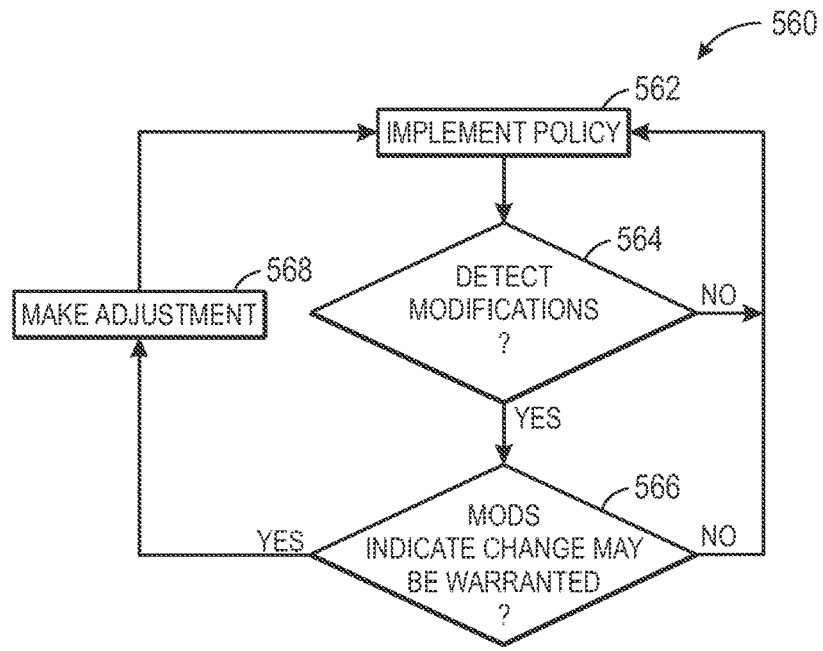
FIG. 18 is a flow diagram illustrating a process making adjustments based upon manual modifications of a policy, in accordance with an embodiment.

When modifications are made to the smart home environment (e.g., based upon the suggestions of FIG. 17, adjustments may be needed to properly associate the sensor attributes with a policy condition. FIG. 18 is a flow diagram illustrating a process 560 making adjustments based upon manual modifications of a policy, in accordance with an embodiment. First, a policy may be implemented according to a set of association rules and controls, as described above with regards to FIG. 13 (block 562). A determination is made as to whether modifications are detected within the environment (decision block 564). For example, the system may determine that the orientation of a sensor, the location of a sensor, etc. has changed.

When no changes are detected, the policy implementation continues (block 562). However, when a modification is detected, a determination is made as to whether the modification warrants a change to the policy (e.g., to the association rules used for reporting and/or control in the policy) (decision block 566). In one example, when an audio sensor is moved from a bedroom to a bathroom, additional audio interference (e.g., from a running sink) may be present. Accordingly, the association rules may be updated to filter out audio signals from a running sink when associating sensor data with a particular policy condition.

If no modifications to the policy are needed, the policy implementation continues (block 562). However, when a modification is needed, an adjustment may be made to the policy (block 568). For example, in the audio sensor example, an audio filtering may be added to association rules for the audio sensor. In the case of additional sensors being added to the system, new association rules may be added to account for data obtained via the new sensors. Once the adjustments are made, the policy is implemented with the new adjustments (block 562).

Context-Based Awareness Embodiments

Figure 19:
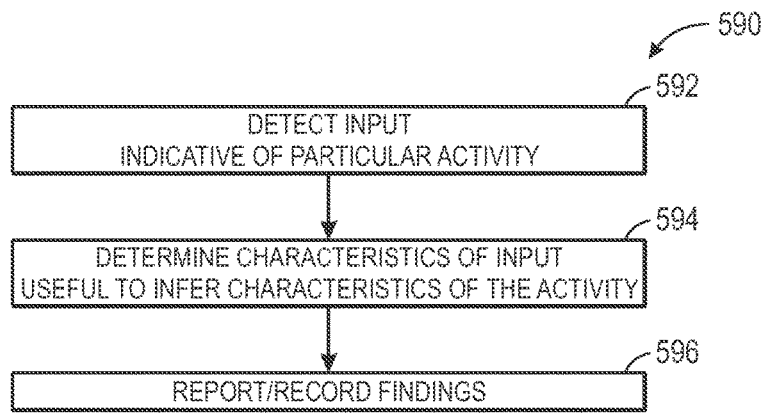
FIG. 19 is a flow diagram illustrating a process for monitoring activities of a household, in accordance with an embodiment.

Turning now to a more detailed discussion of particular awareness processes, FIG. 19 is a flow diagram illustrating a process 590 for monitoring and becoming aware of activities of a household, in accordance with an embodiment. First, a sensor input that is indicative of a particular activity is detected (block 592). For example, an infrared input, a video input, and/or an audio input may indicate occupancy within a room of a household. Next, characteristics of the activity are inferred using characteristics of the input (block 594). These inferred characteristics may provide an indication whether or not a household policy condition (or a portion of a household policy condition) is met. For example, an infrared signature, audio signature, and/or video signature may be used to identify a particular household member occupying a room. The inferred characteristics may be recorded and/or reported (block 596) (e.g., to the household policy manager, which may provide reporting and/or control within the household system).

Figure 20:
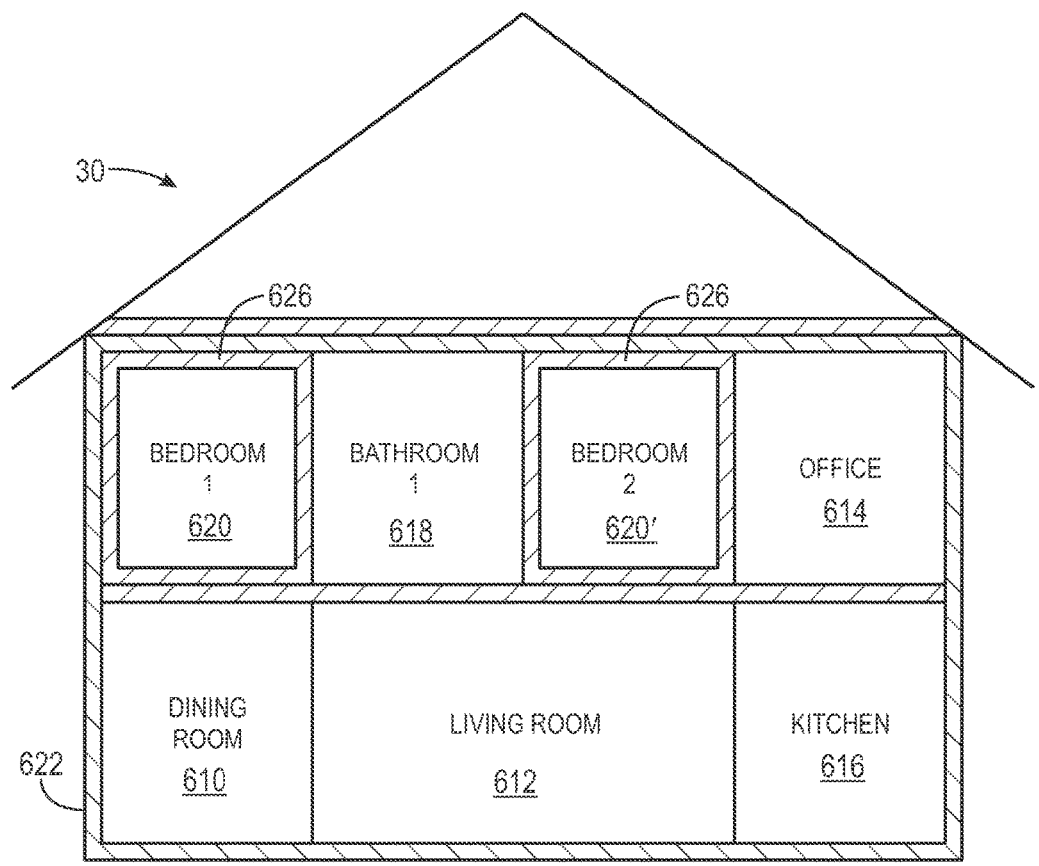
FIG. 20 is a schematic drawing illustrating policies implemented according to locational zones, in accordance with an embodiment.

Particular inferences may be made based upon the context of the sensors (e.g., the sensor placement within the house or other contextual information regarding the sensors). FIG. 20 is a schematic drawing illustrating policies implemented according to locational zones, in accordance with an embodiment. In one example, the smart-device environment 30 may be broken up into localized zones, such as a dining room zone 610, a living room zone 612, office zone 614, kitchen zone 616, bathroom zone 618, and bedroom zones 620 and 620'. Further, zones may encapsulate multiple rooms and/or areas. For example, in the embodiment of FIG. 20, a whole-house zone 622 is present. Further, an upstairs zone 624 and a zone 626 including all bedrooms is included.

The various zones may be used differently to provide awareness to the household policy management system. For example, awareness of a particular occupant's presence may be discerned using similar association rules when the zones are similar. However, when the zones differ (e.g., different ambient light and/or noise), the association rules may vary from zone to zone.

Further, a context of a particular zone may provide additional insight into the activities, events and/or characteristics to be inferred. For example, when an occupant is in the dining room zone 610, it may be more likely that the occupant is eating dinner than performing other activities (e.g., watching television). Similarly, an occupant in a bathroom is more likely to be brushing their teeth than performing other activities (e.g., eating dinner). Accordingly, a zonal context may be used in the inference of activities, events, and/or characteristics of the house.

Figure 21:
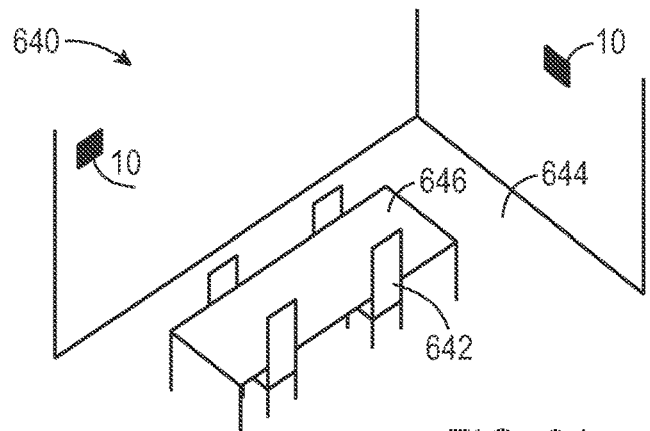
FIG. 21 is a schematic drawing of a system for monitoring dining, in accordance with an embodiment.
Figure 22:
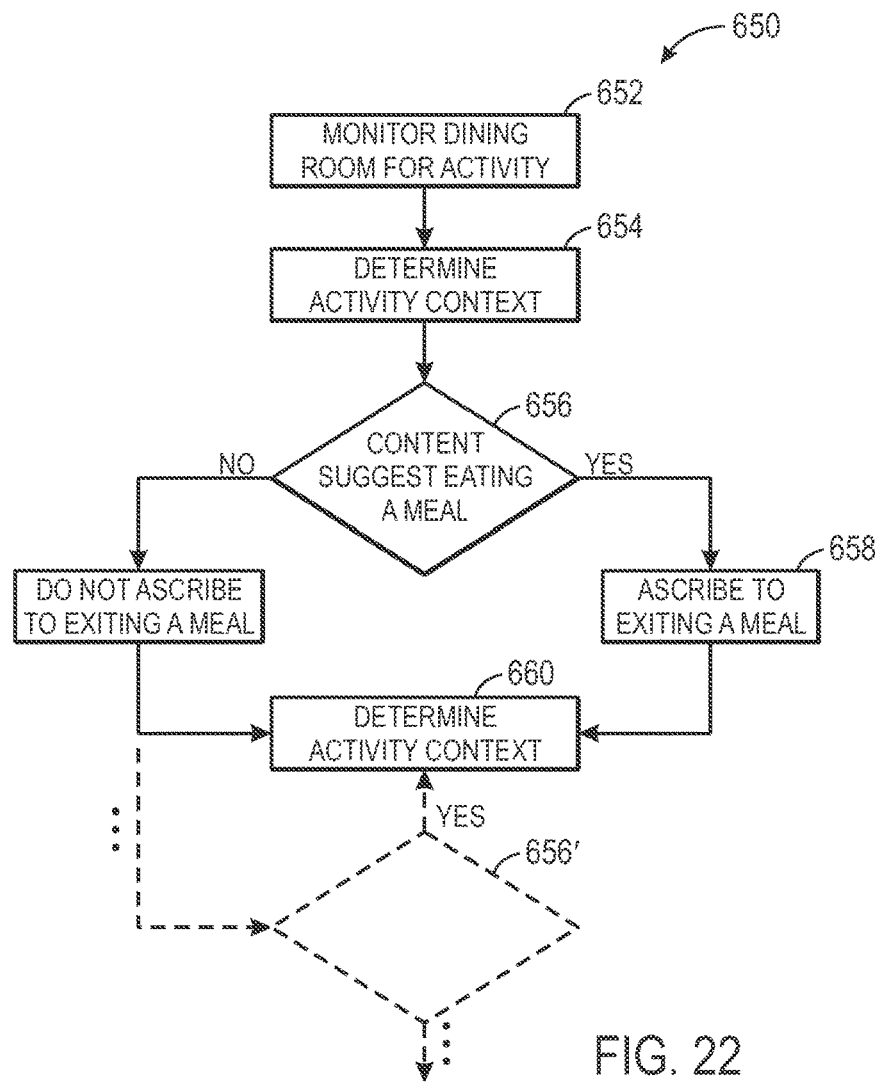
FIG. 22 is a flow diagram illustrating a process for monitoring dining, in accordance with an embodiment.

Turning now to a more focused discussion of zonal inferences, FIG. 21 is a schematic drawing of a household policy system 640 having a dining zone 610, in accordance with an embodiment. FIG. 22 is a flow diagram illustrating a process 650 for monitoring dining, in accordance with an embodiment. Because they are related, FIGS. 21 and 22 will be discussed together.

As illustrated the dining zone 610 may have one or more sensors (e.g., smart devices 10) that may accumulate data from the dining room zone 610. For example, the smart devices 10 in the zone 610 may include video sensors, audio sensors, infrared sensors, vapor detection sensors (e.g., VOC and/or other compound detection and identification sensors), etc.

In some embodiments, it may be beneficial to become aware of household eating patterns (e.g., whether the household eats at scheduled times, whether the household eats in the dining room, whether the household eats together, etc.).

Using the smart devices 10, the system 640 may monitor the dining room for activity (e.g., changes to the smart device sensor inputs) (block 652). Upon detecting such activities, a context of the activity is inferred (block 654). For example, an audio signature matching a dining chair 642 movement across a floor 644 may suggest that an occupant is sitting in the chair 642 (e.g., because the occupant may have presumably moved the chair 642 to sit in it). Indeed, video inputs may confirm and/or identify that occupants are sitting in the chair 642 and/or at the table 646. Additionally, smart device 10 inputs may be used to obtain a number of contextual clues, such as utensil movement, conversation content, vapor detection, etc. For example, in one embodiment, the vapor sensors may detect the presence of food within the dining room zone, which may indicate that a meal is being consumed in the dining room zone 610.

Based upon the determined context, particular awareness questions may be determined. For example, in the process 650, a determination is made as to whether the context suggests that one or more household occupants is eating a meal (decision block 656). Any number of decision blocks 656 may exist, depending on particular inferences that are to be made for use with the household policies. For example, an additional decision block 656' may determine whether the context suggests that an occupant is working at the dining room table, etc.

When the decision block (e.g., decision block 656) is answered in the affirmative, an inference is made, ascribing the inputs to the activity of the decision block. For example, in the process 650 when the context suggests that a meal is being eaten in the zone 610, the activity in the dining room is ascribed to eating a meal (block 658) and is reported and/or stored for use by the household policy manager (block 660). As will be discussed in more detail below, the reported and/or stored findings may be useful for reporting and/or control activities sourced from the system (e.g., the household policy manager 154).

Figure 23:
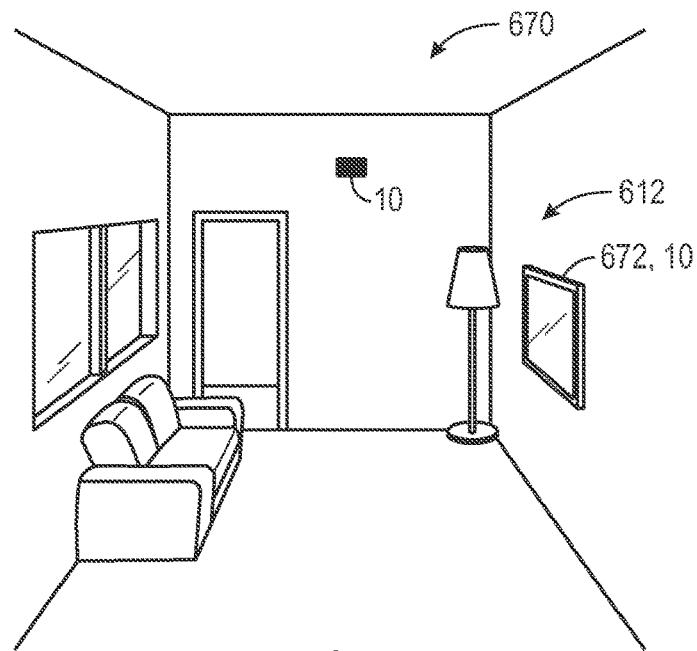
FIG. 23 is a schematic drawing of a system for monitoring activities, in accordance with an embodiment.

Turning now to the living room context, FIG. 23 is a schematic drawing of a system 670 for monitoring activities in a living room zone 612, in accordance with an embodiment. As illustrated in FIG. 23, the living room zone 612 may have one or more sensors (e.g., smart devices 10) that may accumulate data from the zone 612. For example, the smart devices 10 in the zone 612 may include video sensors, audio sensors, infrared sensors, vapor detection sensors, etc. In addition, a television 672 may be a smart device 10, capable of providing data relating to the television 672 and/or the living room zone 612.

Figure 24:
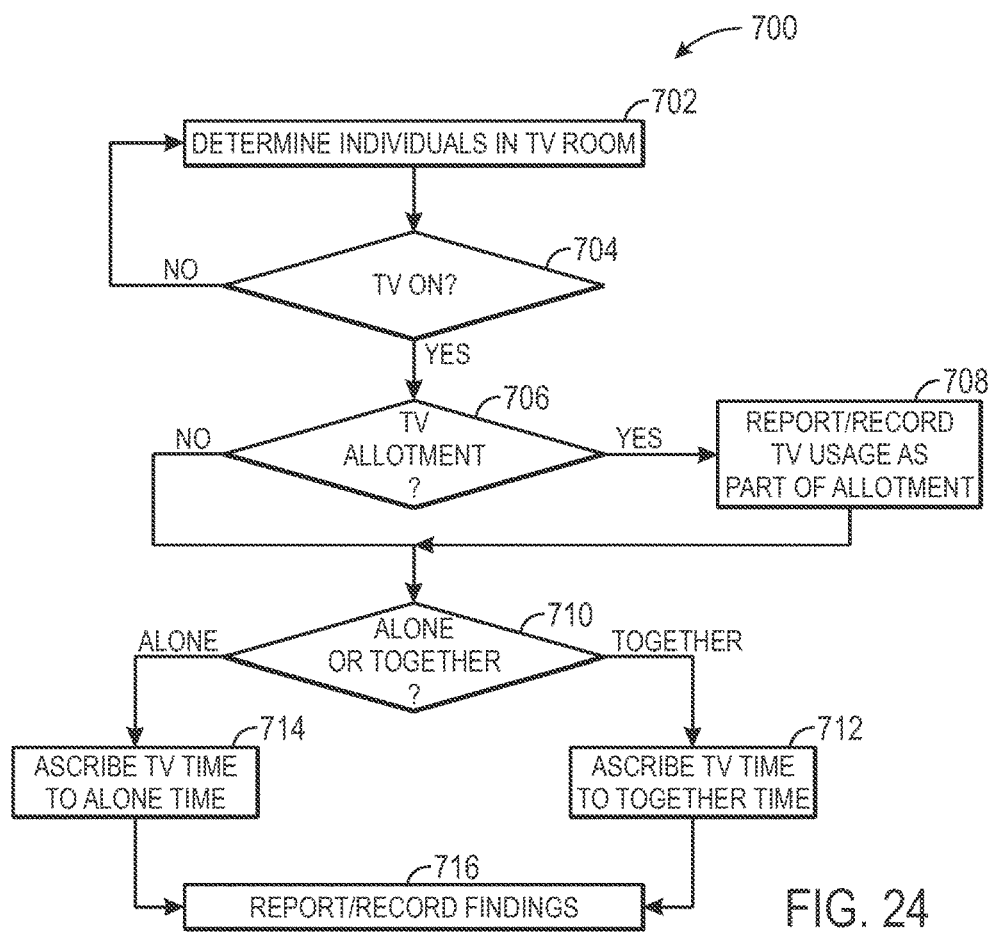
FIGS. 24 and 25 are flow diagrams illustrating processes for monitoring media consumption, in accordance with an embodiment.
Figure 25:
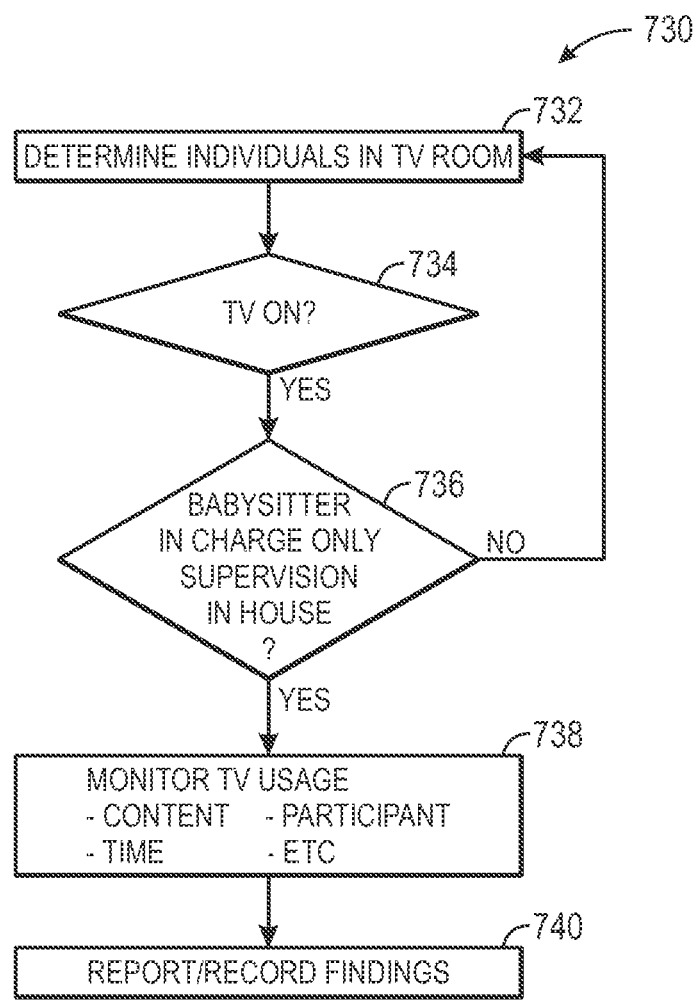

The sensors may be used to become aware of activities, events, and/or characteristics of the living room zone 612. For example, FIGS. 24 and 25 are flow diagrams illustrating processes for monitoring television use, in accordance with an embodiment. In FIG. 24, a process 700 for television usage awareness is provided. When a determination is make that individuals are in a room with a television (e.g., in the living room zone 612) (block 702), a determination is made as to whether the television 672 is on (decision block 704). Block 702 may discern occupancy via any number of occupancy detection mechanisms, such as infrared changes attributable to an occupant, audio signatures representative of an occupant, video signatures representative of an occupant, etc. Further, a particular identity of an occupant may be discerned in block 702. For example, an audio and/or video signature representative of a particular occupant may be used to identify the occupant.

Further, the determination regarding whether the television 672 is on may be discerned based upon data provided by the television 672 and/or data obtained by the other devices 10 (e.g., video detection of an active television 672 screen and/or audio from the television 672 speakers). If the television 672 is not on, monitoring continues until there are changes in the television 672 status. When the television 672 is on, the system may determine whether there is a prescribed television 672 allotment for the household and/or a particular household member occupying the zone 612 (decision block 706). If there is no prescribed allotment, processing continues, as will be discussed below.

When there is a prescribed allotment, the system may report and/or record the television 672 usage as part of the prescribed allotment (e.g., the household policy manager 154 (block 708). Accordingly, the system (e.g., the household policy manager 154) may subsequently control the television 672 based upon the allotment and usage, as will be described in more detail below.

In conjunction with (or independently with) the allotment and usage awareness, the processing may include a determination of whether or not activities (e.g., watching television) are being performed alone or as a group (decision block 710). For example, if multiple occupants are detected, the activity may be attributed to an activity that is performed with other household members (block 712). When there is a single occupant, the activity may be ascribed to an activity that is performed alone (block 714). In either case, the ascribed findings may be reported and/or recorded (e.g., to the household policy manager 154) (block 716).

It may be beneficial to become aware of additional information when non-parental supervision is present. Accordingly, awareness may heightened when non-parental supervision is present. FIG. 25 illustrates another living room awareness process 730 providing such heightened awareness.

Similar to process 700, the system may determine who is in the living room zone 612 (block 732). Further, the system may discern whether the television 672 is on (decision block 734).

The process 730 may include a determination (block 736) of whether children are being supervised by parents or non-parents (e.g., a babysitter or grandparents). If the children are being supervised by parents, monitoring continues until non-parental supervision occurs.

When non-parental supervision is present, alternative awareness may occur. For example, in the illustrated embodiment, heightened awareness of television usage is inferred (block 768). For example, the heightened television 672 awareness may include awareness regarding: content being watched, an amount of time of television 672 usage during the non-parental supervision, who is participating in the television 672 usage, etc. This awareness may be reported and/or recorded to the system (e.g., for subsequent reporting and/or control by the system) (block 740).

Figure 26:
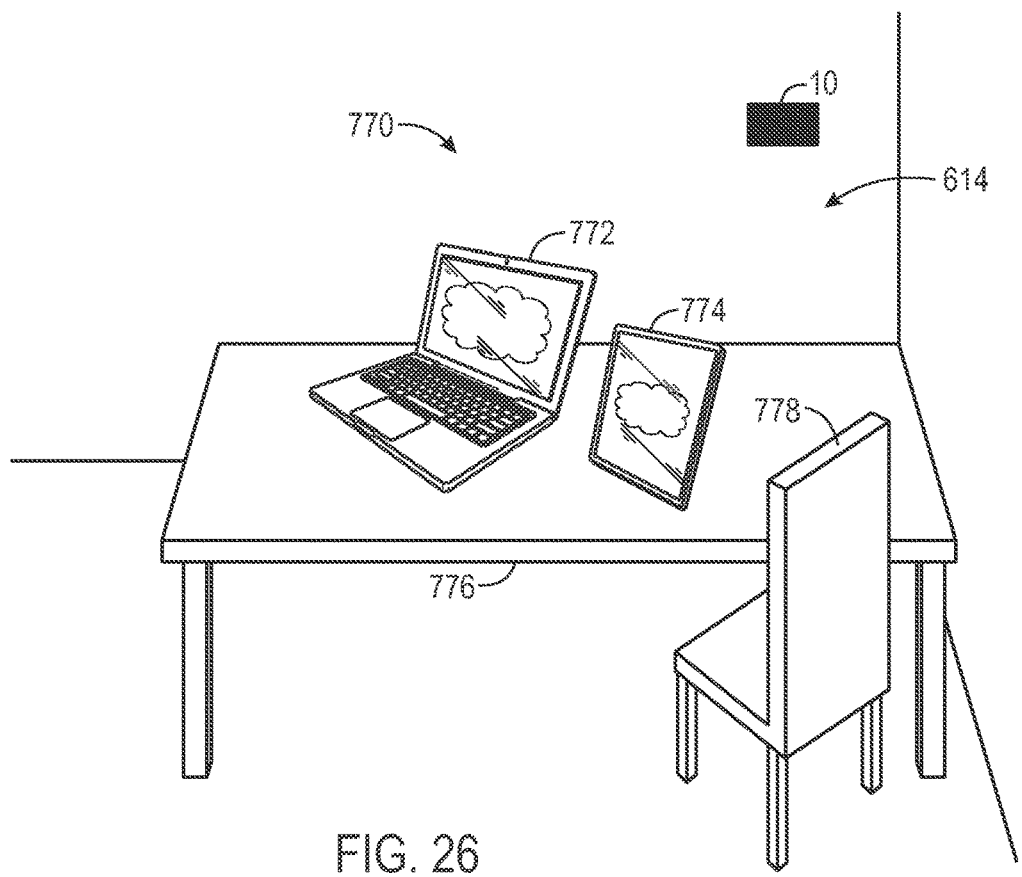
FIG. 26 is a schematic drawing of a system for monitoring office activities, in accordance with an embodiment.

Turning now to an office context, FIG. 26 is a schematic drawing of a system 770 for monitoring office zone 614 activities, in accordance with an embodiment. The zone 614 may have one or more sensors (e.g., smart devices 10) that may accumulate data from the office zone 614. For example, the smart devices 10 in the zone 614 may include video sensors, audio sensors, infrared sensors, vapor detection sensors, etc. Additionally, the zone 614 may include one or more computers 772 and/or handheld electronic devices 774. The zone 614 may include a desk 776 and/or a chair 778.

Figure 27:
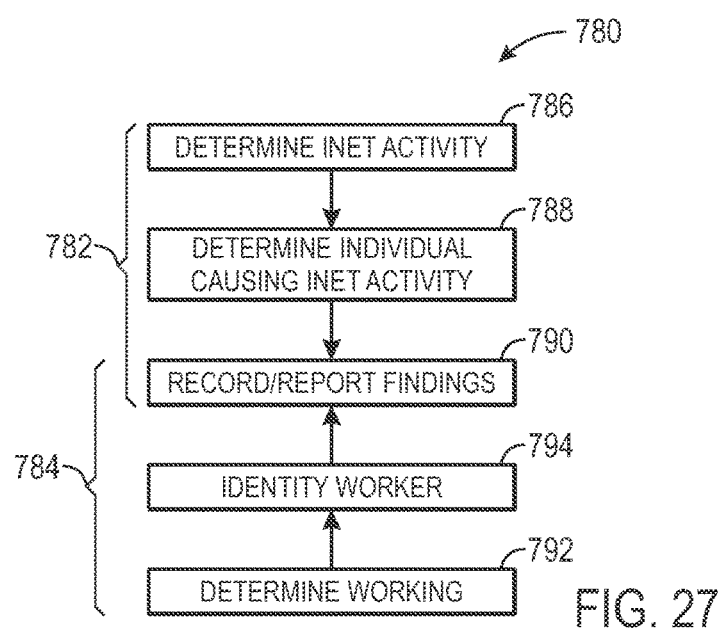
FIG. 27 is a flow diagram illustrating a process for monitoring office activities, in accordance with an embodiment.

Awareness of activities, events, and/or characteristics of the zone 614 may be useful in household policies. FIG. 27 is a flow diagram illustrating a process 780 for monitoring office activities, in accordance with an embodiment. One activity of interest may be internet usage awareness, which may be obtained via blocks 782. Another activity of interest may be awareness regarding working, which may be inferred using blocks 784.

Discussing first the internet usage awareness, internet activity may be detected (block 786). This may be done by monitoring network packets, by observing computer 772 and/or electronic device 774 communications, etc.

An individual causing the internet activity is then determined (block 788). For example, if the computer 772 and/or electronic device 774 is determined to be the device causing internet activity, a household member operating the computer 772 and/or electronic device 774 may be discerned. In some embodiments, this may be done by determining a currently executed login credential for the computer 772 and/or electronic device 774, determining a user typically associated with the computer 772 and/or electronic device 774, and or by using a smart device 10 to identify an individual interacting with the computer 772. Findings regarding the internet usage may be reported and/or recorded for subsequent control and/or reporting (block 790).

Turning now to awareness regarding working, an analysis of sensor data may be used to determine if a household member is working (block 792). For example, an audio signature of keyboard clicking, a desk chair moving, and/or papers shuffling etc. may indicate that someone is working.

Next, a particular household member may be identified as the person doing the work (block 794). For example, the member may be identified based upon image recognition (e.g., a video signature), audio recognition (e.g., an audio signature), etc. Any findings may be recorded and/or reported for subsequent control and/or reporting by the system (block 790).

Figure 28:
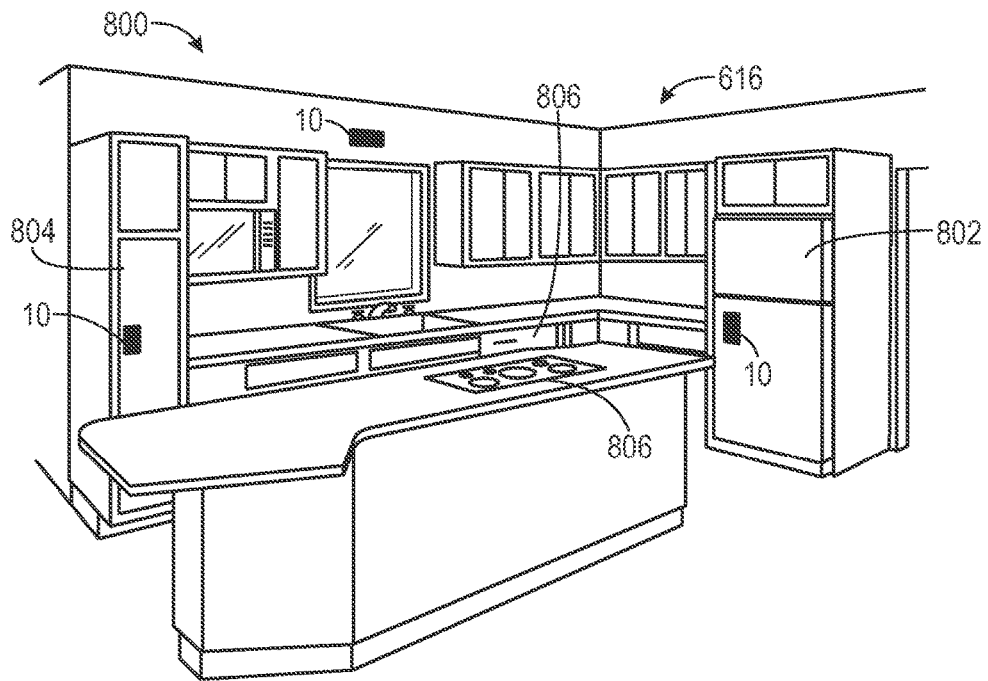
FIG. 28 is a schematic drawing of a system for monitoring kitchen activities, in accordance with an embodiment.

Turning now to a kitchen context, FIG. 28 is a schematic drawing of a system 800 for monitoring activities in a kitchen zone 616, in accordance with an embodiment. The kitchen zone 616 may include one or more sensors (e.g., smart devices 10) that may accumulate data from the kitchen zone 616. For example, the smart devices 10 in the zone 616 may include video sensors, audio sensors, infrared sensors, vapor detection sensors, etc. Additionally, the zone 616 may include a refrigerator 802, a pantry, 804, and kitchen appliances 806, which may be monitored by the smart devices 10. In some embodiments, the refrigerator 802 and/or the appliances 806 may be smart devices 10 capable of providing data to the system 800.

Figure 29:
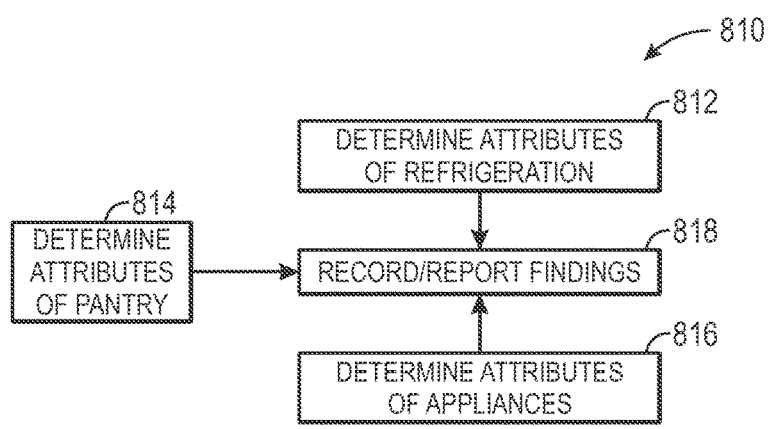
FIG. 29 is a flow diagram illustrating a process for monitoring kitchen activities, in accordance with an embodiment.

FIG. 29 is a flow diagram illustrating a process 810 for monitoring activities in the kitchen zone 616, in accordance with an embodiment. One or more attributes of the refrigerator may be determined (block 812), the term "attributes" including activities or events associated with the refrigerator in addition to features or characteristics. For example, attributes such as when the refrigerator door is opened and/or closed, a duration that a door is opened, an amount of water dispensed through a water dispenser, a level of ice in the ice maker, etc. may be determined.

Additionally or alternatively, attributes of the pantry 804 may be determined (block 814). For example, attributes such as when the pantry 804 is opened/closed, duration that pantry 804 is open, items removed and/or added to the pantry 804, etc. may be obtained.

Further, attributes of the appliances 806 may be determined (block 816). For example, attributes such as status of the appliances 806 (e.g., on or off), duration of utilization of the appliances 806, etc. may be obtained.

Using the determined attributes of the refrigerator 802, the pantry 804, and/or the other appliances 806, additional information may be discerned. Any findings of the zone 616 may be recorded and/or reported to the system (e.g., for subsequent reporting and/or control by a household policy manager 154.

Figure 30:
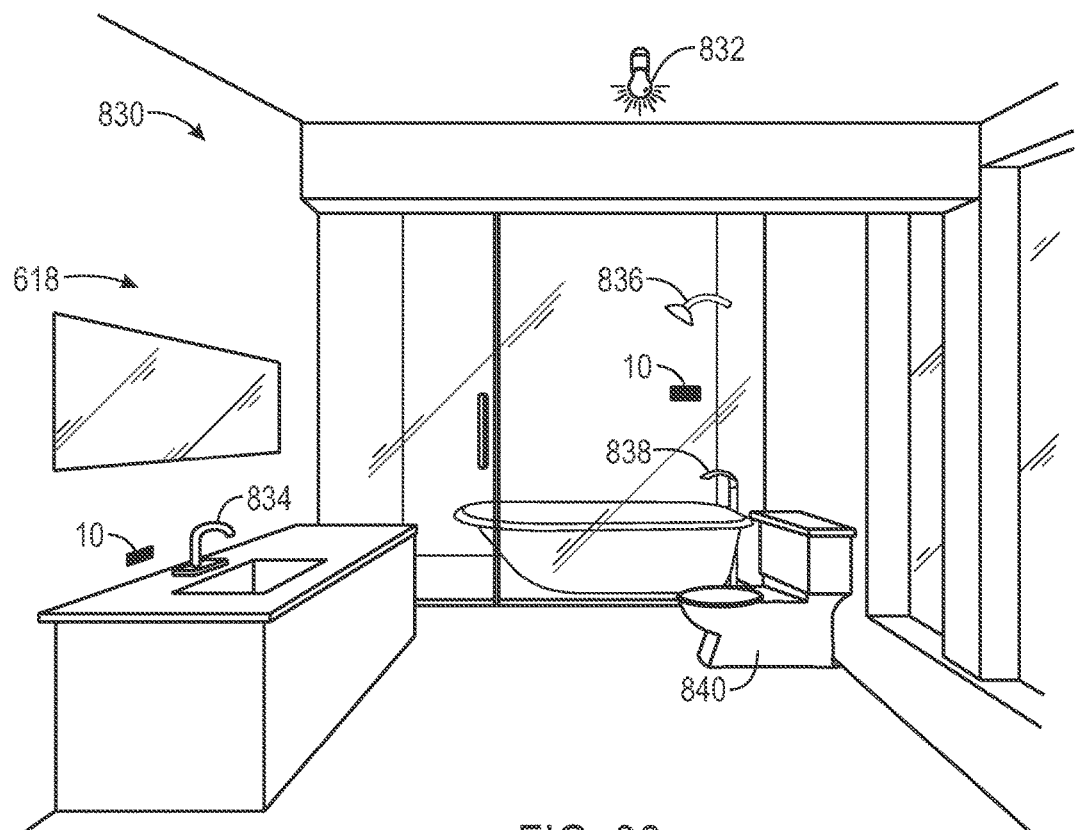
FIG. 30 is a schematic drawing of a system for monitoring bathroom activities while maintaining personal privacy, in accordance with an embodiment.
Figure 31:
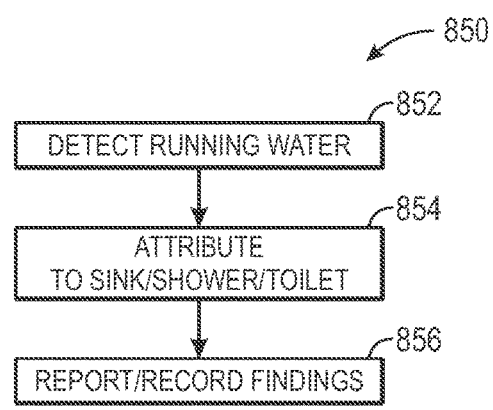
FIGS. 31-33 are flow diagram illustrating processes for monitoring bathroom activities while maintaining personal privacy, in accordance with an embodiment.
Figure 32:
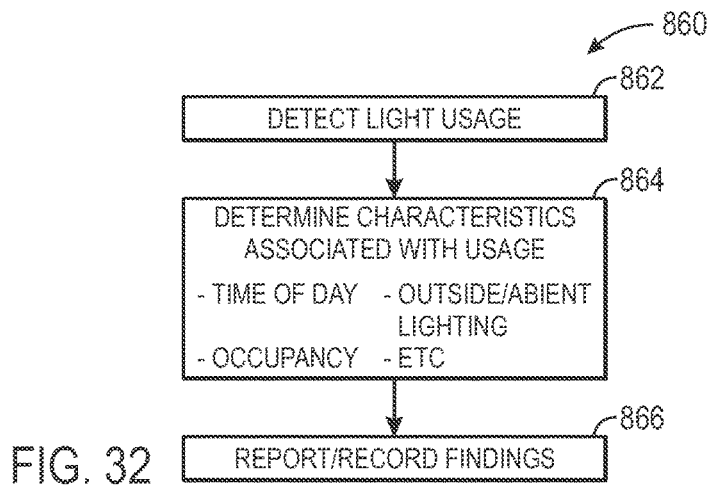
Figure 33:
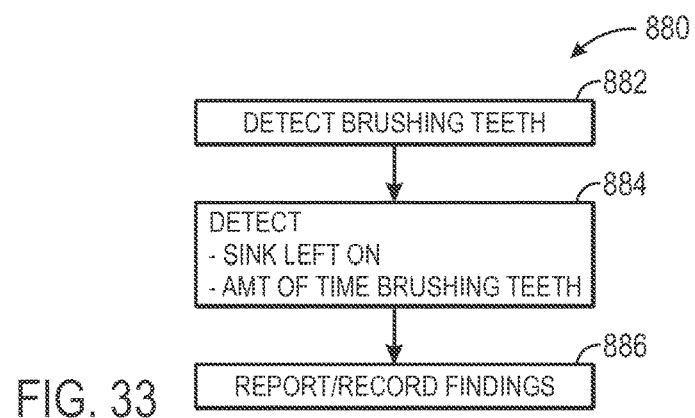

Turning now to the bathroom zone 618 context, FIG. 30 is a schematic drawing of a system 830 for monitoring activities of the bathroom zone 618, in accordance with an embodiment. FIGS. 31-33 are flow diagram illustrating processes for monitoring bathroom activities while preserving personal privacy, in accordance with embodiments. The bathroom zone 618 may include one or more sensors (e.g., smart devices 10) that may accumulate data from the bathroom zone 618. For example, the smart devices 10 in the zone 618 may include video sensors, audio sensors, infrared sensors, vapor detection sensors, etc. Additionally, the zone 618 may include lighting 832, one or more sinks 834, a shower 836, a bathtub 838, and/or a toilet 840. In some embodiments, the lighting 832, the one or more sinks 834, the shower 836, the bathtub 838, and/or a toilet 840 may be smart devices 10.

One activity, event, or characteristic that may be interesting regarding household policies may be water usage. FIG. 31 provides a process 850 for determining water usage attributes for a bathroom zone 618. The process 850 begins by detecting running water (block 852). For example, this may be determined based upon vibration analysis (e.g. of pipes), audio signatures, and/or video signatures within the bathroom zone 618.

The running water may be attributed to a particular water-based application (e.g. a sink 834, a shower 863, a bathtub 838, and/or a toilet 840) (block 854). For example, this may be accomplished based upon a determination of an approximate location of the running water, etc. Any findings regarding the water usage may be reported and/or recorded within the system (e.g., for subsequent control and/or reporting by the household policy manager 154) (block 856).

Another bathroom zone 618 characteristic of interest may be light usage. FIG. 32 provides a process 860 for determining light usage within a zone. First, light usage is detected (block 862). In the case where the lighting 832 is a smart device 10, the lighting 832 may provide light usage data to the system. Additionally and/or alternatively, light usage may be detected via infrared sensors and/or video (e.g., imaging sensors).

Characteristics regarding the light usage may also be determined (block 864). For example, the time of day, occupancy information (e.g., who is occupying the zone), ambient lighting conditions, lighting level adjustments, lighting duration, etc. may be determined. These findings may me reported and/or recorded within the system (e.g., for subsequent control and/or reporting by the household policy manager 154) (block 866).

FIG. 33 illustrates an example of process 880 for awareness regarding a bathroom zone 618 activity. Specifically, the embodiment of FIG. 33 begins by detecting that an occupant of the zone 618 is brushing their teeth (block 882). For example, an audio signature and/or video signature may be associated with the sounds and/or images of teeth brushing in the zone 618. Next, additional characteristics may be determined (e.g., the sink 834 being left on, a duration of teeth brushing, a speed of teeth brushing, etc.) (block 884). These findings may me reported and/or recorded within the system (e.g., for subsequent control and/or reporting by the household policy manager 154) (block 886).

Figure 34:
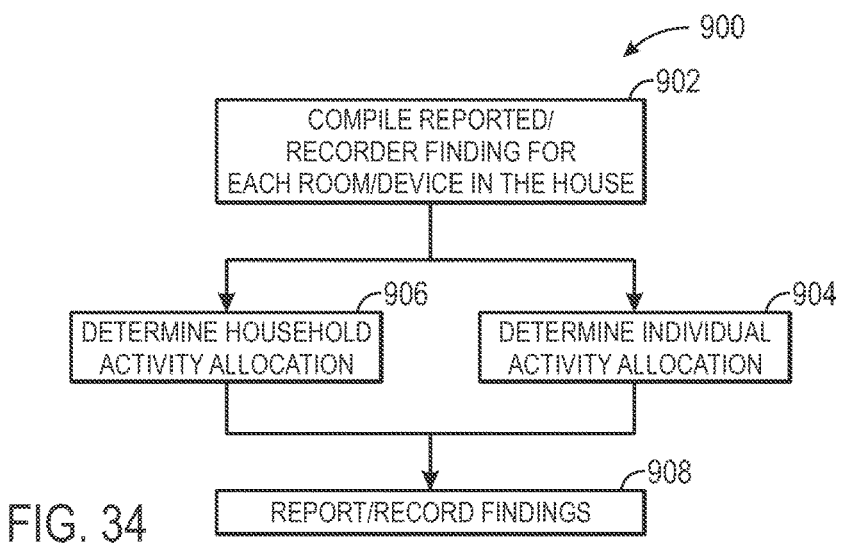
FIG. 34 is a flow diagram illustrating a process for reporting compiled activities, in accordance with an embodiment.

Reported and/or recorded activities/findings may be compiled, such that complex findings may be obtained. FIG. 34 is a flow diagram illustrating a process 900 for reporting compiled activities, in accordance with an embodiment. The process 900 begins my compiling the reported and/or recorded findings provided to the system (e.g., each finding from every room and/or device in the house) (block 902). The compiled findings may be filtered based upon common activities, events, and/or characteristics. For example, findings may be filtered based upon a particular household member being involved in the activity (e.g., all of Allie's activities), based upon household member activities (e.g., brushing teeth), and/or events (e.g., active Internet usage and/or activated lights).

Figure 35:
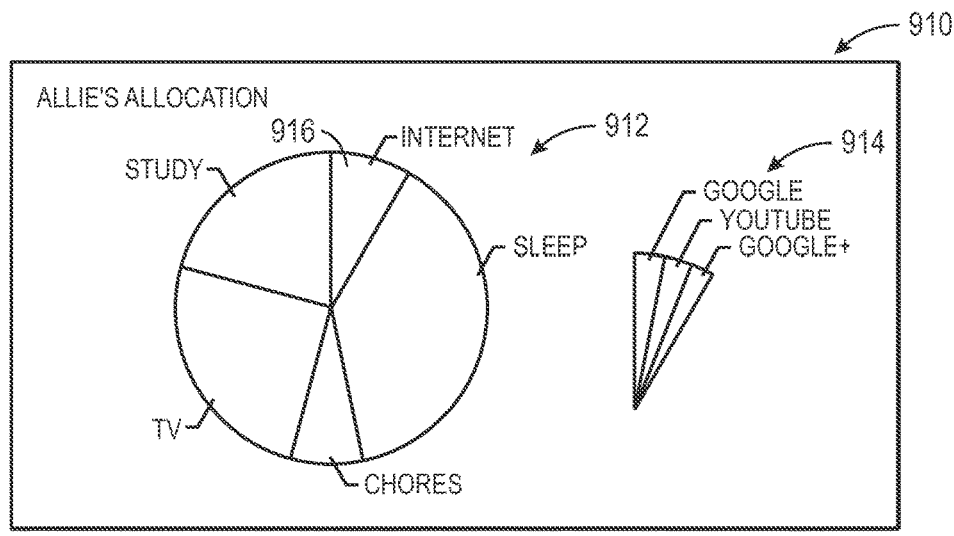
FIG. 35 is a schematic drawing of a graphical user interface useful for reporting compiled activities, in accordance with an embodiment.

The compiled findings may be used to determine individual activity allocations (e.g., all of Allie's activities or all of Allie's teeth brushings) (block 904). Further, the compiled findings may be used to determine household activity allocations (e.g., household utility consumption, etc.) (block 906). The individual activity allocations and/or household activity allocations may be reported and/or recorded (block 908) for use by the system. For example, FIG. 35 is a schematic drawing of a graphical user interface 910 useful for reporting compiled activities, in accordance with an embodiment. In the interface 910, a household member's (e.g., Allie's) activities are displayed by the pie chart 912. Further, the pie chart portion 914 provides further characteristics and/or details relating to the portion 916 of the chart 912. In the illustrated embodiment, details relating to Allie's internet usage are more particularly detailed in the portion 914.

Inferred Activities

In some situations, observed characteristics, behaviors, and/or activities may be used to infer other characteristics, behaviors, and/or activities. For example, some monitored activities may not be directly observable, but may be monitored indirectly via inferences made by the household policy manager.

Figure 36:
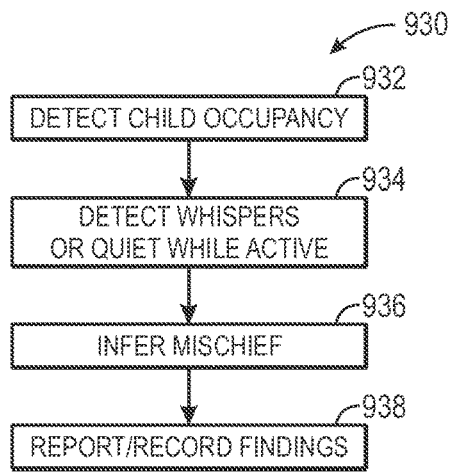
FIG. 36 is a flow diagram illustrating a process for detecting child mischief, in accordance with an embodiment.

For example, in one embodiment, mischief may be inferred based upon observable activities of individuals in a household. FIG. 36 is a flow diagram illustrating a process 930 for detecting child mischief, in accordance with an embodiment. Specifically, the process 930 begins by detecting child occupancy or occupancy of other classes of occupants to be monitored (block 932). In some embodiments, these classes of occupants may be determined based upon audio monitoring, optical (e.g., video) monitoring, or other monitoring (e.g., infrared occupancy monitoring). For example, characteristics of audio signatures, such as speech patterns, pitch, etc. may be used to discern child occupancy. Next, the occupants may be monitored, specifically listening for low-level audio signatures (e.g., whispering or silence), while the occupants are active (e.g., moving or performing other actions) (block 934). Based on the detection of these low-level audio signatures combined with active monitored occupants, the system may infer that mischief (e.g., activities that should not be occurring) is occurring (block 936).

In some embodiments, some particular activities or other context may be used to infer that mischief is occurring, or to exclude an inference that mischief is occurring. For example, it may be expected that certain activities be performed in quiet, thus indicating that the quiet activity is unlikely to be mischief. For example, reading a book, mediating, etc. are oftentimes performed in quiet. Additionally, contextual information such as occupancy location may be used to exclude an inference of mischief. For example, if the occupancy occurs in a library, study, or other area where quiet activity may be expected, inference of mischief may be excluded. Accordingly, when these activities are performed, the system may infer that mischief is not occurring, despite low-level audio signatures in parallel with active occupants.

Additionally or alternatively, in some embodiments, particular activities or other contextual information may be used to provide a stronger inference of mischief. For example, when children are near a liquor cabinet or are in their parents' bedroom alone, the system may infer that mischief is likely to be occurring.

Upon inferring that mischief is occurring, the system may report and/or record the findings for subsequent use (block 938). For example, the findings may be used in household reporting, near real time notification, or may be used to control smart devices within the home (e.g., provide a verbal warning regarding the inferred mischief via a speaker of a smart device (e.g., a smoke detector). Accordingly, the finding may lead to deterrence of further mischief within the home.

Figure 37:
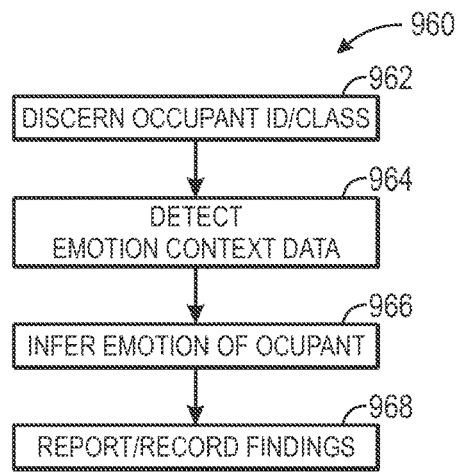
FIG. 37 is a flow diagram illustrating a process for detecting emotions, in accordance with an embodiment.

It may be beneficial to monitor the emotional state of occupants within a household. FIG. 37 is a flow diagram illustrating a process 960 for inferring an emotional state of occupants, in accordance with an embodiment. Certain contextual queues of individual occupants may be used to infer the emotional state of household occupants. For example, crying may signify a sad emotional state, whereas laughing may signify a happy emotional state.

Further, some general cultural norms, which can often be keyed to household location, may be used in universally inferring an emotional state of household occupants. For example, a head nod up and down in a household located in a first country of the world may signify an agreeable state, whereas a head nod side to side may signify the same agreeable state in a household located in a second country of the world.

As mentioned above, emotional state may be more accurately inferred by understanding a context of the occupant. Accordingly, the process 960 may optionally begin by discerning an identity or class (e.g., sex, age, nationality, etc.) of the occupant (block 962).

The process 960 also includes detecting emotional context data (block 964). For example, optical indicators of facial expressions, head movement, or other activities of occupants may be used to infer an emotional state. Additionally, audio queues, such as audio signatures of crying, laughing, elevated voices, etc. may be used to infer emotions. Further, infrared information, such as body temperature, etc. may be used in an emotional state inference.

Based upon the obtained emotional context data, an inference may be made as to the occupant's emotional state. As mentioned above, the inference may be generalized (e.g., based upon context clues for an entire class of occupants) or may be particularly tailored for a particular occupant. For example, a generalized inference of a happy emotional state of the occupant may be made when a visual indication of laughter and/or an audio indication of laughter is obtained. In contrast, particularly tailored inferences may look at the emotional context data in view of a particular occupant's known characteristics. For example, the system may know that Sue cries both when she is happy and when she is sad. Accordingly, the system may discern that an inference of Sue's emotional state based upon crying alone would be weak. However, the system may also know that Sue typically smiles when she is happy and maintains a straight face when she is sad. Accordingly, when a visual indication shows that Sue is crying and has a straight face, the system may infer that Sue is sad. This inference may be different for other occupants, because the particularly tailored example uses particular emotional indicators of Sue.

Upon inferring the emotional state of the occupant, the system may report and/or record the findings for subsequent use (block 968). For example, the findings may be used in household reporting, near real time notification, or may be used to control smart devices within the home.

Figure 38:
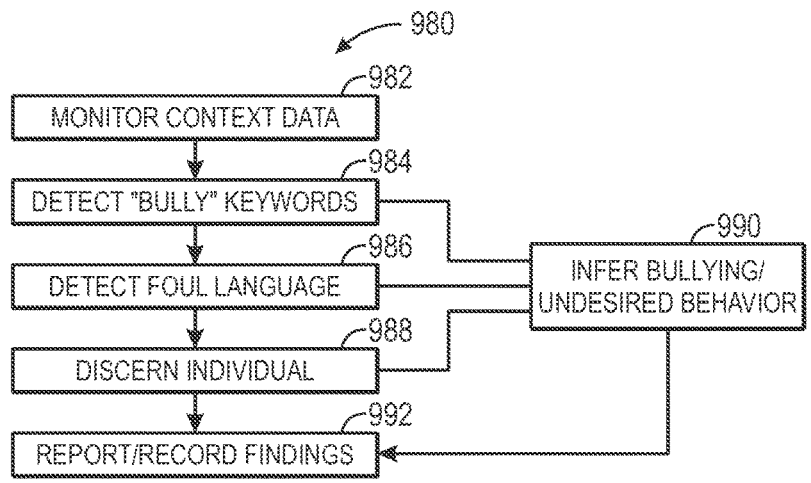
FIG. 38 is a flow diagram illustrating a process for detecting undesirable actions, in accordance with an embodiment.

In some embodiments, it may be beneficial to monitor bullying. FIG. 38 is a flow diagram illustrating a process 980 for detecting bullying and/or other undesirable actions, in accordance with an embodiment. The process 980 begins with monitoring contextual data (block 982). For example, audio monitoring, optical monitoring, infrared monitoring, etc. may be used to discern occupancy and undesirable activities of the occupants. In one embodiment, the contextual data may include audio signatures indicating "bully" keywords such as derogatory name-calling, elevated voices, etc. Accordingly, the system may monitor for and detect the use of such "bully" keywords (block 984). Additionally, in some embodiments, the contextual data may include audio signatures indicating the use of foul language. Accordingly, the system may monitor for and detect the use of such foul language by the occupants (block 986). In some embodiments, the contextual data may include the identity of the individuals interacting with one another. Accordingly, the system may detect the identities of the individuals occupying the space where the undesirable activities may be occurring (block 988). Based upon the contextual data, an inference may be made that bullying and/or other undesirable activities are occurring (block 990). The findings of this inference may be reported and/or recorded for subsequent use (block 992).

In some embodiments, it may be desirable to detect interaction with undesirable substances. For example, it may be desirable to understand when occupants are interacting with undesirable substances. FIG. 39 is a flow diagram illustrating a process 210 for inferring interaction with undesirable substances, in accordance with an embodiment. Process 210 begins by detecting occupancy in an environment (block 212). Additionally, the process 210 includes monitoring for contextual data related to interaction with undesirable substances (block 214). For example, a chemical detection system/volatile organic compound sensor may be used to detect the presence of undesirable activities (e.g., poisonous compounds, alcohol, tobacco, etc.). Additionally, the contextual data may include: occupancy in proximity to locations where such undesirable substances are stored (e.g., occupancy near a liquor cabinet, near a kitchen cabinet containing poisonous kitchen cleaning products, etc.); visual indication of interaction between the occupant and the undesirable substance; etc. Based upon the contextual data, the system may infer interaction of an occupant with the undesirable substances (block 216). Accordingly, the inference may be reported and/or recorded for subsequent reporting and/or control (block 218).

Additionally, the system may be used to monitor chore completion. FIG. 40 is a flow diagram illustrating a process 240 for detecting chore completion status, in accordance with an embodiment. The process 240 begins with monitoring contextual data associated with daily chores (block 242). For example, on trash pickup days, the system may monitor for data such as audio and/or video associated with the removal of trash bags from a trashcan. Another example may include monitoring audio and/or video of dusting activities, vacuuming activities, mopping activities, etc. Further, the contextual data may include audio and/or video data indicating study/homework activities, instrument practice, etc. Based upon the contextual data, inferences may be made regarding whether chores have been completed (block 244). The inferences may be reported and/or recorded for subsequent reporting and/or control (block 246).

FIG. 41 is a flow diagram illustrating a process 250 for monitoring medical symptoms, in accordance with an embodiment. First, contextual data associated with medical conditions may be monitored (block 252). For example, certain movement patterns have been associated with Alzheimer's disease. In some embodiments, the system may monitor household occupants' movement patterns and compare these movement patterns with those associated with Alzheimer's disease. In other embodiments, the system may track audible and/or visual cues associated with maladies, such as: coughing, sneezing, aching, etc.

Next, based upon the monitored contextual data, an inference may be made regarding medical diagnosis of one or more occupants of the household. For example, when an occupant's movement patterns match those of the movement patterns associated with Alzheimer's disease, the system may infer a higher probability that the household occupant has the disease. Further, upon attributing coughs and/or sniffing, for example, by a household occupant, the system may infer that the occupant is acquiring a cold and/or influenza. The inference may be reported and/or recorded for subsequent use in the system.

Situational Observation

In some instances, when particular situations arise, additional monitoring/inferences may be desired. FIG. 42 is a flow diagram illustrating a process 260 for situational monitoring, in accordance with an embodiment. The process 260 begins by discerning if a situation warranting additional monitoring/inferences is occurring (decision block 262). If no such occurrence is detected, routine monitoring proceeds (block 264). However, when a situation warranting additional monitoring/inferences is detected, contextual data associated with the situational monitoring/inference policies may be monitored (block 266). The system may infer activities based upon the contextual data (block 268). These inferences may be reported and/or recorded for subsequent reporting and/or control (block 270).

In one embodiment, additional monitoring may occur when a child is home alone. Any number of additional monitoring tasks and/or inferences may be made when children are home alone. For example, the system might make more sensitive inferences when children are home alone, may detect the presence of unexpected occupants, etc.

Figure 43:
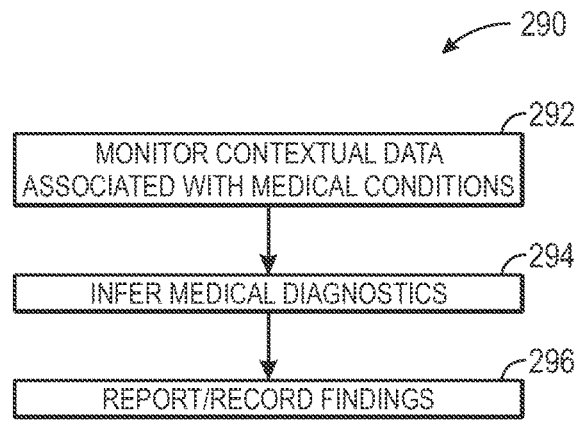
FIG. 43 is a flow diagram illustrating a process for situational monitoring of children who are home alone, in accordance with an embodiment.

FIG. 43 is a flow diagram illustrating a process 290 for situational monitoring of children who are home alone, in accordance with an embodiment. First, the system may detect that a child is home alone (block 292). For example, the occupancy sensors may discern occupancy and identification data may be used to discern that the occupants are all children. Accordingly, the system may discern that children are home alone.

In the embodiment of FIG. 43, when children are home alone, a policy is set to inform parents when occupants approach and/or enter the house. Accordingly, the system may detect, via occupancy sensors, occupants at the front door (block 294). Upon such detection, the system may notify parents of the approaching occupant (block 296).

Figure 44:
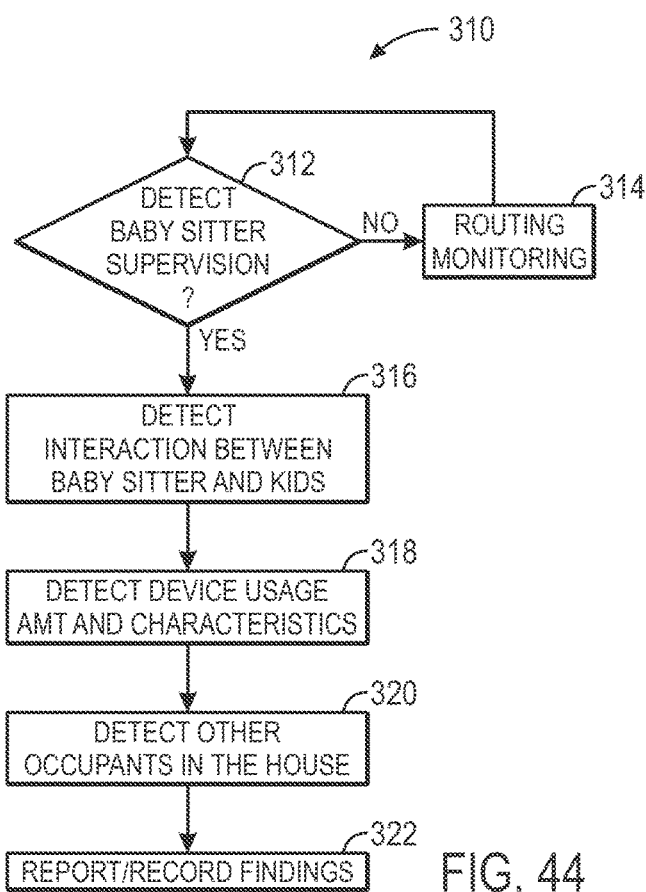
FIG. 44 is a flow diagram illustrating a process for situational monitoring of non-parental supervision, in accordance with an embodiment.

Another situation that may warrant additional monitoring may be supervision of children by third parties (e.g., a babysitter or grandparents). FIG. 44 is a flow diagram illustrating a process 310 for situational monitoring of non-parental supervision, in accordance with an embodiment. First, the system determines whether a third party (e.g., a babysitter) is providing supervision (decision block 312). For example, the system may discern that parents are occupying the house with the children, thus indicating parental supervision. Alternatively, the system may discern that only third parties occupy the house with the children, thus indicating third party supervision.

If there is no third party supervision, routine monitoring proceeds (block 314). However, when third party supervision is detected, additional monitoring may occur. Any number of additional monitoring tasks may be desired when third party supervision is detected. For example, the sensitivity of cautionary inferences (e.g., interaction with inappropriate content and/or substances) may be heightened, the actions of the third parties can be modified, additional actions of the children, and etc. may be monitored.

In the embodiment of FIG. 44, a situational policy is set to monitor interaction between the third party and the children (block 316), monitor the electronic device (e.g., television, tablet, or computer) usage amount and/or usage characteristics (e.g., consumed content) of the children (block 318), and monitor for unexpected occupants approaching and/or entering the house (block 320). Findings regarding these additional monitoring tasks are reported and/or recorded for subsequent reporting and/or control (block 322).

Figure 45:
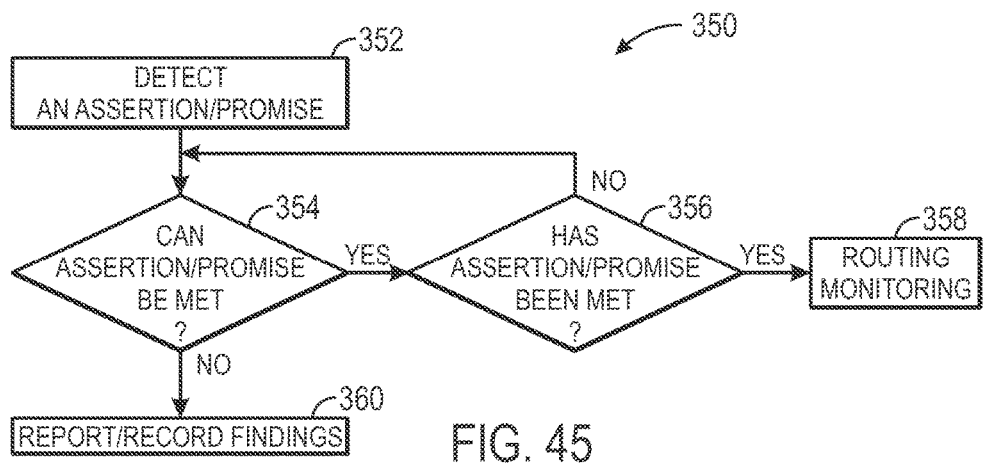
FIGS. 45 and 46 are flow diagrams illustrating processes for monitoring assertion activities, in accordance with an embodiment.
Figure 46:
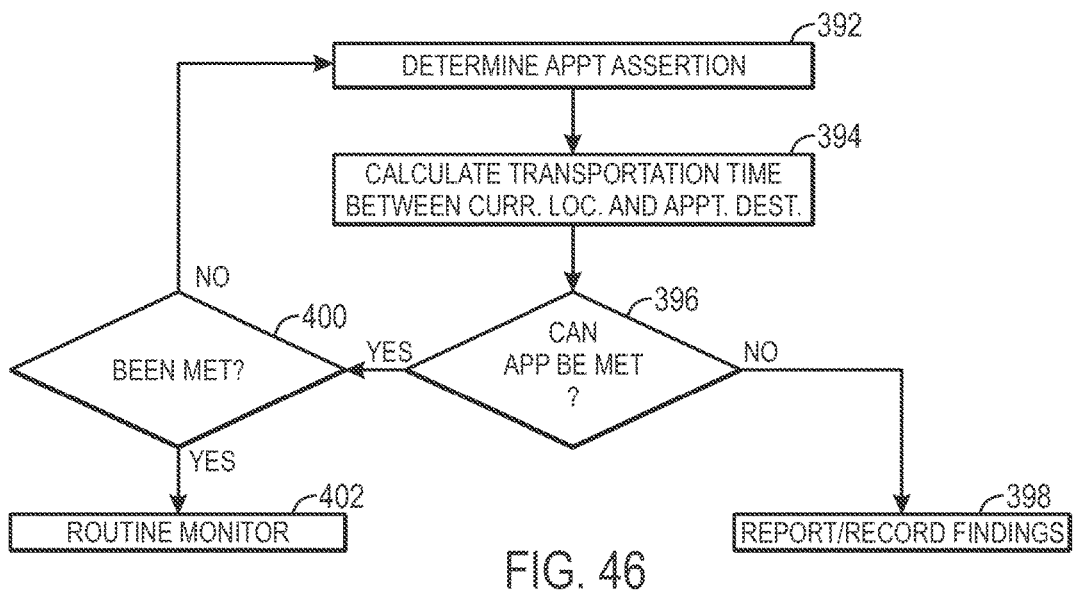

Another situation that may warrant additional monitoring/inferences is a situation where assertion/promises are made. FIGS. 45 and 46 are flow diagrams illustrating processes 350 and 390 for monitoring assertion activities, in accordance with embodiments. Process 350 is a general process for assertion-based monitoring and process 390 is a more specific assertion based policy regarding an appointment assertion. Starting first with process 350 of FIG. 45, the process 350 begins by detecting an assertion/promise (block 352). In some embodiments, the system discerns such a promise by monitoring voice conversations within the household and/or on a portable electronic device (e.g., a tablet, computer, or cellular telephone). In some embodiments, such assertions/promises may be detected by monitoring text messaging (e.g., SMS text messages, etc.). In some embodiments, assertions may be obtained from email, calendar, or other electronic device applications.

Regarding the appointment-based assertion monitoring process 390, the system may detect an appointment assertion (block 392). In one example, a text message may be provided by a household member stating, "I'll be home by 5:00." Accordingly, an assertion may be detected by monitoring the text messaging of an electronic device. Alternatively, an appointment may exist in an electronic calendaring application of an electronic device, which may be used to discern an appointment.

Returning to process 350, a determination is made as to whether the assertion/promise is capable of being completed (decision block 354 of FIG. 45 and decision block 396 of FIG. 46). For example, returning to the "I'll be home by 5:00" assertion, the system may determine a current location of the household member and how long it would take to get from the current location to the occupant's house (block 394 of FIG. 46). If the occupant's house can be reached by 5:00, a determination is made as to whether the assertion/promise has been met (decision block 356 of FIG. 45 and decision block 400 of FIG. 46). For example, in the "I'll be home by 5:00" assertion, the system may determine whether the occupant has reached home. If the assertion has been met, routine monitoring proceeds (block 358 of FIG. 45 and block 402 of FIG. 46). However, if the assertion has not been met, the process 350 returns to decision block 354 and process 390 returns to block 392 to determine whether the assertion/promise is capable of being met.

If the assertion/promise cannot be met (e.g., the occupant's house cannot be reached by 5:00), a finding that the assertion cannot be met may be reported and/or recorded (block 360 of FIG. 45 and block 398 of FIG. 46). For example, a notification may be provided via an electronic device, noting that the assertion/promise can no longer be met.

In some embodiments, intermediate notifications may be reported/recorded when an assertion is close to not being able to be met. For example, in the appointment process 390, a notification could be sent 30 minutes, 15 minutes, 5 minutes, etc. prior to the appointment not being able to be kept. Accordingly, the asserter may be prompted to head towards the appointment location prior to not being able to make the appointment.

Household Policy-Based Reporting and Control

Figure 47:
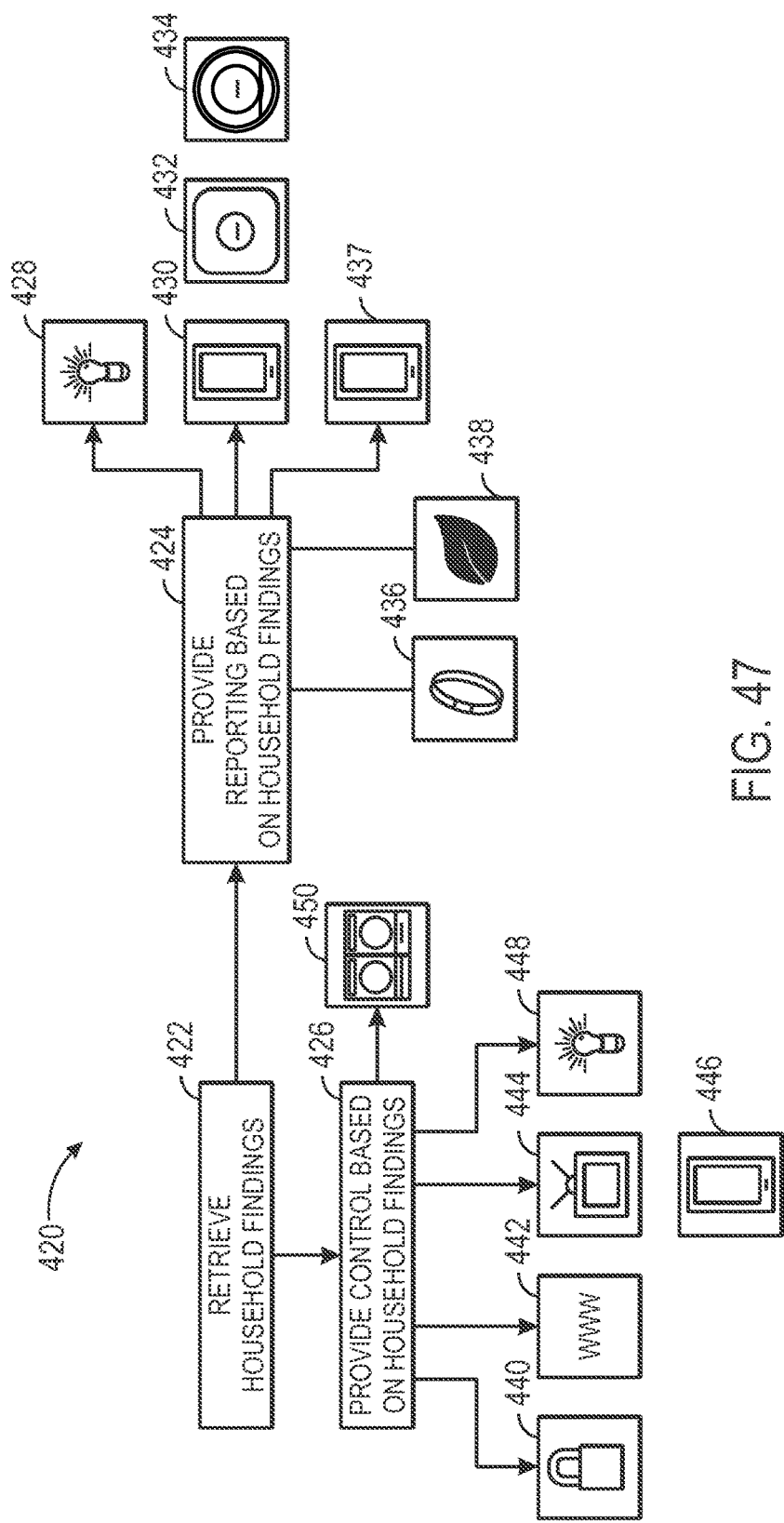
FIG. 47 is a flow diagram illustrating a process for providing control of a smart-device environment, in accordance with an embodiment.

Once the monitoring and/or inference data is reported and/or recorded to at the household policy management system, the household policy management system may facilitate further household reporting and/or control. FIG. 47 is a flow diagram illustrating a process 420 for providing reporting and/or control of a smart-device environment, in accordance with an embodiment. The process 420 begins with receiving household findings (e.g., those findings reported and/or recorded, as described herein) (block 422). Based upon the particular household policies implemented within the household policy management system, the household policy management system may provide reporting of the findings (block 424) and/or provide control based upon the findings (block 426).

Turning first to reporting, notification of findings may be provided as a report via a multitude of notification mechanisms. FIG. 47 provides an example of several notification mechanisms. For example, notification of certain findings may be provided via smart lighting systems 428. For example, a household policy may be set to change a smart lighting system color to red and flash the lights whenever findings warranting a warning are received.

Additionally, reporting may be provided via other smart devices. For example reporting may be provided via a tablet computing device 430, via audio speakers (e.g., in a smart smoke detector 432), via a display panel (e.g., of a smart thermostat 434), and/or personal smart devices, such as an activity monitor wristband 436. The reporting can be provided via social networking sites (e.g., Google+ 437) or other websites. In some embodiments reporting can be provided to applications. For example, the reporting can be provided to Nest software applications and/or hardware for Nest Leaf 438 feedback (e.g., energy savings feedback indication from Nest applications and/or hardware).

Turning now to control, the received household findings may be used to control any number of smart devices. For example, the household findings might be used to control lock 440 (e.g., door lock) functionality. For example, if the findings indicate that children are home alone, the locks 440 may be actuated to a locked position, such that the house is secured from unexpected guests (assuming a household policy is implemented for such functionality).

In some embodiments, the received findings may control access to content 442 (e.g., Internet-based content, television content, allowed DVDs, etc.). For example, if the findings indicate that chores have not been completed and/or an excessive amount of content has been consumed, the household policy manager may restrict access to further content 442 (assuming a household policy is implemented for such functionality). In some embodiments, access to content playback devices (e.g., a television 444 and/or computing device 446) may be restricted and/or allowed based upon findings. For example, when the findings indicate that chores have been completed, access to the devices 444 and/or 446 and/or content 442 may be granted.

In some embodiments, lighting 448 or other household fixtures may be controlled based upon the received household findings. For example, lighting 448 may be turned off when the household policy manager observes that there is no occupancy in a particular room (assuming a household policy is implemented for such functionality). Additionally, controllable household appliances, such as a washer and/or dryer 450 may be controlled based upon the received findings. For example, if the findings suggest that a television or radio is being used near the washer and/or dryer 450, the washer and/or dryer execution cycles may be delayed, enabling the use of the television and/or radio without noise from the washer and/or dryer 450.

The reporting/notification mechanisms and controlled devices mentioned above are provided merely as examples of how notifications may be provided and how devices may be controlled. The provided examples are not intended to limit the scope of notification mechanisms or controlled devices within the household.

Figure 48:
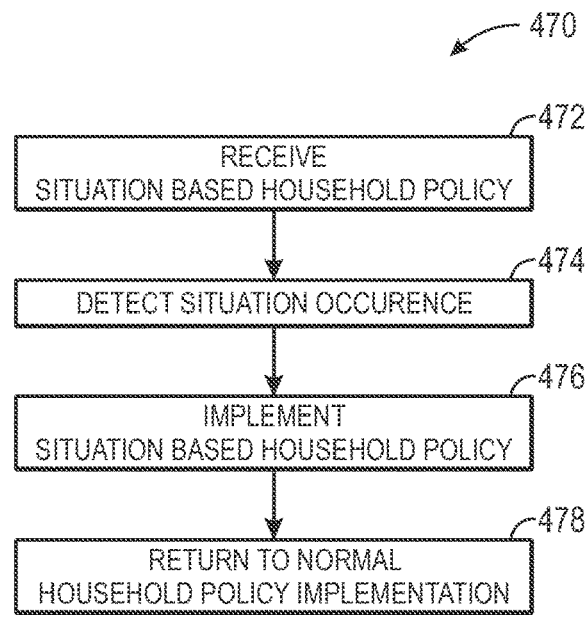
FIG. 48 is a flow diagram illustrating a process for situation-based control, in accordance with an embodiment.

Turning now to particular reporting and/or control policies, FIG. 48 is a flow diagram illustrating a process 470 for situation-based reporting and/or control, in accordance with an embodiment. The process 470 begins by receiving a situation-based policy (block 472), such as third-party supervision of children as will be discussed with regard to FIG. 49 and/or grounding as will be discussed with regard to FIG. 50).

Once the situation-based household policy is received, the household policy manager begins monitoring for the occurrence of the situation associated with the policy (e.g., third-party supervision or grounding) (block 474). When the situation is detected, the situation-based household policy is implemented (e.g., the reporting and/or control based upon the policy is implemented) (block 476). The situation-based household policy is implemented until the situation is no longer detected (e.g., no longer supervised by the third party). Once the situation is no longer detected, normal household policy implementation resumes (block 478).

Figure 49:
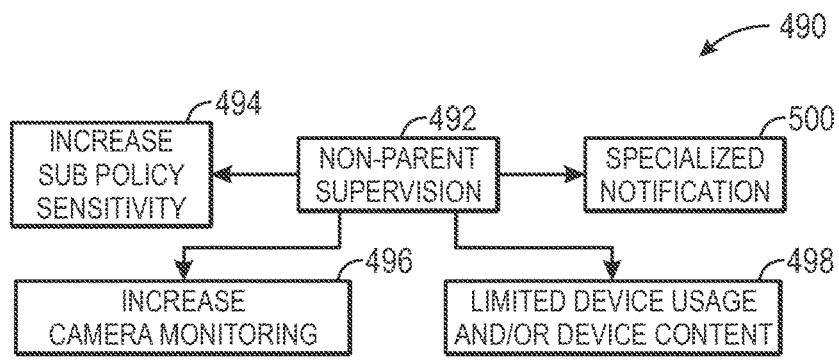
FIG. 49 is a flow diagram illustrating a process for controlling a smart-device environment under non-parental supervision, in accordance with an embodiment.

FIG. 49 is a flow diagram illustrating a process 490 for controlling a smart-device environment under third party (e.g., non-parental supervision), in accordance with an embodiment. In the embodiment of FIG. 49, a non-parental supervision policy 492 dictates particular actions to be taken upon detection of non-parental supervision. For example, the policy 492 dictates that upon such an occurrence, sub-policy sensitivity should be increased (block 494). For example, if there is a policy that, under normal supervision, a notification is provided to parents when 5 uses of foul language occur, the sensitivity may be increased, such that parents are notified when 2 uses of foul language occur under non-parental supervision.

Additionally, the policy 492 dictates that increased monitoring should be implemented when there is supervision by a third party (block 496). For example, increased sensor usage may be warranted, enabling increased monitoring with less trusted supervision. The increased sensor utilization may help protect the children and monitor the activities of the supervisors as well.

The policy 492 also dictates that device usage and/or device content should be limited during third party supervision (block 498). For example, while parents may be able to comfort children when exposed to scary content, third party supervisors may not be so well equipped. Accordingly, the policy 492 may dictate limiting scary content (or any other content) when parents are not supervising the children. Further, the parents may wish for the children to engage with the third party supervisors rather than their electronic devices. Accordingly, the policy 492 may limit electronic device usage when a third party supervisor is present.

The policy 492 also dictates that specialized notifications should be sent when a third party supervises the children (block 500). For example, a parent may wish to be notified of the occurrence of certain activities when a third party is supervising the children, but not when the parents are supervising the children. For example, a notification that the children are outside may be useful when a third party is supervising the children, but may be unnecessary when parents are supervising the children. Accordingly, specialized notification (block 500) may be implemented upon the occurrence of a situation defined in a policy.

Figure 50:
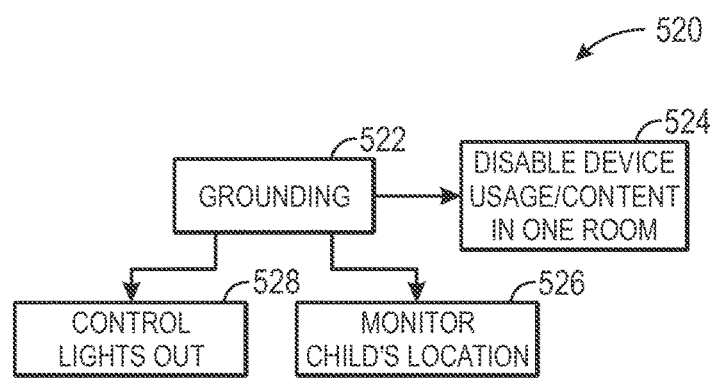
FIG. 50 is a flow diagram illustrating a process for grounding control of a smart-device environment, in accordance with an embodiment.

Turning now to a grounding policy, FIG. 50 is a flow diagram illustrating a process 520 for grounding control of a smart-device environment, in accordance with an embodiment. In the process 520, a grounding policy 522 is received by the household policy management system. The grounding policy 522 may be activated based upon an indication provided by a household occupant with sufficient privileges to ground other occupants of the household. The indication may be provided to the household policy manager, for example, via use of a graphical user interface, audio commands, or both.

Once implemented, the policy 522 may control one or more characteristics of the household. Control of household characteristics may be controlled in many manners. For example, control may be based upon particular rooms/zones of the house, may be based upon associations with particular occupants, etc. In the current embodiment, the grounding policy 522 dictates that, when active, electronic device usage and/or available electronic device content is to be limited in rooms where the grounded occupant is located (block 524). In some embodiments, these rooms may be determined based upon discernment of a particular room/zone the grounded occupant is occupying. In other embodiments, these rooms may be determined based upon rooms that are associated with the grounded occupant (e.g., a game room and/or the occupant's bedroom).

The grounding policy 522 may also dictate that monitoring of the grounded occupants location should ensue and notification provided when the grounded occupant leaves a particular grounding location. For example, the grounded occupant may be commanded to spend their grounding time in their bedroom alone. The grounding policy 522 may monitor the location of the grounded occupant and notify the supervisor when the grounded occupant's location deviates from the grounded occupant's bedroom.

The grounding policy 522 may also dictate that a "lights out" mode should be activated at a particular time (block 528). For example, the "lights out" mode may include: controlling lighting to power off and/or controlling electronic devices to power off. This "lights out" mode may be activated in a particular room/zone the grounded occupant is occupying and/or a particular room/zone associated with the grounded occupant (e.g., the grounded occupant's bedroom).

Household Behavioral Chances

Figure 51:
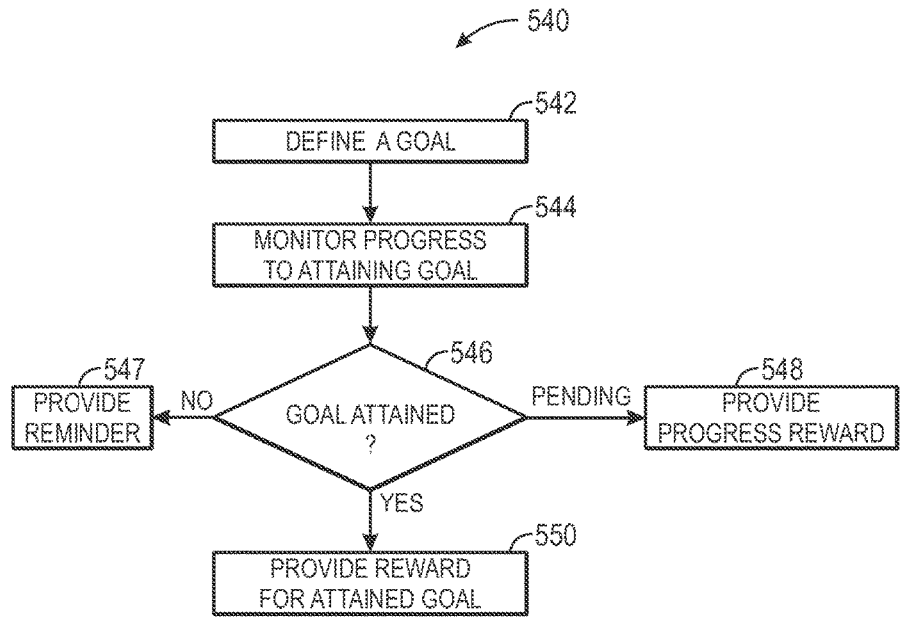
FIG. 51 is a flow diagram illustrating a process for reward-based control of a smart-device environment, in accordance with an embodiment.

FIG. 51 is a flow diagram illustrating a process 540 for reward-based control of a smart-device environment, in accordance with an embodiment. The process 540 begins by defining a goal (block 542). For example, the system may, based upon one or more demographics and/or patterns of a household, provide a suggestion regarding typically desired "areas of improvement" available for the household. Based upon these suggestions, the household may select one or more future goals. For example, based upon observed household patterns, the system may notice that members of the household spend less time eating together than other family having common demographics. Based upon this observation, the system may suggest that the household strive to attain this goal. If the household agrees, the goal is set as defined goal. Other examples of goals might include decreased energy usage, modifications to allotments of electronic device "screen-time," reduction of foul language and/or "raised voice" conversations, etc.

The system will then monitor progression towards the goal (block 544). As will be discussed in more detail below, with regard to FIGS. 54-58, the progression toward the goal may be gradual, thus, graduated performance toward the end goal may also be monitored. Based upon the monitoring activities, a determination is made as to whether the goal has been met, partially met, or has not been met (decision block 546).

If no progress is made, a reminder of the active goal may be provided to the household (block 547). For example, if the household indicated a goal to spend more time doing activities together and the system monitoring indicates that the household is spending less time together or marginally more time together, the system may provide a reminder of the household goal to one or more members of the household (e.g., via an audible and/or visual alert in the household, via a text message provided to the user's smartphone, etc.).

If sufficient progress toward the goal is attained, a progress reward may be provided to one or more members of the household (block 548). For example, in the togetherness goal mentioned above, if the family spends 20 additional minutes together in a week, when the goal is to spend an additional hour together a week, a progress reward may be provided to the family. Further, if a portion of the family spends the additional hour together, but a portion does not, the portion of the members attaining the goal may receive a progress reward, while the portion of the members not attaining the goal does not.

If the goal is attained, a reward for attaining the goal may be provided to one or more of the household members (block 550). For example, if all of the household members spend an additional hour doing activities together, the goal may be attained, thus resulting in the presentation of the reward for attaining the goal.

The progress goal may be as simple as an encouraging text, audio, and/or video message, or may be more elaborate. For example, in some embodiments, increase allotments of portion restricted activities may be provided. For example, an increase in electronic device "screen-time" may be provided upon attaining a goal. In one embodiment, household bragging rights may be a reward, by providing a neighborhood message to other participating households, stating that the household is progressing towards and/or has attained the particular goal.

Figure 52:
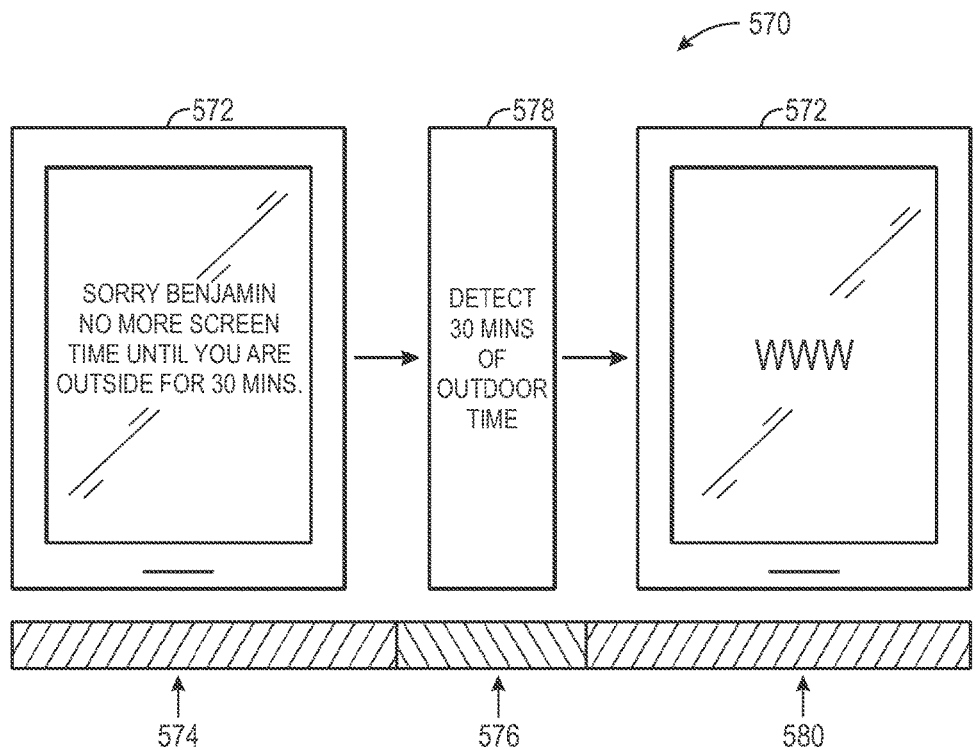
FIG. 52 is a schematic drawing illustrating allotment-based control of a smart-device environment, in accordance with an embodiment.

FIG. 52 is a schematic drawing illustrating a system 570 providing an allotment-based reward for attaining a goal, in accordance with an embodiment. In the embodiment of FIG. 52, a household administrator has defined a goal that Benjamin should spend more time outside and less time on electronic devices.

Accordingly, based upon the defined goal, the system may monitor Benjamin's actions, discerning how Benjamin is allotting his time. For example, cameras in the household may determine whether Benjamin is inside or outside the house, whether Benjamin is on an electronic device, etc. Further, electronic device usage and/or Benjamin's location may be directly attainable using functions of the electronic device 572 (e.g., Benjamin's smartphone).

Using this data, the system 570 may determine whether Benjamin is spending more time outside. If the system determines that Benjamin has not progress towards spending more time outside, the system may provide a reminder, as illustrated in the electronic device 572 at time 574. In some embodiments, the reminder (or other mechanism in the system) may encourage progress to the goal by imposing restrictions and/or other punishments for not progressing toward the goal. For example, because Benjamin has not progressed toward the goal at time 574, the system may impose a "screen-time" lockout feature, thus encouraging Benjamin to progress toward the goal.

Once sufficient progression is made (e.g., Benjamin is outside for 15 minutes), a progression goal, such a "screen-time" lockout countdown clock may be presented to Benjamin. Further, once Benjamin's goal is attained (e.g., Benjamin spends 30 minutes outside as indicated at time 576 by block 578), the "screen-time" lockout feature of the electronic device 572 may be disabled, as shown at time 580. Thus, because Benjamin has attained the goal, he is allotted additional "screen-time."

Figure 53:
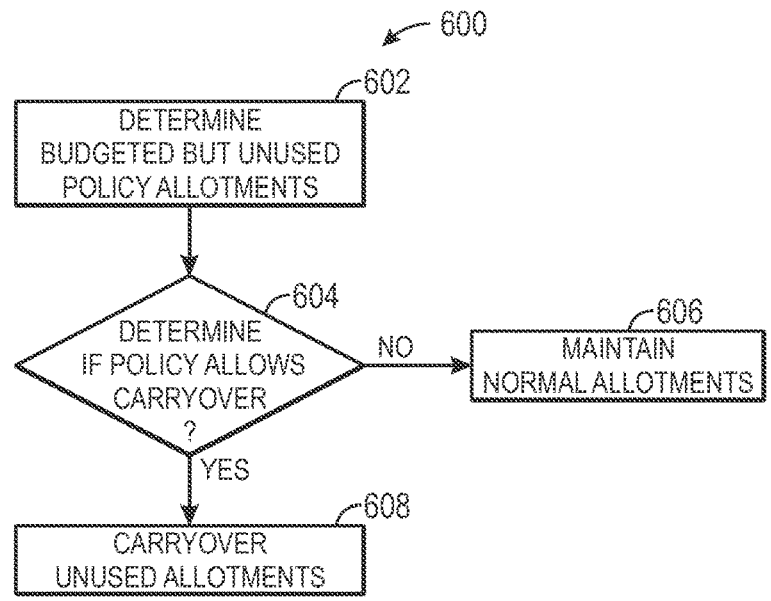
FIG. 53 is a flow diagram illustrating a process for the allotment-based control of the smart-device environment, in accordance with an embodiment.

In some embodiments, when goals are allotment-based, some flexibility may be implemented by the system. For example, FIG. 53 is a flow diagram illustrating a process 600 for the allotment-based control of the smart-device environment where carryover allotments may be allowed, in accordance with an embodiment. First, the system may determine that a portion of an allotment (e.g., an allotment of "screen-time" of an electronic device) has been budgeted, but not used (block 602). For example, if a household member is allotted two hours of "screen-time" total in a day, but only uses one hour, an additional one hour of "screen-time" has been budgeted, but not used.

The system may then determine if the policies implementing the budgeted allotments allow for carryover (decision block 604). For example, in some instances, a policy may be implemented in a more flexible manner that allows un-used allotments for one time period to carryover to be applied to allotments of the next time period. Alternatively, in some embodiments, carryover is not allowed, ensuring that the allotment is the maximum allotment for the particular time period.

If carryover is not allowed, the standard allotment is maintained (block 606). However, if carryover is allowed, the un-used allotment is added to the budgeted allotment for the next time period (block 608). Accordingly, in the above examiner where the household member does not use one hour of a budgeted two-hour allotment, the allotment for the next day will be three hours, because the un-used one hour is added to the two-hour allotment. This may reduce the rigidity of the policy implementation, thus, prolonging the effectiveness of the implemented policies.

Figure 54:
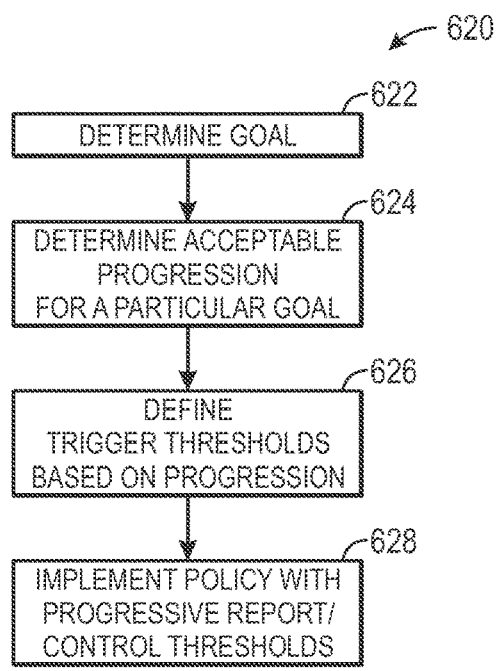
FIG. 54 is a flow diagram illustrating a process for progressive control in a smart-device environment, in accordance with an embodiment.

As mentioned above, in some embodiments, gradual progression toward a goal may be an effective way of reaching the goal. For example, by making small, incremental progressions toward a goal that are virtually imperceptible, the household may become gradually accustomed to the actions of the goal. FIG. 54 is a flow diagram illustrating a process 620 for progressive control in a smart-device environment, in accordance with an embodiment. The process 620 begins by determining the goal to be progressively implemented (block 622). For example, some goals may be easier to implement in a progressive manner than others. Goals related to changing highly routine activities that occur on a consistent basis may be good candidates for progressive implementation. Further, goals related to household modifications of a significant magnitude may also be good candidates for progressive implementation.

After the goals for progressive implementation are determined, the system may determine acceptable progression thresholds for the particular goal (block 624). For example, when there is a pre-defined time to reach the goal, the progression thresholds may exponentially graduate, such that the progression requirements are very subtle at first and then more aggressive as the household becomes accustomed to progressing toward the goal. Alternatively, the progression thresholds may be evenly distributed amongst time periods between implementation of the goal and the pre-defined time to reach the goal, such that an equal amount of progression is to be made during each time period.

In embodiments where no pre-defined time to reach the goal is specified, the system may increase the progression requirement very gradually, providing virtual imperceptibility that the progression is occurring. This may result in additional success in achieving household goals, by allowing a household to adapt very gradually to change.

Based upon the determined acceptable progression for the particular goal, the system may define progression threshold triggers that are used to report progression and/or control the system (block 626). For example, using an example where a household wishes to decrease Internet usage, an allotment may be reduced by one minute each day, thus being virtually imperceptible to the household. The triggers for restricting Internet access may be moved by one minute each day until a desired amount of Internet usage is attained. Once the triggers are determined, goal-based policies are implemented based upon the triggers (block 628). Accordingly, the reporting and/or control may become progressively sensitive, as the household progresses toward the goal.

Figure 55:
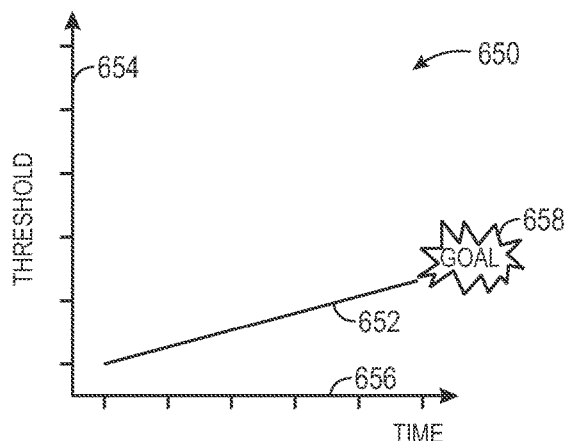
FIG. 55 is a data chart illustrating control via a progressively increasing control threshold, in accordance with an embodiment.

FIG. 55 is a data chart 650 illustrating an example of control via progressively increasing control thresholds, in accordance with an embodiment. Line 652 represents threshold trigger points (e.g., the y-axis 654) as a function of time (e.g., the x-axis 656). As illustrated, the line 652 increases gradually until the goal 658 is reached. Thus, reporting and/or control conducted by the system may gradually enforce progression to the goal 658.

Figure 56:
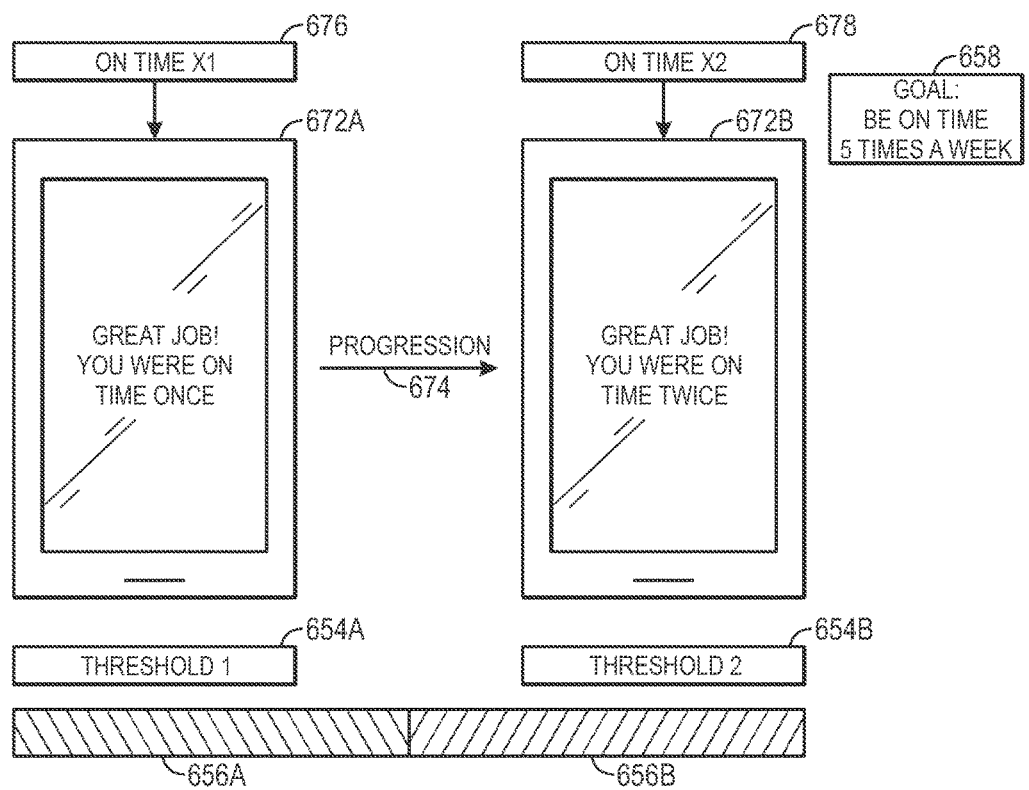
FIG. 56 is a schematic drawing illustrating control via progressively increasing thresholds, in accordance with an embodiment.

This may be seen in the embodiment of FIG. 56. FIG. 56 is a schematic drawing illustrating a system 670 that provides rewards that become progressively difficult to receive as household members progress towards a goal, in accordance with an embodiment.

The goal 658 in FIG. 56 is that a particular household member be on time to a particular destination (e.g., work and/or home) 5 times a week. To implement policies for attaining the goal 658 in a progressive fashion, the system 670 may, at time 656A, set a threshold 656A for receiving a reward (e.g., praise message 672A) to 1 (e.g. indicating that the praise message 672A will be received upon the household member being on time once). As the household member progresses 674 toward the goal (e.g., is on time once 676), the threshold may be increased. For example, at time 656B, threshold 654B requires being on time twice 678 to receive the praise message 672B. Thus, the household member may be subtly and gradually encouraged to continue to progress toward the goal 658.

Figure 57:
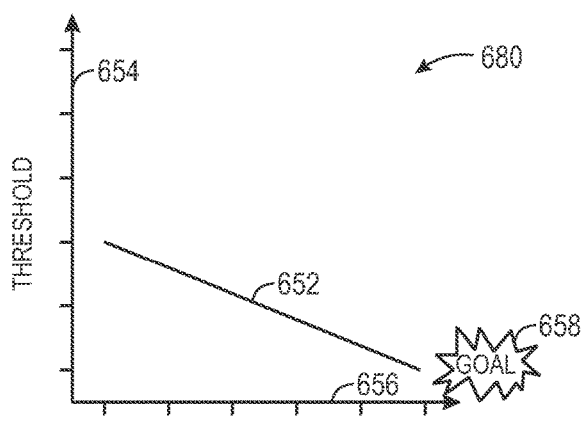
FIG. 57 is a data chart illustrating control via a progressively decreasing control threshold, in accordance with an embodiment.

FIG. 57 is a data chart 680 illustrating control via a progressively decreasing control threshold to reach a goal 658, in accordance with an embodiment. Line 652 represents threshold trigger points (e.g., the y-axis 654) as a function of time (e.g., the x-axis 656). As illustrated, the line 652 increases gradually until the goal 658 is reached. Thus, reporting and/or control conducted by the system may gradually enforce progression to the goal 658. In contrast to data chart 650 of FIG. 55, the data chart 680 has progressively decreasing trigger points as a function of time.

Figure 58:
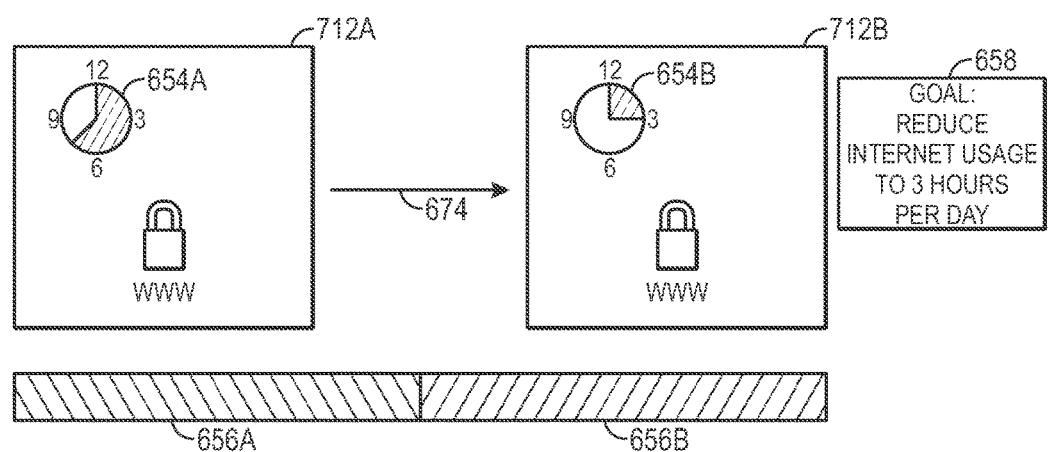
FIG. 58 is a schematic drawing illustrating control via progressively decreasing thresholds, in accordance with an embodiment.

This may be seen in the embodiment of FIG. 58. FIG. 58 is a schematic drawing illustrating a system 710 that progressively removes Internet allotment for household members over time, in accordance with an embodiment.

The goal 658 in FIG. 56 is that a household reduce Internet usage to a maximum of three hours per day. To implement policies for attaining the goal 658 in a progressive fashion, the system 710 may, at time 656A, set a threshold 656A for controlling a household attribute (e.g., Internet access) to 7 (e.g. indicating that Internet access will be revoked after 7 hours of usage is reached). As the household progresses 674 toward the goal (e.g., begins reducing Internet usage), the threshold may be decreased. For example, at time 656B, threshold 654B is set to 3 hours, indicating that the maximum allotment of Internet usage is now three hours. Any granularity of threshold modifications may be used to attain the goal 658. For example, thresholds may be modified, for example, every year, month, week, day, hour, etc. Further, the degree of threshold modification may vary, depending on any number of factors. For example, for goals that will be hard to achieve, each threshold modification may be of a very small degree. Thus, the household may be subtly and gradually encouraged to continue to progress toward the goal 658.

As may be appreciated, gradual progression toward a goal may effectively help households and/or household members attain group and/or individual goals. The systems provided herein encourage such goal attainment by progressively challenging households and/or household members to continue to progress toward completion of a goal. The systems provided herein may apply to any number of goals. One such type of goals are allotment modification goals, such as: decreasing household energy usage, reducing caloric intake of a household member and/or the entire household, reducing Internet time, increasing time outdoors, reducing "raise voice" conversations, decreasing the use of foul language, etc.

The above-described embodiments are directed to achieving what can be thought of as a conscious home, a conscientious home, a thoughtful home, or more generally a smarter home than home automation systems that are simply based on if-X-occurs-then-do-Y (IXOTDY) programming by the user. The above-described embodiments are directed to providing more intelligent governance of the home experience by taking into account the fact that information gathered by smart-home sensors is often incomplete and imperfect, that user behaviors and desires for automated assistance from the home are often not subject to fixed explicit formulation, and that the home environment is ever-changing in terms of human goals, human behavior, and the ever-increasing variety and availability of home sensors and controller devices. Thus, in contrast to implementation by direct IXOTDY rules, the household policy implementations according to of one or more of the embodiments take into account that the triggering of certain actions or events should be based on a more thoughtful approach that takes into account the described confidences, inferences, trends, and other factors to provide a more comprehensive, stable, sustainable, context-aware home automation experience. As one of many advantages, it is believed that household policy implementations according to one or more embodiments reduces or obviates the need for persistent user attention to the building and maintenance of complex IXOTDY rule sets, an all-too-common and time-consuming process which is believed by the present inventors to be antithetical to the true purpose of the conscious home, which is to make people's lives easier, better, and more sustainable. In view of the present disclosure, one skilled in the art would be readily able to implement the described systems and methods using one or more known technologies, platforms, models, and/or mathematical strategies including, but not limited to, artificial neural networks, Bayesian networks, genetic programming, inductive logic programming, support vector machines, decision tree learning, clustering analysis, dynamic programming, stochastic optimization, linear regression, quadratic regression, binomial regression, logistic regression, simulated annealing, and other learning, forecasting, and optimization techniques.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A tangible, non-transitory, machine-readable medium, comprising machine-readable instructions configured to:
   suggest, automatically implement, or both suggest and automatically implement, one or more household policies to be implemented within a household environment;
   determine monitoring capabilities, enforcement capabilities, or both of an inventory of smart devices within the household environment, and
   suggest the one or more household policies based upon the monitoring capabilities, the enforcement capabilities, or a combination thereof of the inventory of smart devices, wherein the machine-readable instructions configured to determine the monitoring capabilities, the enforcement capabilities, or both comprises:
      access a list of the monitoring capabilities, the enforcement capabilities, or both for each smart device in the inventory; and
      aggregate the list of the monitoring capabilities, the enforcement capabilities, or both for each smart device in the inventory into an overall list of the monitoring capabilities, the enforcement capabilities, or both for all smart devices in the inventory; and
   wherein the household policies comprise:
      one or more input criteria that is derivable from at least one smart device within the household environment, the one or more input criteria relating to a characteristic of the household environment, a characteristic of one or more occupants of the household, or both; and
      one or more outputs to be provided to at least one of the smart devices within the inventory of smart devices within the household environment based upon the one or more input criteria such that the at least one of the smart devices within the inventory of smart devices within the household environment operates in accordance with the one or more outputs.

2. The tangible, non-transitory, machine-readable medium of claim 1, comprising machine-readable instructions configured to determine the monitoring capabilities, the enforcement capabilities, or both by:
   broadcasting a capabilities poll to the smart devices within the household environment; and
   receiving a response from one or more of the smart devices within the household, the response comprising an indication of one or more monitoring capabilities, enforcement capabilities, or both of the one or more smart devices providing the response.

3. The tangible, non-transitory, machine-readable medium of claim 1, comprising machine-readable instructions configured to:
   determine a demographic profile of the household environment; and
   suggest the one or more household policies based upon the demographic profile of the household environment.

4. The tangible, non-transitory, machine-readable medium of claim 3, comprising machine-readable instructions configured to:
   determine the demographic profile of the household environment by:
      providing a graphical user interface comprising a demographic survey; and
      receiving one or more responses to the demographic survey, the responses comprising an indication of at least one demographic variable of the household environment.

5. A tangible, non-transitory, machine-readable medium comprising machine-readable instructions configured to:
   suggest, automatically implement, or both suggest and automatically implement, one or more household policies to be implemented within a household environment;
   determine a demographic profile of the household environment by:
      attributing at least one input received by the at least one smart device within the household environment to at least one demographic variable; and
      defining the demographic profile based upon the at least one demographic variable;
   suggest the one or more household policies based upon the demographic profile of the household environment; and
   wherein the household policies comprise:
      one or more input criteria that is derivable from at least one smart device within the household environment, the one or more input criteria relating to a characteristic of the household environment, a characteristic of one or more occupants of the household, or both; and
      one or more outputs to be provided to at least one of the smart devices within the within the household environment based upon the one or more input criteria such that the at least one of the smart devices within the household environment operates in accordance with the one or more outputs.

6. The tangible, non-transitory, machine-readable medium of claim 5, wherein the at least one input comprises an audio signal and the at least one demographic variable comprises a type of household member associated with the audio signal, the type comprising: a male, a female, a child, an adult, or any combination thereof.

7. The tangible, non-transitory, machine-readable medium of claim 5, wherein the at least one input comprises an audio signal and the at least one demographic variable comprises an identity of a household member associated with the audio signal.

8. A tangible, non-transitory, machine-readable medium, comprising machine-readable instructions configured to:
   determine one or more behaviors within a household;
   determine monitoring capabilities, enforcement capabilities, or both of an inventory of smart devices within the household by:
      accessing a list of the monitoring capabilities, the enforcement capabilities, or both for each smart device in the inventory; and
      aggregating the list of the monitoring capabilities, the enforcement capabilities, or both for each smart device in the inventory into an overall list of the monitoring capabilities, the enforcement capabilities, or both for all smart devices in the inventory; and
   suggest or automatically implement one or more household policies based on the one or more behaviors within the household, the monitoring capabilities, the enforcement capabilities, or a combination thereof of the inventory of smart devices;
   wherein the household policies comprise one or more outputs to be provided to at least one of the smart devices within the within the household based upon the one or more input criteria such that the at least one of the smart devices within the household operates in accordance with the one or more outputs.

9. The tangible, non-transitory, machine-readable medium of claim 8, wherein the behaviors comprise one or more activity patterns of a member of the household.

10. The tangible, non-transitory, machine-readable medium of claim 9, wherein the one or more activity patterns comprise repeatedly missing an indicated goal.

11. The tangible, non-transitory, machine-readable medium of claim 10, wherein the indicated goal is an estimated time of arrival to the one or more household policies comprises providing a reminder to leave at a time needed of an on-time arrival.

12. The tangible, non-transitory, machine-readable medium of claim 11, comprising instructions to provide the reminder as an alarm, a text message, or both an electronic device associated with the member of the household.

13. The tangible, non-transitory, machine-readable medium of claim 10, comprising instructions configured to discern the indicated goal from a text message, voice call, audio monitoring, video monitoring, or any combination thereof.

14. A tangible, non-transitory, machine-readable medium, comprising machine-readable instructions configured to:
    determine one or more goals of a household;
    determine monitoring capabilities, enforcement capabilities, or both of an inventory of smart devices within the household by:
       accessing a list of the monitoring capabilities, the enforcement capabilities, or both for each smart device in the inventory; and
       aggregating the list of the monitoring capabilities, the enforcement capabilities, or both for each smart device in the inventory into an overall list of the monitoring capabilities, the enforcement capabilities, or both for all smart devices in the inventory; and
    suggest or automatically implement one or more household policies based on the one or more goals, the monitoring capabilities, the enforcement capabilities, or a combination thereof of the inventory of smart devices;
    wherein the household policies comprise one or more outputs to be provided to at least one of the smart devices within the within the household based upon the one or more input criteria such that the at least one of the smart devices within the household operates in accordance with the one or more outputs.

15. The tangible, non-transitory, machine-readable medium of claim 14, comprising instructions configured to determine the one or more goals by providing a household goal survey via a graphical user interface.

16. The tangible, non-transitory, machine-readable medium of claim 14, comprising instructions configured to determine the one or more goals by providing one or more goal suggestions based upon one or more behaviors of the household, one or more observations obtained from one or more smart devices within the household, or both.

17. The tangible, non-transitory, machine-readable medium of claim 14, wherein the household goal comprises reducing consumption of a utility, the utility comprising water, natural gas, electricity, or a combination thereof.

* * * * *